United States Patent
Tanaka et al.

(10) Patent No.: US 9,685,131 B2
(45) Date of Patent: Jun. 20, 2017

(54) ACTIVE-MATRIX SUBSTRATE, METHOD OF MANUFACTURING ACTIVE-MATRIX SUBSTRATE, AND DISPLAY PANEL

(71) Applicant: Sharp Kabushiki Kaisha, Osaka-shi, Osaka (JP)

(72) Inventors: Kohhei Tanaka, Osaka (JP); Hidefumi Yoshida, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 22 days.

(21) Appl. No.: 14/775,933

(22) PCT Filed: Mar. 12, 2014

(86) PCT No.: PCT/JP2014/056527
§ 371 (c)(1),
(2) Date: Sep. 14, 2015

(87) PCT Pub. No.: WO2014/142183
PCT Pub. Date: Sep. 18, 2014

(65) Prior Publication Data
US 2016/0019856 A1    Jan. 21, 2016

(30) Foreign Application Priority Data

Mar. 15, 2013  (JP) ................................ 2013-054294
Oct. 3, 2013   (JP) ................................ 2013-208585

(51) Int. Cl.
G09G 5/00       (2006.01)
G09G 3/36       (2006.01)
(Continued)

(52) U.S. Cl.
CPC ......... G09G 3/3666 (2013.01); G02F 1/1345 (2013.01); G09G 3/20 (2013.01);
(Continued)

(58) Field of Classification Search
CPC ...... G09G 3/3648; G09G 3/36; G09G 3/3666; G09G 3/3677; G09G 3/20;
(Continued)

(56) References Cited

U.S. PATENT DOCUMENTS

2005/0225690 A1* 10/2005 Battersby ............ G02F 1/13336
349/41
2006/0077191 A1* 4/2006 Ming-Daw ....... G02F 1/133351
345/204
(Continued)

FOREIGN PATENT DOCUMENTS

JP    10-91125 A     4/1998
JP    10-197851 A    7/1998
(Continued)

OTHER PUBLICATIONS

Official Communication issued in International Patent Application No. PCT/JP2014/056527, mailed on Jun. 17, 2014.

*Primary Examiner* — Vijay Shankar
(74) *Attorney, Agent, or Firm* — Keating & Bennett, LLP

(57) ABSTRACT

An objective is to provide a technique for reducing the size of the picture-frame region of the active-matrix substrate and improve the freedom of design, such as the freedom in designing the active-matrix substrate. An active-matrix substrate includes a group of gate lines and a group of source lines crossing the gate lines. At least some of the gate lines have a length that is smaller than the maximum value of the width of the active-matrix substrate as measured in the direction in which the gate lines extend. The active-matrix substrate further includes pixel electrodes connected with the gate lines and source lines, and gate line driving units (11) provided in the display region for switching the gate lines to the selected or non-selected state in response to a supplied control signal. First terminals (12s) for providing data signals from the source driver and second terminals (Continued)

(12g) for providing control signals from the display control circuit are provided in the portion of the picture-frame region that is adjacent a side of the display region.

18 Claims, 54 Drawing Sheets

(51) Int. Cl.
*G02F 1/1345* (2006.01)
*G09G 3/20* (2006.01)

(52) U.S. Cl.
CPC ......... *G09G 3/3648* (2013.01); *G09G 3/3677* (2013.01); *G02F 2001/13456* (2013.01); *G02F 2201/56* (2013.01); *G09G 2300/0426* (2013.01); *G09G 2310/0218* (2013.01); *G09G 2310/0278* (2013.01); *G09G 2310/0281* (2013.01); *G09G 2310/0291* (2013.01); *G09G 2320/0233* (2013.01); *G09G 2380/16* (2013.01)

(58) Field of Classification Search
CPC ... G09G 2310/0278; G09G 2310/0281; G09G 2320/0233
See application file for complete search history.

(56) References Cited

U.S. PATENT DOCUMENTS

| | | | |
|---|---|---|---|
| 2007/0109484 A1* | 5/2007 | Murahashi | G02F 1/13452 349/149 |
| 2008/0018557 A1 | 1/2008 | Maeda | |
| 2008/0048934 A1* | 2/2008 | Yamamoto | G02F 1/13454 345/55 |
| 2008/0088568 A1* | 4/2008 | Haga | G09G 3/18 345/100 |
| 2009/0051636 A1 | 2/2009 | Natori | |
| 2009/0102758 A1 | 4/2009 | Anzai et al. | |
| 2012/0112988 A1 | 5/2012 | Nakanishi et al. | |

FOREIGN PATENT DOCUMENTS

| | | |
|---|---|---|
| JP | 2006-154022 A | 6/2006 |
| JP | 2008-046598 A | 2/2008 |
| JP | 2009-047902 A | 3/2009 |
| JP | 2009-134246 A | 6/2009 |
| JP | 2012-103335 A | 5/2012 |

\* cited by examiner

EN
VSS(Low) ─────────────────

GL(1) ─────────────────

GL(2) ─────────────────

⋮

GL(n-1) ─────────────────

GL(n) ─────────────────

DATA ─────────────────

FIG. 24C

ACTIVE-MATRIX SUBSTRATE, METHOD OF MANUFACTURING ACTIVE-MATRIX SUBSTRATE, AND DISPLAY PANEL

TECHNICAL FIELD

The present invention relates to an active-matrix substrate, a method of manufacturing an active-matrix substrate, and a display panel.

BACKGROUND ART

Display panels are known where gate drivers are provided along a side of an active-matrix substrate and source drivers are provided along an adjacent side thereof. JP 2012-103335 A discloses a display device having an atypically-shaped hexagonal display region provided by cutting off the corners of a rectangular one. Gate drivers and source drivers are disposed in the picture-frame region portions adjacent two adjacent sides of the TFT substrate of the display device. On the TFT substrate, a plurality of scan lines extend horizontally from the side thereof along which the gate drivers are provided, and a plurality of video signal lines extend vertically from the side thereof along which the source drivers are provided. The scan lines are connected with the gate drivers via lines provided along a portion of the picture-frame region of the TFT substrate.

DISCLOSURE OF THE INVENTION

Providing scan lines with a length that depends on the outer shape of the TFT substrate, as in JP 2012-103335 A, enables designing a display with a shape different from conventional rectangular displays. However, if gate drivers are disposed in the picture-frame region portion adjacent a side of the TFT substrate different from the side along which the source drivers are disposed on the TFT substrate as in JP 2012-103335 A, the lines and other components connecting the scan lines with the gate drivers must be routed along the picture-frame region of the TFT substrate, making it difficult to reduce the size of the picture-frame region, which means restrictions on the design of the outer shape of the display.

An object of the present invention is to provide a technique for reducing the size of the picture-frame region of the active-matrix substrate and improving the freedom of design, such as the freedom in designing the active-matrix substrate.

An active-matrix substrate according to a first invention includes: a display region having a gate line group including a plurality of gate lines and a source line group including a plurality of source lines arranged in a matrix, pixel electrodes being connected with the gate lines and the source lines; a first terminal provided in a portion of a picture-frame region outside the display region that is adjacent a side thereof for supplying a data signal to the source line group; a second terminal provided adjacent the same side as the first terminal for supplying a control signal; and a gate line driving unit provided for each gate line inside the display region for providing a selection signal for switching the gate line to a selected or non-selected state in response to the control signal, wherein at least one gate line of the gate line group has a length smaller than the maximum value of a width of the display region as measured in a first direction in which the gate lines extend. That is, the active-matrix substrate of the first invention is only required to be constructed such that at least some gate lines have a length smaller than the width of the display region as measured in the first direction; for example, the display region may have a shape other than rectangular, or a rectangular display region may have some gate lines divided into separate portions.

Starting from the first invention, a second invention includes a non-display region within the display region, wherein one source line of the source line group is provided in a first display region that is located in a column having the non-display region and is located closer to the first terminal, and extends from the first terminal, and an end thereof disposed in a second direction in which this source line extends is located near an edge of the first display region adjacent the non-display region, and one source line of the source line group located in another column extends from the first terminal and is extended to a second display region located adjacent a side of the non-display region opposite a side adjacent the first display region.

Starting from the first invention, a third invention includes a non-display region within the display region, wherein a source line located in a first display region in a column having the non-display region extends from the first terminal, the first display region being located closer to the first terminal than the non-display region is, an end of the source line disposed in a second direction in which it extends is located near an edge of the first display region adjacent the non-display region, a source line located in a second display region located adjacent a side of the non-display region opposite to a side adjacent the first display region extends from near an edge of the second display region adjacent the non-display region, an end thereof disposed in the second direction is located near an edge of the second display region located adjacent a side of the non-display region opposite a side closer to the first terminal, and the source line in the first display region is connected with the source line in the second display region via a detour line extending along a periphery of the non-display region from the first display region to the second display region.

Starting from the second invention, a fourth invention includes a line group extending from the second terminal and generally parallel to the source lines and connected with the gate line driving units, wherein at least one of the gate lines connected with the pixel electrodes in the same row includes a non-continuous gate line portions, different gate line driving units being connected with the different gate line portions, one line of the line group is provided in the first display region and extends from the second terminal, an end thereof in a direction in which it extends is located near an edge of the first display region adjacent the non-display region, and one line of the line group in another column extends from the second terminal and is extended to the second display region.

In a fifth invention, starting from the third invention, the detour line is provided in a pixel region in which no gate line driving unit is present.

In a sixth invention, starting from one of the first to fifth inventions, a gate line driving unit provided adjacent to at least a part of a periphery of the display region provides the selection signal at a driving frequency higher that a driving frequency of another gate line driving unit.

In a seventh invention, starting from one of the second to fifth inventions, a plurality of separate regions are provided by dividing the display region along the first direction or the second direction, a gate line group is provided in each of the separate regions, a gate line driving unit in one of the separate regions provides the selection signal at a first driving frequency in response to the control signal, and a gate line driving unit in another separate region provides the selection signal at a second driving frequency that is lower than the first driving frequency in response to the control signal, and a source line in the one separate region is supplied with the data signal at the first driving frequency, and the source line in the other separate region is supplied with the data signal at the second driving frequency.

In an eighth invention, starting from the seventh invention, the gate line group in the other separate region is present also in the one separate region in such a manner that a border between the gate line group in the one separate region and the gate line group in the other separate region is non-linear.

In a ninth invention, starting from one of the first to eighth inventions, the gate line driving unit provides, in response to the control signal, the selection signal for putting a gate line in the non-selected state for at least one frame.

In a tenth invention, starting from the first invention, at least one source line of the source line group has a length smaller than another source line of the source line group, the one gate line is provided in a region in which the other source line is provided and is located in a row that does not cross a column in which the one source line is provided, and the first terminal supplies the one source line with a data signal with a minimum amplitude during a period in which the one gate line is in the selected state.

In an eleventh invention, starting from the first invention, a plurality of gate line driving units are provided for the associated gate lines, the display region includes a non-display region between the plurality of gate line driving units, the eleventh invention further includes a third terminal provided in a portion of the picture-frame region that is adjacent a side opposite the side along which the first terminal is provided for receiving the data signal, a source line of the source line group that is divided by the non-display region is supplied with the data signal through the side of the display region opposite the side adjacent the first terminal via the third terminal.

Starting from the eleventh invention, a twelfth invention includes a plurality of non-display regions located in the display region, and the gate lines and source lines that cross at one non-display region are different from the gate lines and source lines that cross at another non-display region.

A method of manufacturing an active-matrix substrate according to a thirteenth invention includes: a forming step for forming a first active-matrix substrate including the steps of producing a plurality of gate lines having substantially the same length and spaced apart at a regular interval, producing a plurality of source lines having substantially the same length and spaced apart at a regular interval to cross the gate lines, and producing a gate line driving unit in a display region having the gate lines and the source lines for providing a selection signal for switching its associated gate line to a selected or non-selected state; and a removal step for producing a second active-matrix substrate by removing a part of the first active-matrix substrate such that at least one of the plurality of gate lines in the first active-matrix substrate has a length smaller than the maximum value of a width of the display region measured in a direction in which the gate lines extend.

In a fourteenth invention, starting from the thirteenth invention, the step of producing a gate line driving unit includes: the step of producing first gate line driving circuits for the associated gate lines for providing the selection signal to the gate lines; and the step of producing second gate line driving circuits provided for some of the gate lines that are adjacent to each other for providing the selection signal to the gate lines, the fourteenth invention further includes a cutting step for cutting the first active-matrix substrate along a gate line between the portion in which the second gate line driving circuits are present and the portion in which the second gate line driving circuits are not present, and the removal step occurs after the cutting step.

In a fifteenth invention, starting from the fourteenth invention, the step of producing a gate line driving unit includes the step of producing a plurality of pairs of first gate line driving circuits and second driving circuits, the fifteenth invention further includes the step of cutting along a source line between the plurality of pairs, and the removal step occurs after the cutting step and the step of cutting.

In a sixteenth invention, starting from the thirteenth invention, the step of producing a gate line driving unit produces a plurality of gate line driving units for the associated gate lines, the sixteenth invention further includes a cutting step for cutting along a source line between the plurality of gate line driving units, and the removal step occurs after the cutting step.

A method of manufacturing an active-matrix substrate according to a seventeenth invention includes: a forming step for forming a first active-matrix substrate including the steps of producing, in associated regions of a substrate, a plurality of gate lines having substantially the same length and spaced apart at a regular interval, producing, in the associated regions, a plurality of source lines having substantially the same length and spaced apart at a regular interval to cross the gate lines, producing terminals for the associated regions for supplying a data signal to the source lines in the associated regions, and producing, in each region, a gate line driving unit in a display region having the gate lines and the source lines for providing a selection signal for switching its associated gate line to a selected or non-selected state; a cutting step for cutting the first active-matrix substrate provided by the forming step along a source line between the regions; and a removal step for producing a second active-matrix substrate by removing a part of each of active-matrix substrates provided by the cutting in the cutting step such that at least one of the gate lines in each of the active-matrix substrates has a length smaller than the maximum value of a width of the display region measured in a direction in which the gate lines extend.

A display panel according to an eighteenth invention includes: the active-matrix substrate according to any one of the first to twelfth inventions; an opposite substrate including a color filter and a common electrode; and a liquid crystal layer sandwiched between the active-matrix substrate and the opposite substrate.

The present invention reduces the size of the picture-frame region of the active-matrix substrate and improves the freedom of design, such as the freedom in designing the active-matrix substrate.

BRIEF DESCRIPTION OF THE DRAWINGS

FIG. 24C illustrates drive timing for the second to sixtieth frames when a still image is to be displayed on the active-matrix substrate shown in FIG. 19.

EMBODIMENTS FOR CARRYING OUT THE INVENTION

Figure 1:
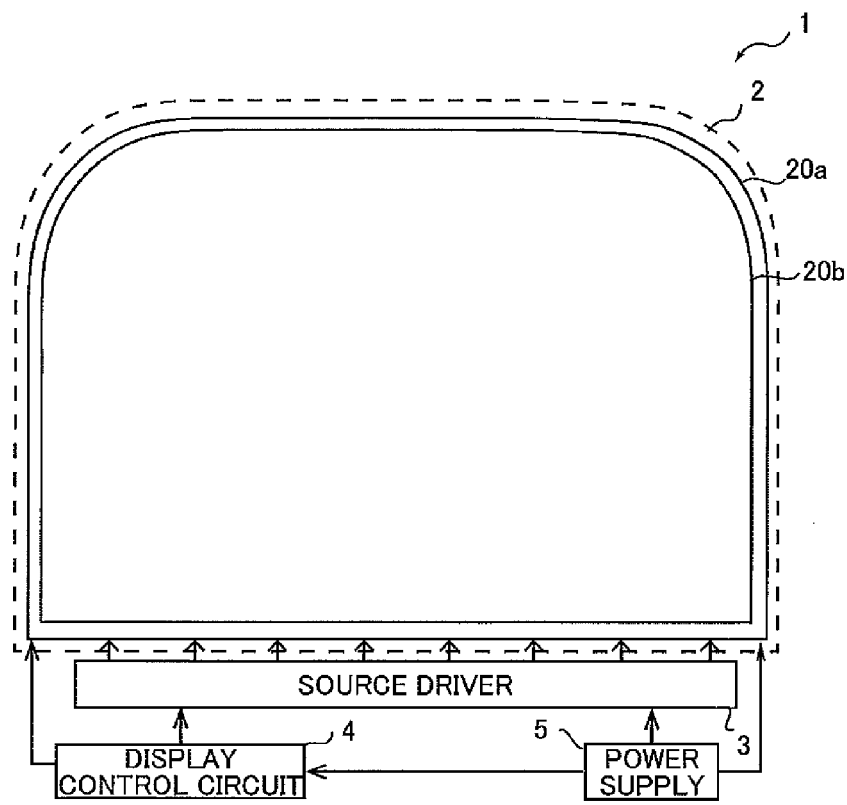
FIG. 1 is a schematic view of a liquid crystal display device according to a first embodiment.

An active-matrix substrate according to an embodiment of the present invention includes: a display region having a gate line group including a plurality of gate lines and a source line group including a plurality of source lines arranged in a matrix, pixel electrodes being connected with the gate lines and the source lines; a first terminal provided in a portion of a picture-frame region outside the display region that is adjacent a side thereof for supplying a data signal to the source line group; a second terminal provided adjacent the same side as the first terminal for supplying a control signal; and a gate line driving unit provided for each gate line inside the display region for providing a selection signal for switching the gate line to a selected or non-selected state in response to the control signal, wherein at least one gate line of the gate line group has a length smaller than the maximum value of a width of the display region as measured in a first direction in which the gate lines extend (first arrangement).

In the first arrangement, the active-matrix substrate includes a gate line group including gate lines having a length smaller than the maximum value of the width of the active-matrix substrate as measured in a first direction, and a source line group crossing the gate lines. That is, the active-matrix substrate may be one including a display region with a different shape than rectangular, for example, or one having a rectangular display region in which gate lines are divided. Each gate line is selected, one after another, by a gate line driving unit provided in the display region in response to a control signal supplied by second terminals provided in the portion of the picture-frame region that is adjacent one side of the substrate, and each source line is supplied with a data signal by first terminals provided along the same side as the second terminals. Thus, even if there are areas having gate lines with a length smaller than the maximum value of the width of the active-matrix substrate in the first direction, the lines and the like for connecting the gate line driving units with the gate lines do not have to be provided along the picture-frame region. Further, since data signals and control signals are supplied to the source lines and gate line driving units from the portion of the picture-frame region that is adjacent one side of the substrate, the size of the picture-frame region portions adjacent the other sides can be reduced. This improves the freedom of design, such as the freedom in designing the active-matrix substrate.

Starting from the first arrangement, a second arrangement may include a non-display region within the display region, wherein one source line of the source line group may be provided in a first display region that is located in a column having the non-display region and be located closer to the first terminal, and may extend from the first terminal, and an end thereof disposed in a second direction in which this source line extends is located near an edge of the first display region adjacent the non-display region, and one source line of the source line group located in another column may extend from the first terminal and is extended to a second display region located adjacent a side of the non-display region opposite a side adjacent the first display region.

In the second arrangement, the source lines in the first display region in the column having a non-display region extend from the first terminals to the edge of the first display region adjacent the non-display region, and source lines are provided in the second display region as source lines of other columns are extended thereto. Thus, data signals may be supplied to the display regions in a column having a non-display region.

Starting from the first arrangement, a third arrangement may include a non-display region within the display region, wherein a source line located in a first display region in a column having the non-display region may extend from the first terminal, the first display region being located closer to the first terminal than the non-display region is, an end of the source line disposed in a second direction in which it extends may be located near an edge of the first display region adjacent the non-display region, a source line located in a second display region located adjacent a side of the non-display region opposite to a side adjacent the first display region may extend from near an edge of the second display region adjacent the non-display region, an end thereof disposed in the second direction may be located near an edge of the second display region located adjacent a side of the non-display region opposite a side closer to the first terminal, and the source line in the first display region may be connected with the source line in the second display region via a detour line extending along a periphery of the non-display region from the first display region to the second display region.

In the third arrangement, source lines connected via detour lines are provided in the first and second display regions in a column having a non-display region. Thus, data signals may be supplied to the display regions in a column having a non-display region.

Starting from the second arrangement, a fourth arrangement may include a line group extending from the second terminal and generally parallel to the source lines and connected with the gate line driving units, wherein at least one of the gate lines connected with the pixel electrodes in the same row may include a non-continuous gate line portions, different gate line driving units being connected with the different gate line portions, one line of the line group may be provided in the first display region and extend from the second terminal, an end thereof in a direction in which it extends may be located near an edge of the first display region adjacent the non-display region, and one line of the line group in another column may extend from the second terminal and is extended to the second display region.

In the fourth arrangement, at least some of the gate lines in the same row are formed by non-continuous gate line portions, and the gate line portions are connected with different gate line driving units. The lines in the first display region in a column having a non-display region extend from the second terminals to the edge of the first display region adjacent the non-display region, and lines of other columns are extended to the second display region. Thus, the gate line driving units connected with the gate line portions in the first display region may be supplied with a control signal by the lines provided in the first display region and extended from the second terminals. The gate line driving units connected with the gate line portions in the second display region may be supplied with a control signal via lines of other columns in which the non-display region is not present.

In a fifth arrangement, starting from the third arrangement, the detour line may be provided in a pixel region in which no gate line driving unit is present.

In the fifth arrangement, the detour lines are provided in pixel regions in which no gate line driving unit is present. This reduces the difference between the aperture ratio of the pixel regions having gate line driving units and that of the pixel regions having detour lines, reducing unevenness in luminance.

In a sixth arrangement, starting from one of the first to fifth arrangements, a gate line driving unit provided adjacent to at least a part of a periphery of the display region may provide the selection signal at a driving frequency higher that a driving frequency of another gate line driving unit.

In the sixth arrangement, the gate line driving units provided in at least a part of the periphery of the display region provides a selection signal at a driving frequency higher than the driving frequency for the other gate line driving units. Thus, even if impurities from the seal material for sealing the liquid crystal layer have entered portions of the display region near its periphery, unevenness in display due to the effects of the impurities from the seal material may be reduced.

In a seventh arrangement, starting from one of the second to fifth arrangements, a plurality of separate regions may be provided by dividing the display region along the first direction or the second direction, a gate line group is provided in each of the separate regions, a gate line driving unit in one of the separate regions may provide the selection signal at a first driving frequency in response to the control signal, and a gate line driving unit in another separate region may provide the selection signal at a second driving frequency that is lower than the first driving frequency in response to the control signal, and a source line in the one separate region may be supplied with the data signal at the first driving frequency, and the source line in the other separate region may be supplied with the data signal at the second driving frequency.

In the seventh arrangement, for each separate region, data signals are supplied, at a first driving frequency or second driving frequency, to the source lines in the separate region. The gate line driving units in each separate region provide a selection signal at the first driving frequency or second driving frequency. Thus, for example, when a moving image is to be displayed in a separate region, data may be written to this separate region at a first driving frequency; when a still image is to be displayed, data may be written to this separate region at the second driving frequency, which reduces power consumption compared with implementations where data is written to a still image display region at the same driving frequency as that for the moving image display region.

In an eighth arrangement, starting from the seventh arrangement, the gate line group in the other separate region may be present also in the one separate region in such a manner that a border between the gate line group in the one separate region and the gate line group in the other separate region is non-linear.

In the eighth arrangement, the gate line group is provided such that the border in the gate line group between the separate region where the gate line driving units operate at the first driving frequency and the separate region where the gate line driving units operate at the second driving frequency is non-linear. This prevents the border between the regions with different driving frequencies from being visible.

In a ninth arrangement, starting from one of the first to eighth arrangements, the gate line driving unit may provide, in response to the control signal, the selection signal for putting a gate line in the non-selected state for at least one frame.

In the ninth arrangement, during at least some frames, the gate lines may be placed in the non-selected state. Thus, for example, when a still image is to be displayed, the gate lines may be switched to the selected state for some frames, and may be switched to the non-selected state for the other frames, thereby reducing power consumption when the gate lines are switched to the selected state.

In a tenth arrangement, starting from the first arrangement, at least one source line of the source line group may have a length smaller than another source line of the source line group, the one gate line may be provided in a region in which the other source line is provided and is located in a row that does not cross a column in which the one source line is provided, and the first terminal may supply the one source line with a data signal with a minimum amplitude during a period in which the one gate line is in the selected state.

In the tenth arrangement, at least some particular source lines of the source line group are shorter than the other source lines, and some gate lines are provided in the rows that do not cross the columns having the particular source lines. That is, the gate lines in the region in which the other source lines are provided are more in number than the gate lines in the region in which the particular source lines are provided, such that the gate lines in the region in which the particular source lines are provided are in the selected state for a shorter period of time than those in the region in which the other source lines are provided. During a period in which the particular gate lines are in the selected state, data signals with the minimum amplitude are supplied to the particular source lines, thereby reducing power consumption in the region in which the particular source lines are provided.

In an eleventh arrangement, starting from the first arrangement, a plurality of gate line driving units may be provided for the associated gate lines, the display region may include a non-display region between the plurality of gate line driving units, the eleventh arrangement may further include a third terminal provided in a portion of the picture-frame region that is adjacent a side opposite the side along which the first terminal is provided for receiving the data signal, a source line of the source line group that is divided by the non-display region may be supplied with the data signal through the side of the display region opposite the side adjacent the first terminal via the third terminal.

In the eleventh arrangement, the active-matrix substrate includes a plurality of gate line driving units for each gate line and includes a non-display region between the plurality of gate line driving units. Further, the active-matrix substrate includes third terminals in the portion of the picture-frame region that is adjacent the side of the substrate opposite the side along which the first terminals are provided. The source lines divided by the non-display region receive data signals from the side thereof opposite that with the first terminals via the third terminals. Even if a non-display region is provided that divides source lines, data signals may be supplied to the divided source lines via the third terminals. Further, since no source line in another column needs to be routed around toward the non-display region or no detour line needs to be provided for connecting the source lines divided by the non-display region, thereby reducing the parasitic capacitance of the source lines. Further, since a non-display region is provided between gate line driving units for the gate lines, the gate lines divided by the non-display region may be switched to the selected or non-selected state by one of the gate line driving units. Thus, an image can be displayed properly even if a non-display region divides gate lines and source lines.

Starting from the eleventh arrangement, a twelfth arrangement may include a plurality of non-display regions located in the display region, and the gate lines and source lines that cross at one non-display region may be different from the gate lines and source lines that cross at another non-display region.

In the twelfth arrangement, the active-matrix substrate includes a plurality of non-display regions in the display region and the gate lines and source lines that cross at one non-display region are different from those that cross at another non-display region. Thus, the gate lines divided by the non-display regions can be switched to the selected or non-selected state by one of the gate line driving circuits provided for the gate lines, and the source lines divided by the non-display regions are supplied with data signals from the first or third terminals, thereby ensuring that an image is displayed in portions of the display region near the non-display regions.

A method of manufacturing an active-matrix substrate according to an embodiment of the present invention includes: a forming step for forming a first active-matrix substrate including the steps of producing a plurality of gate lines having substantially the same length and spaced apart at a regular interval, producing a plurality of source lines having substantially the same length and spaced apart at a regular interval to cross the gate lines, and producing a gate line driving unit in a display region having the gate lines and the source lines for providing a selection signal for switching its associated gate line to a selected or non-selected state; and a removal step for producing a second active-matrix substrate by removing a part of the first active-matrix substrate such that at least one of the plurality of gate lines in the first active-matrix substrate has a length smaller than the maximum value of a width of the display region measured in a direction in which the gate lines extend (thirteenth arrangement). The steps in the forming step are not limited to this order and may be in other orders.

In the thirteenth arrangement, a first active-matrix substrate having a generally rectangular display region is produced by the forming step. In the removal step, a part of the first active-matrix substrate is removed to produce a second active-matrix substrate in which at least some gate lines have a length smaller than the maximum value of the width of the display region in the direction in which the gate lines extend. Since the gate line driving units are provided in the display region, the gate lines can be switched to the selected or non-selected state even though the gate lines have different lengths. This makes it easier to produce a second active-matrix substrate with a sophisticated design from a first active-matrix substrate having a generally rectangular display region without taking into consideration how to route lines between the gate line driving units and the gate lines.

In a fourteenth arrangement, starting from the thirteenth arrangement, the step of producing a gate line driving unit may include: the step of producing first gate line driving circuits for the associated gate lines for providing the selection signal to the gate lines; and the step of producing second gate line driving circuits provided for some of the gate lines that are adjacent to each other for providing the selection signal to the gate lines, the fourteenth arrangement may further include a cutting step for cutting the first active-matrix substrate along a gate line between the portion in which the second gate line driving circuits are present and the portion in which the second gate line driving circuits are not present, and the removal step may occur after the cutting step.

In the fourteenth arrangement, during the step of producing gate line driving units, a first gate line driving circuits for the associated gate lines are produced, and second gate line driving circuits for some gate lines adjacent to each other are produced. The removal step occurs after the cutting step has cut the active-matrix substrate along a gate line between the area in which the second gate line driving circuits are provided and the area in which no second gate line driving circuit is provided. Thus, cutting the first active-matrix substrate by the cutting step as necessary provides a second active-matrix substrate with a smaller number of pixels than the first active-matrix substrate, thereby improving efficiency at the manufacturing line and reducing manufacturing costs compared with implementations where active-matrix substrates are manufactured depending on display size (pixel number). Further, cutting the first active-matrix substrate may provide a plurality of second active-matrix substrates useful as display devices.

In a fifteenth arrangement, starting from the fourteenth arrangement, the step of producing a gate line driving unit may include the step of producing a plurality of pairs of first gate line driving circuits and second driving circuits, the fifteenth arrangement may further include the step of cutting along a source line between the plurality of pairs, and the removal step may occur after the cutting step and the step of cutting.

In the fifteenth arrangement, the step of producing gate line driving units produces a plurality of pairs of first gate line driving circuits and second gate line driving circuits. Then, the first active-matrix substrate is cut along a source line between the pairs, and, after the cutting and the cutting step, the removal step occurs. Thus, at least four second active-matrix substrates may be produced from a first active-matrix substrate.

In a sixteenth arrangement, starting from the thirteenth arrangement, the step of producing a gate line driving unit may produce a plurality of gate line driving units for the associated gate lines, the sixteenth arrangement may further include a cutting step for cutting along a source line between the plurality of gate line driving units, and the removal step may occur after the cutting step.

In the sixteenth arrangement, during the step of producing the gate line driving units, a plurality of gate line driving units are produced for the associated gate lines, and, after the cutting step cuts the substrate along a source line between gate line driving units, the removal step occurs. Thus, as the cutting step cuts the first active-matrix substrate as necessary, a second active-matrix substrate with a smaller number of pixels than the first active-matrix substrate is provided. This improves efficiency at the manufacturing line compared with implementations where active-matrix substrates are manufactured depending on the size (pixel number) of displays, thereby reducing manufacturing costs.

A method of manufacturing an active-matrix substrate according to an embodiment of the present invention includes: a forming step for forming a first active-matrix substrate including the steps of producing, in associated regions of a substrate, a plurality of gate lines having substantially the same length and spaced apart at a regular interval, producing, in the associated regions, a plurality of source lines having substantially the same length and spaced apart at a regular interval to cross the gate lines, producing terminals for the associated regions for supplying a data signal to the source lines in the associated regions, and producing, in each region, a gate line driving unit in a display region having the gate lines and the source lines for providing a selection signal for switching its associated gate line to a selected or non-selected state; a cutting step for cutting the first active-matrix substrate provided by the forming step along a source line between the regions; and a removal step for producing a second active-matrix substrate by removing a part each of active-matrix substrates provided by the cutting in the cutting step such that at least one of the gate lines in each of the active-matrix substrates has a length smaller than the maximum value of a width of the display region measured in a direction in which the gate lines extend (seventeenth arrangement).

In the seventeenth arrangement, the forming step produces a first active-matrix substrate having gate lines and source lines in associated regions of a substrate, terminals for supplying data signals to the source lines and gate line driving units for driving the gate lines. Further, the removal step removes a portion of the active-matrix substrate obtained by the cutting step that cuts the first active-matrix substrate between some regions thereof such that at least some gate lines have a length that is smaller than the maximum value of the width of the display region measured in the direction in which the gate lines extend. As the first active-matrix substrate is cut between some regions thereof, the gate lines on the active-matrix substrate after the cutting can be switched to the selected or non-selected state by gate line driving units provided on the gate lines, and data signals can be supplied, via the terminals provided for the source lines, to the source lines on the active-matrix substrate after the cutting. Thus, an image can be displayed by pixels on the active-matrix substrate after the cutting. Further, since the gate line driving units are provided for the gate lines in the display regions of the active-matrix substrate as having been cuts, the gate lines can be switched to the selected or non-selected state even if the gate lines have different lengths. This makes easier to produce a second active-matrix substrate with a sophisticated design from an active-matrix substrate as having been cut without taking into consideration how to route lines between the gate line driving units and the gate lines.

A display panel according to an embodiment of the present invention includes: the active-matrix substrate according to any one of the first to twelfth arrangements; an opposite substrate including a color filter and a common electrode; and a liquid crystal layer sandwiched between the active-matrix substrate and the opposite substrate (eighteenth arrangement).

In the eighteenth arrangement, the active-matrix substrate includes a gate line group including gate lines with a length that is smaller than the maximum value of the width of the active-matrix substrate measured in the first direction, and a source line group crossing the gate lines. Each gate line is selected, one after another, by a gate line driving unit provided in the display region in response to a control signal supplied by second terminals provided in the portion of the picture-frame region that is adjacent one side of the substrate, and each source line is supplied with a data signal by first terminals provided along the same side as the second terminals. Thus, even if there are areas having gate lines with a length smaller than the maximum value of the width of the active-matrix substrate in the first direction, the lines and the like for connecting the gate line driving units with the gate lines do not have to be provided along the picture-frame region. Further, since data signals and control signals are supplied to the source lines and gate line driving units from the portion of the picture-frame region that is adjacent one side of the substrate, the size of the picture-frame region portions adjacent the other sides can be reduced. This improves the freedom of design, such as the freedom in designing the active-matrix substrate.

Now, embodiments of the present invention will be described in detail with reference to the drawings. The same or corresponding components in the drawings are labeled with the same characters and their description will not be repeated.

<First Embodiment>

(Construction of Liquid Crystal Display Device)

FIG. 1 is a schematic plan view of a liquid crystal display device according to the present embodiment. The liquid crystal display device 1 includes a display panel 2, a source device 3, a display control circuit 4, and a power supply 5. The display panel 2 includes an active-matrix substrate 20a, a counter-substrate 20b, and a liquid crystal layer (not shown) sandwiched between these substrates. Although not shown in FIG. 1, a polarizer is provided on the lower side of the active-matrix substrate 20a and another polarizer is provided on the upper side of the counter-substrate 20b. On the counter-substrate 20b are provided: a black matrix, red (R), green (G) and blue (B) color filters, and a common electrode (all not shown).

As shown in FIG. 1, the portion of the display panel 2 that is at the uppermost on paper, to the left and right, is arc-shaped. The active-matrix substrate 20a of the display panel 2 is electrically connected with the source driver 3. The display control circuit 4 is electrically connected with the display panel 2, source driver 3 and power supply 5. The display control circuit 4 provides control signals to the source driver 3 and gate drivers (examples of gate line driving units), described below, provided on the active-matrix substrate 20a. Examples of control signals include reset signals (CLR) for displaying an image on the display panel 2, clock signals (CKA, CKB) and data signals. The power supply 5 is electrically connected with the display panel 2, source driver 3 and display control circuit 4 for supplying power supply voltage signals thereto.

(Construction of Active-Matrix Substrate)

Figure 2:
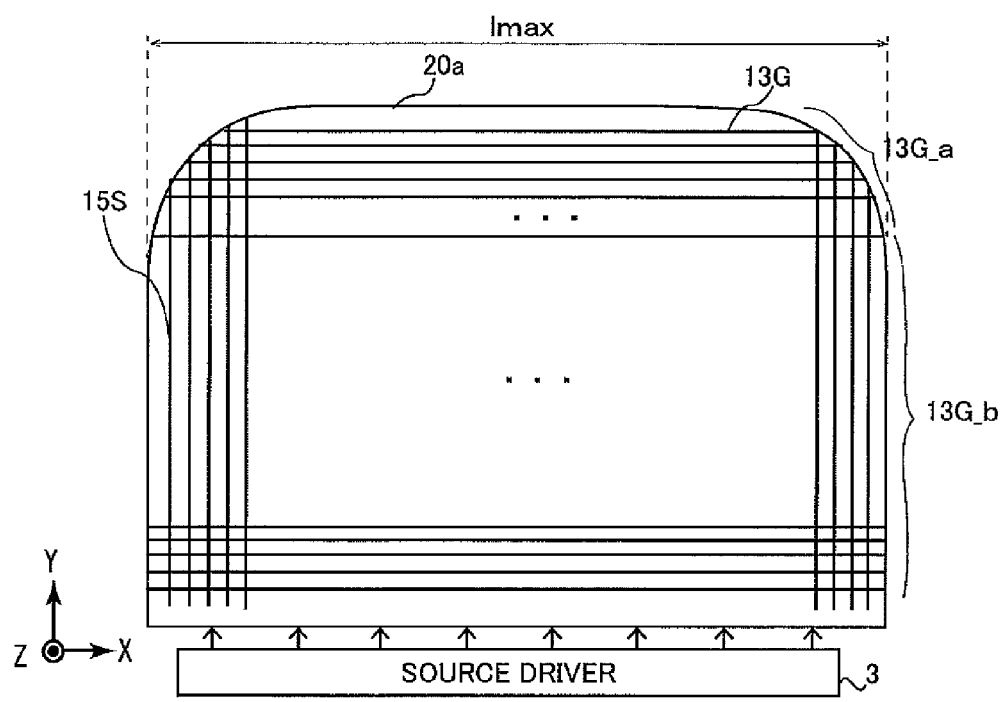
FIG. 2 is a schematic view of the active-matrix substrate according to the first embodiment.

FIG. 2 is a schematic plan view of the active-matrix substrate 20a. As shown in FIG. 2, the left and right portions of the active-matrix substrate 20a as measured in the positive Y-direction are arc-shaped. On the active-matrix substrate 20a are provided a group of gate lines 13G extending from one end to the other end of the substrate disposed in the X-direction, separated at a regular interval and generally parallel to each other. Some gate lines 13G_a of the gate line 13G group, located adjacent the arc-shaped portions, have a length that is smaller than the maximum value lmax of the width of the active-matrix substrate 20a as measured in the X-direction, and the other gate lines 13G_b have a length that is substantially equal to the maximum value lmax.

Further, as shown in FIG. 2, a group of source lines 15S are provided to cross the group of gate lines 13G. The region defined by a gate line 13G and source line 15S forms one pixel, and all the pixel regions form the display region of the display panel 2.

Figure 3:
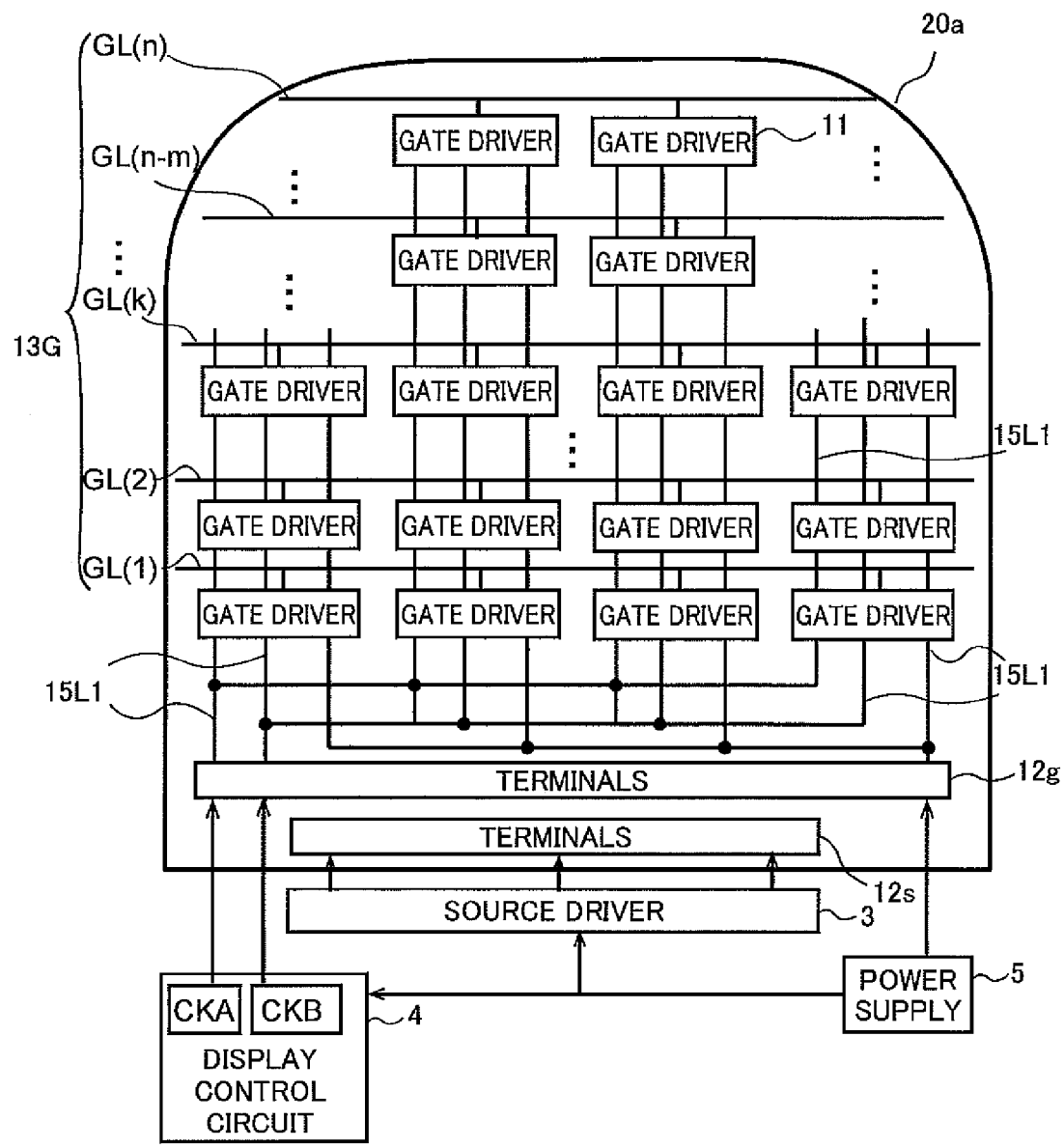
FIG. 3 is a schematic view of the active-matrix substrate according to the first embodiment.

FIG. 3 is a schematic plan view of the active-matrix substrate 20a without the source lines 15S and components connected with the active-matrix substrate 20a. As shown in the implementation of FIG. 3, gate drivers 11 are provided between gate lines 13G, i.e. in the display region. In this implementation, four gate drivers 11 are connected with each of the gate lines 13G: GL(1) to GL(k), and two gate drivers 11 are connected with each of the gate lines 13G: GL(n−m) to GL(n).

Terminals 12g (i.e. second terminals) are provided in the portion of the picture-frame region along that side of the display region of the active-matrix substrate 20a that the source driver 3 adjoins. The terminals 12g are connected with the control circuit 4 and power supply 5. The terminals 12g receive signals such as control signals (CKA, CKB) and power supply voltage signals provided by the control circuit 4 and power supply 5. The signals such as control signals (CKA, CKB) and power supply voltage signals supplied to the terminals 12g are supplied to the gate drivers 11 via the lines 15L1. Each gate driver 11, in response to a supplied signal, provides a selection signal indicating the selected or non-selected state to the gate line 13G to which it is connected, and provides a set signal to the gate line 13G of the subsequent row. In the following description, the operation of providing a selection signal to one gate line 13G may be referred to as driving of the gate line 13G.

Further, terminals 12s (i.e. first terminals) connecting the source driver 3 with the source lines 15S are provided on the portions of the picture-frame region of the active-matrix substrate 20a that are located along the side thereof that the source driver 3 adjoins. In response to control signals supplied by the display control circuit 4, the source drivers 3 provide data signals to the source lines 15S (see FIG. 2).

As shown in FIG. 3, in the present embodiment, in the display region, a plurality of gate drivers 11 are connected with each of the gate lines 13G: GL(1) to GL(n). The gate drivers 11 connected with one and the same gate line 13G are synchronized, and set signals provided by these gate drivers 11 simultaneously drive one gate line 13G. In the present embodiment, the gate drivers 11 are connected with the gate lines 13G and separated substantially by the same distance such that the load on each of the gate drivers 11 driving one gate line 13G is substantially the same.

(Construction of Gate Driver 11)

Figure 4:
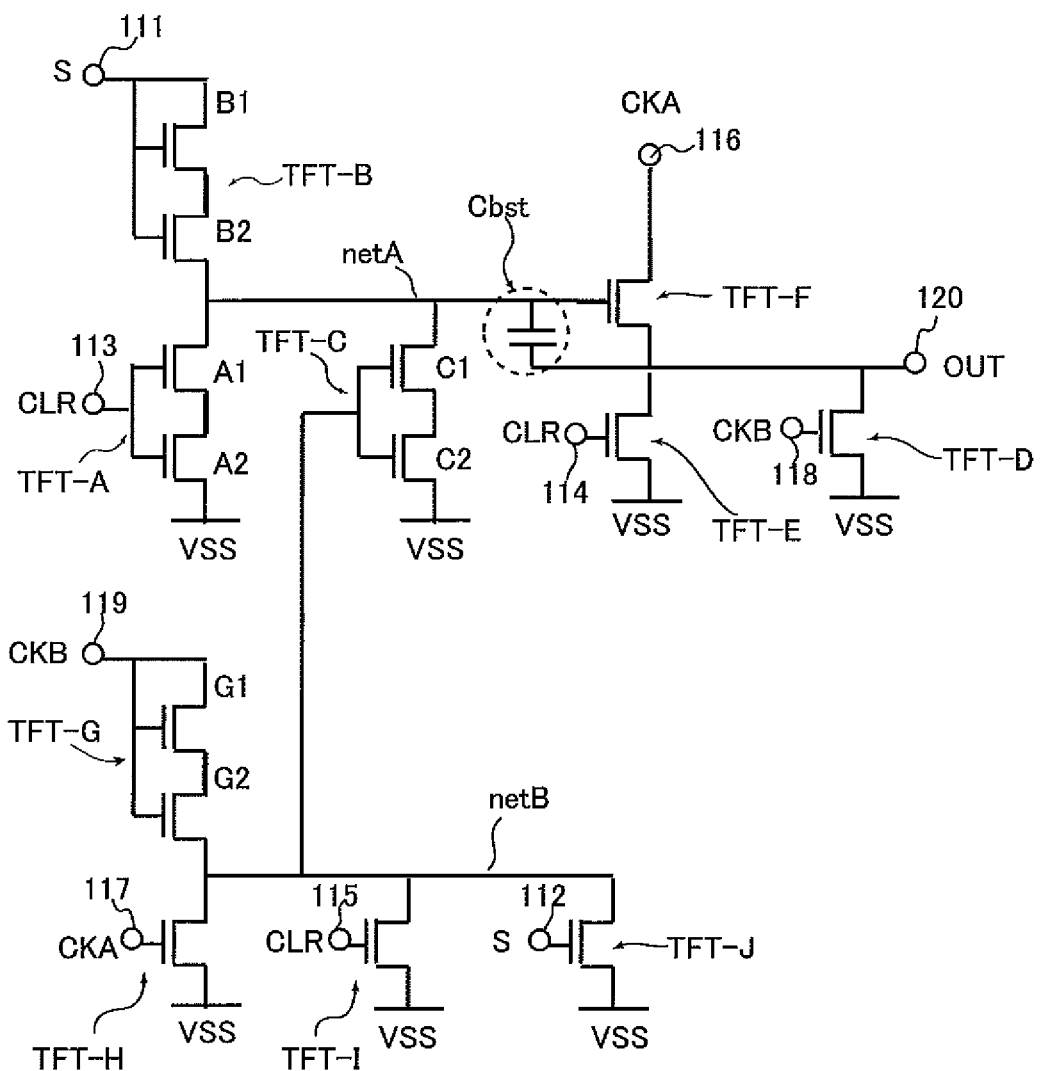
FIG. 4 is an example equivalent circuit of a gate driver according to the first embodiment.

The construction of the gate drivers 11 of the present embodiment will be described below. FIG. 4 shows an example of an equivalent circuit of one gate driver 11 located between gate lines 13G: GL(n−1) and GL(n−2) for driving the gate line 13G: GL(n−1). As shown in FIG. 4, the gate driver 11 includes a TFT-A to TFT-J constituted by thin-film transistors (TFT) that serve as switching elements, a capacitor Cbst, terminals 111 to 120, and terminals for receiving low-level power supply voltage signals.

The terminals 111 and 112 each receive a set signal (S) via the gate line 13G of the preceding row GL(n−2). The terminals 111 and 112 of a gate driver 11 connected with the gate line 13G: GL(1) each receive a gate start pulse signal (S) provided by the display control circuit 4. The terminals 113 to 115 each receive a reset signal (CLR) provided by the display control circuit 4. The terminals 116 and 117 each receive a clock signal (CKA) supplied. The terminals 118 and 119 each receive a clock signal (CKB) supplied. The terminal 120 provides a set signal (OUT) to the gate line 13G of the subsequent row.

Figure 9:
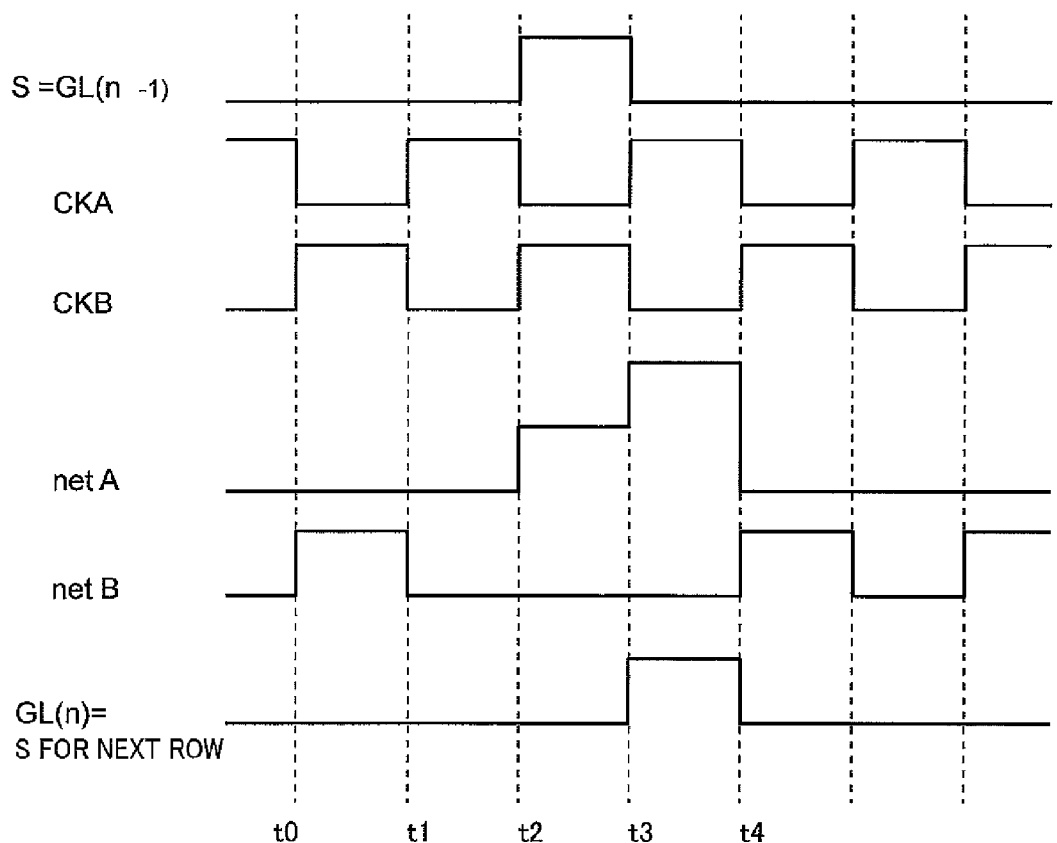
FIG. 9 is a timing chart showing signals encountered when the gate driver shown in FIG. 4 scans a gate line.

The clock signal (CKA) and clock signal (CKB) are two-phase clock signals whose phase is reversed at each horizontal scan interval (see FIG. 9). FIG. 4 shows a gate driver 11 for driving the gate line 13G: GL(n−1); in a gate driver 11 of the subsequent row for driving the line GL(n), the terminals 116 and 117 each receive a clock signal (CKB), and the terminals 118 and 119 of this gate driver 11 each receive a clock signal (CKA). That is, the terminals 116 and 117 and terminals 118 and 119 of a given gate driver 11 receive clock signals of the phase opposite that of clock signals received by the gate drivers 11 of the adjacent lines.

In FIG. 4, the line to which the source terminal of the TFT-B, the drain terminal of the TFT-A, the source terminal of the TFT-C and the gate terminal of the TFT-F are connected will be referred to as "netA". The line to which the gate terminal of the TFT-C, the source terminal of the TFT-G, the drain terminal of the TFT-H, the source terminal of the TFT-I and the source terminal of the TFT-J are connected will be referred to as "netB".

The TFT-A is composed of two TFTs (A1, A2) connected in series. The gate terminals of the TFT-A are connected with the terminal 113, the drain terminal of the element A1 is connected with the netA, the source terminal of the element A2 is connected with the power supply voltage terminal VSS.

The TFT-B is composed of two TFTs (B1, B2) connected in series. The gate terminals of the TFT-B and the drain terminal of the element B1 are connected with the terminal 111 (which constitutes a diode connection), and the source terminal of the element B2 is connected with the netA.

The TFT-C is composed of two TFTs (C1, C2) connected in series. The gate terminals of the TFT-C are connected with the netB, the drain terminal of the element C1 is connected with the netA, and the source terminal of the element C2 is connected with the power supply voltage terminal VSS.

The capacitor Cbst has one electrode connected with the netA and the other electrode connected with the terminal 120.

The TFT-D has a gate terminal connected with the terminal 118, a drain terminal connected with the terminal 120 and a source terminal connected with the power supply voltage terminal VSS.

The TFT-E has a gate terminal connected with the terminal 114, a drain terminal connected with the terminal 120 and a source terminal connected with the power supply voltage terminal VSS.

The TFT-F has a gate terminal connected with the netA, a drain terminal connected with the terminal 116 and a source terminal connected with the output terminal 120.

The TFT-G is composed of two TFTs (G1, G2) connected in series. The gate terminals of the TFT-G and the drain terminal of the element G1 are connected with the terminal 119 (which constitutes a diode connection), and the source terminal of the element G2 is connected with the netB.

The TFT-H has a gate terminal connected with the terminal 117, a drain terminal connected with the netB and source terminal connected with the power supply voltage terminal VSS.

The TFT-I has a gate terminal connected with the terminal 115, a drain terminal connected with the netB and a source terminal connected with the power supply voltage terminal VSS.

The TFT-J has a gate terminal connected with the terminal 112, a drain terminal connected with the netB and a source terminal connected with the power supply voltage terminal VSS.

(Overall Layout of Gate Drivers)

Figure 5A:
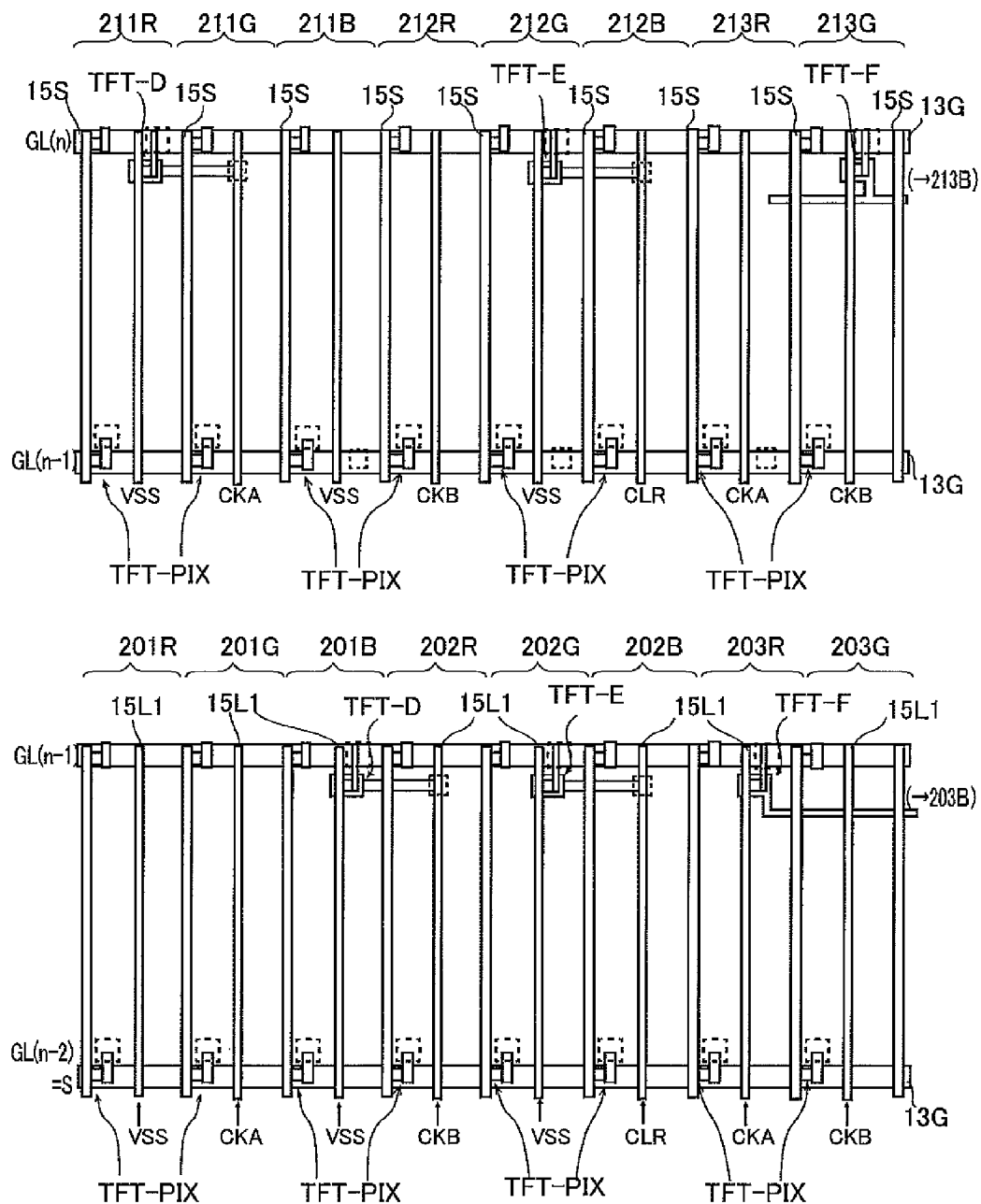
FIG. 5A is a view of an example arrangement of gate drivers according to the first embodiment.
Figure 5B:
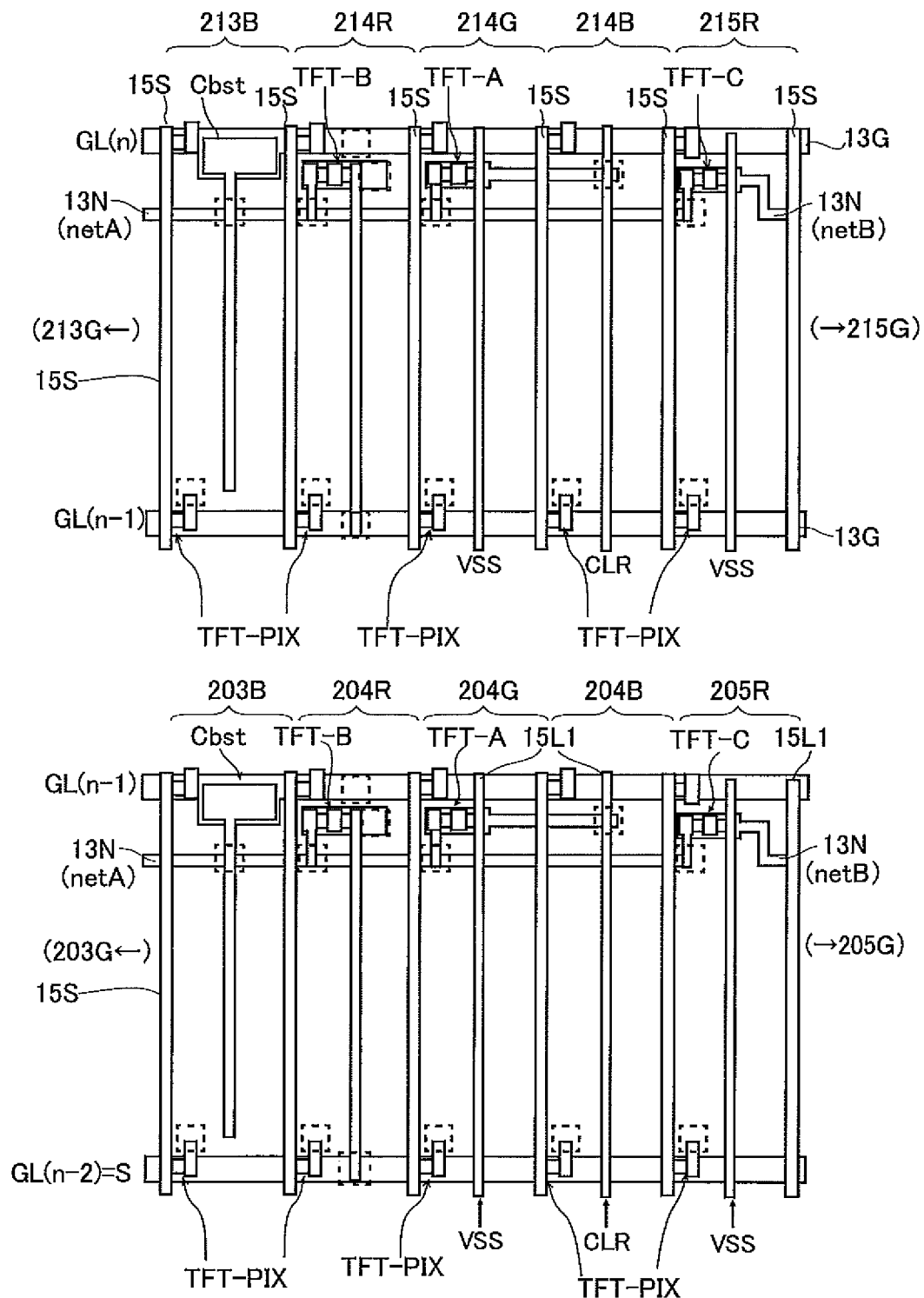
FIG. 5B is a view of an example arrangement of gate drivers according to the first embodiment.
Figure 5C:
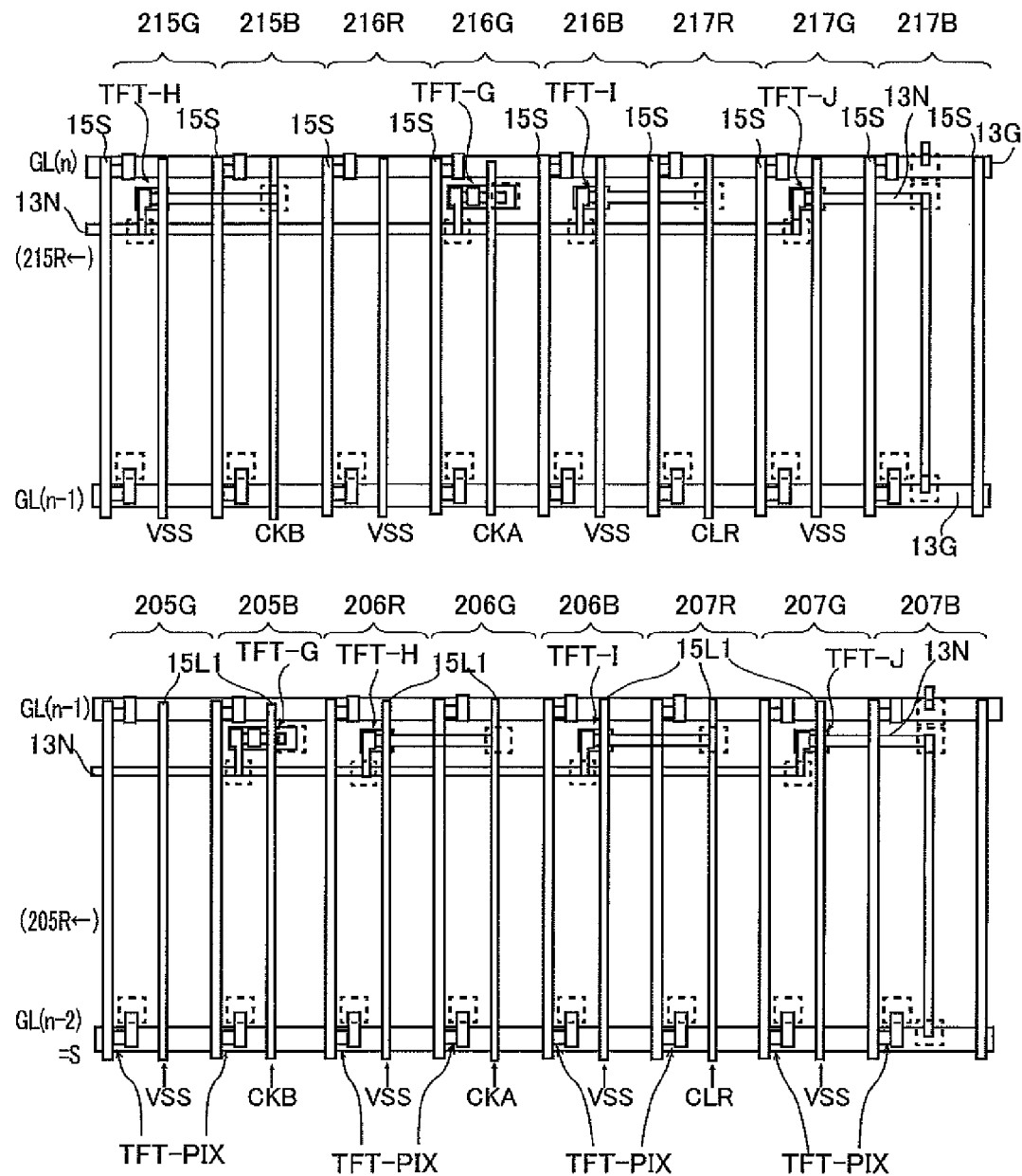
FIG. 5C is a view of an example arrangement of gate drivers according to the first embodiment.

Now, how various elements of gate drivers 11 are disposed in the display region will be described. FIGS. 5A to 5C show how one gate driver 11 located between the gate lines 13G: GL(n) and GL(n−1) and another one located between the gate lines 13G: GL(n−1) and GL(n−2) may be disposed. For convenience, FIGS. 5A to 5C show the pixel regions 211R to 217B between the rows GL(n) and GL(n−1) separated from the pixel regions 201R to 207B between the rows GL(n−1) and GL(n−2); in reality, the rows of pixel regions overlap each other at the gate line 13G: GL(n−1) and the upper row of pixel regions and the lower row of pixel regions are continuous. R, G and B contained in reference characters indicating pixel regions each indicate the color of a color filter (not shown) provided on the counter-substrate 20b.

As shown in FIG. 5A to 5C, in the row of pixel regions 211R to 217B (hereinafter referred to as upper pixel region row) and the row of pixel regions 201R to 207B (hereinafter referred to as lower pixel region row), image displaying TFTs for displaying an image (hereinafter referred to as TFT-PIX) are each located near the intersection of a source line 15S and gate line 13G.

In the upper and lower pixel region rows, a gate driver 11 is composed of distributed elements (i.e. one of the TFT-A to TFT-J and capacitor Cbst). A pixel region that includes a switching element (i.e. TFT-A, C to F, H to J, and Cbst) that receives one of clock signals (CKA, CKB), a reset signal (CLR) and a power supply voltage signal has a line 15L1 provided therein for supplying such a signal. Lines 15L1 extend generally parallel to the source lines 15S through the upper and lower pixel region rows. Further, lines 13N for the netA and netB are provided in the upper and lower pixel region rows. Each of the lines 13N extends through the upper and lower pixel region rows and generally parallel to the gate lines 13G and through pixel regions in which elements connected with the netA and netB (i.e. TFT-A to C, F, G to J, and Cbst) are disposed.

In the present embodiment, the TFTs are arranged such that the clock signals supplied to the TFT-D, TFT-F, TFT-H and TFT-G of a gate driver 11 have a phase opposite that of the clock signals supplied to such TFTs of a gate driver 11 in an adjacent row. That is, the TFT-D, TFT-F, TFT-H and TFT-G are positioned in pixel regions that are horizontally displaced from the pixel regions in which such TFTs of an adjacent row are provided.

More specifically, as shown in FIG. 5A, the TFT-D of the upper pixel region row is located in the pixel regions 211R and 211G while the TFT-D of the lower pixel region row is located in the pixel regions 201B and 202R. The TFT-F of the upper pixel region row is located in the pixel region 213G while the TFT-F of the lower pixel region row is located in the pixel region 203R. Further, as shown in FIG. 5C, the TFT-H of the upper pixel region row is located in the pixel regions 215G and 215B while the TFT-H of the lower pixel region row is located in the pixel regions 206R and 206G. The TFT-G of the upper pixel region row is located in the pixel region 216G while the TFT-G of the lower pixel region row is located in the pixel region 205B. Thus, a clock signal (CKA) is supplied to the TFT-D of the upper pixel region row while a clock signal (CKB) with a phase opposite that of the clock signal (CKA) is supplied to the TFT-D of the lower pixel region row. The same applies to the TFT-F, TFT-H and TFT: as shown in FIGS. 5A and 5C, a clock signal (CKA or CKB) of one phase is supplied to the upper pixel region row, while a clock signal of the opposite phase is supplied to the lower pixel region row.

Further, the TFT-B and TFT-J of the upper pixel region row are connected with the gate line 13G: GL(n−1) while the TFT-B and TFT-J of the lower pixel region row are connected with the gate line 13G: GL(n−2). The TFT-D and TFT-F of the upper pixel region row are connected with the gate line 13G: GL(n) while the TFT-D and TFT-F of the lower pixel region row are connected with the gate line 13G: GL(n−1). The gate driver 11 located in the lower pixel region row receives a set signal (S) via the gate line 13G: GL(n−2) and, then, provides the set signal (S) to the gate line 13G: GL(n) and drives the gate line 13G: GL (n−1). The gate driver 11 located in the upper pixel region row receives a set signal (S) via the gate line 13G: GL(n−1) and, then, provides the set signal (S) to the gate line 13G: GL(n+1) and drives the gate line 13G: GL(n).

Figure 6:
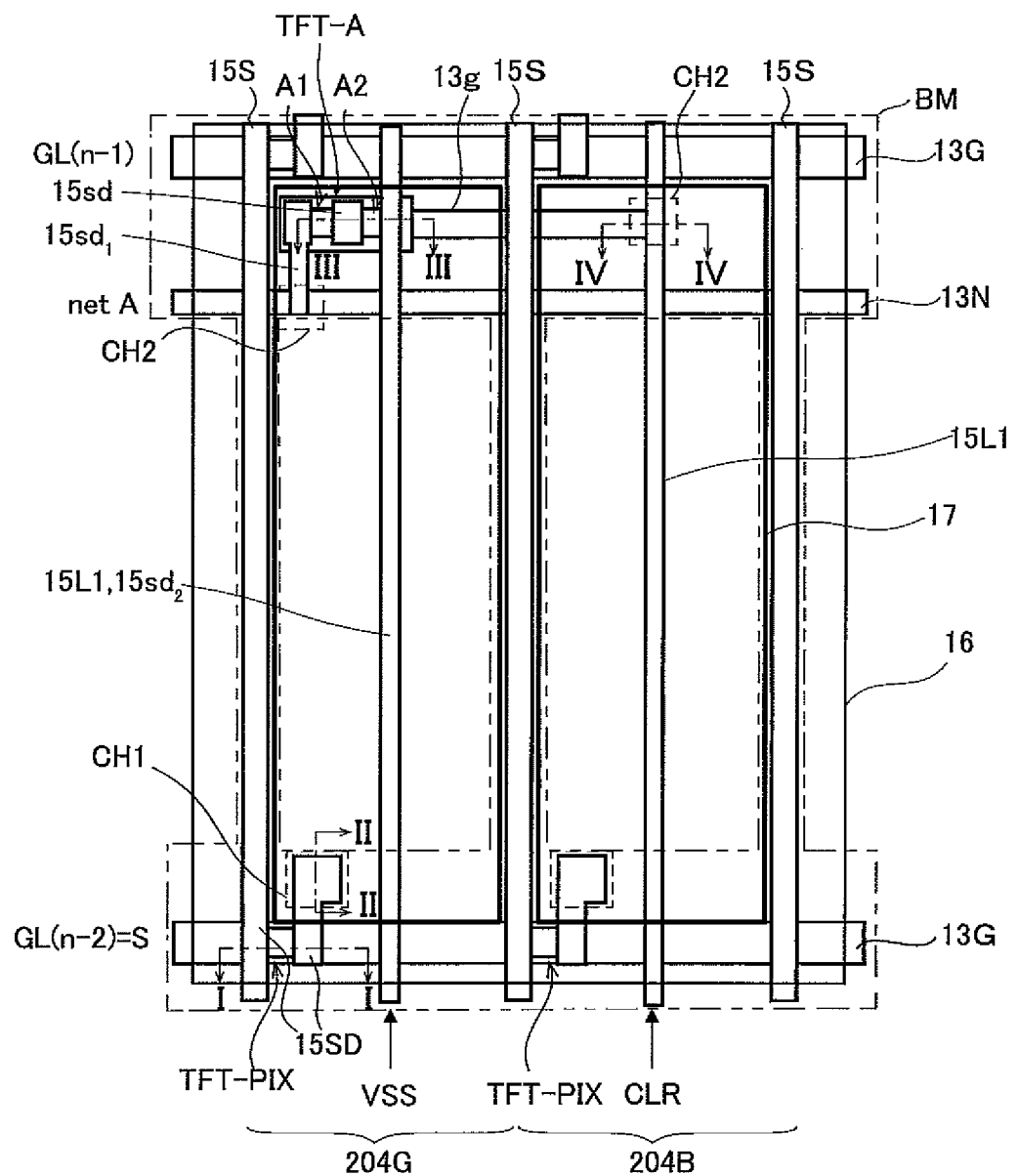
FIG. 6 is an enlarged plan view of the pixel region in which the TFT-A of FIG. 5B is provided.

How the elements constituting a gate driver 11 are connected will be described below. FIG. 6 is an enlarged plan view of the pixel regions 204G and 204B in which the TFT-A of FIG. 5B is provided. The TFT-A and TFT-H, I, and J are each constructed using two pixel regions and their elements are connected in the same manner; accordingly, the TFT-A will be described as an example. In FIG. 6, the region BM defined by two-dot chain lines is the region where light is blocked by a black matrix (not shown) provided on the counter-substrate 20b (hereinafter referred to as light-shielding region BM). The light-shielding region BM includes regions where the gate lines 13G, the elements constituting the gate driver 11 and the source lines 15S are located.

As shown in FIG. 6, a TFT-PIX for displaying an image is provided near the intersection of a gate line 13G and source line 15S. The TFT-PIX is connected with a pixel electrode 17 via a contact CH1. Further, in each pixel region, a line 15L1 is provided to extend generally parallel to the source lines 15S and cross the gate lines 13G. A power supply voltage signal (VSS) is supplied to the line 15L1 in the pixel region 204G, and a reset signal (CLR) is supplied to the line 15L1 of the pixel region 204B.

As shown in FIG. 6, the gate terminal 13g of the TFT-A is located in the pixel regions 204B to 204G. The line 13N is provided in the pixel regions 204G and 204B to cross the source lines 15S and lines 15L1 and generally parallel to the gate lines 13G. The line 13N constitutes the netA and netB, described above. The TFT-A is connected with the line 15L1 via the contact CH2 of the pixel region 204B and is connected with the line 13N via the contact CH2 of the pixel region 204G. Further, in the present embodiment, a shield layer 16 is provided between the pixel electrodes 17 and TFT-A, lines 13N and 15L1.

Figure 7A:
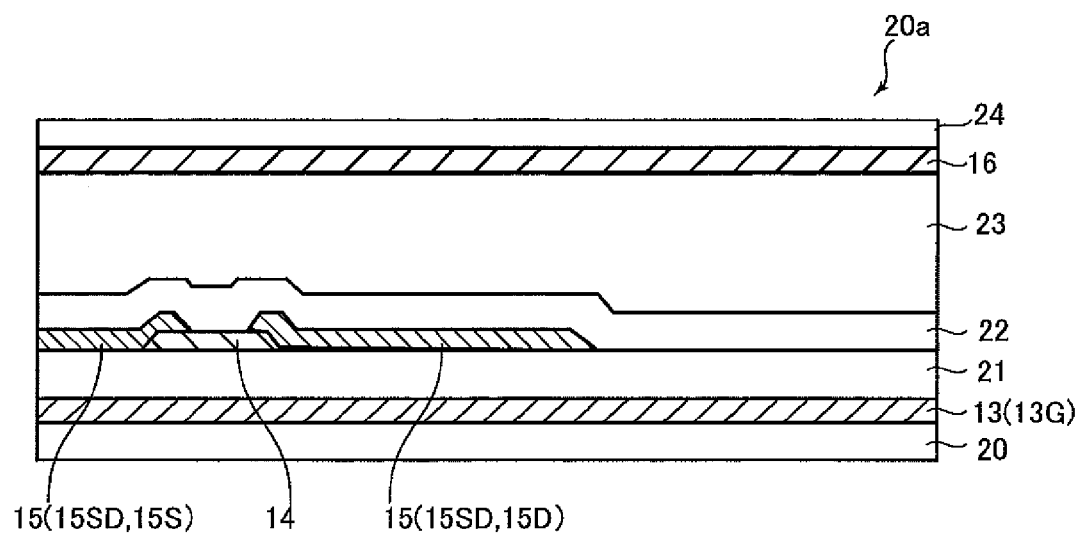
FIG. 7A is a cross-sectional view of a TFT-PIX of FIG. 6 taken along line I-I.
Figure 7B:
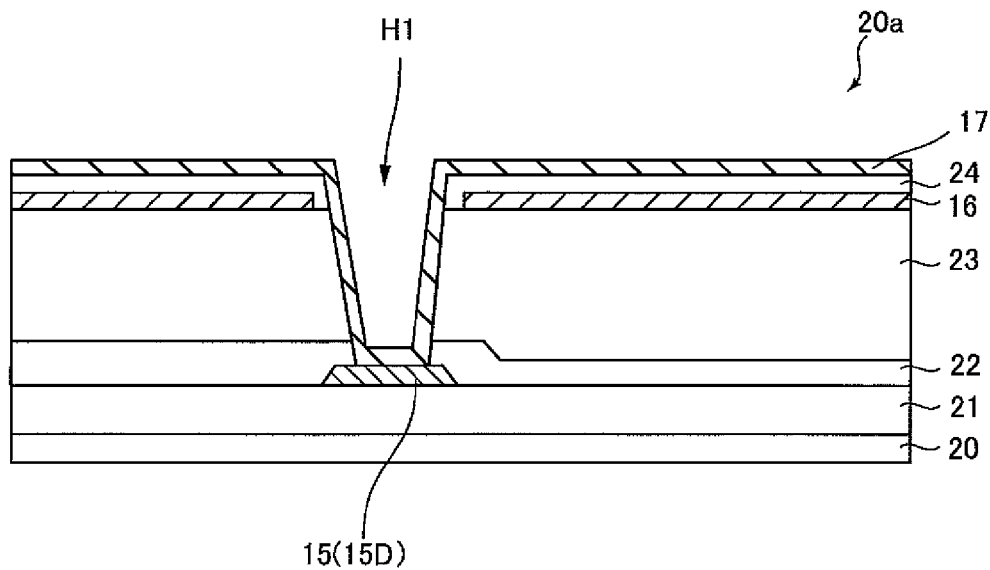
FIG. 7B is a cross-sectional view of the contact CH1 of FIG. 6 taken along line II-II.

FIG. 7A shows a cross-sectional view of a TFT-PIX of FIG. 6 taken along line I-I, while FIG. 7B shows a cross-sectional view of the contact CH1 taken along line II-II. Further, FIG. 7C shows a cross-sectional view of the TFT-A of FIG. 6 taken along line III-III, while FIG. 7D shows a cross-sectional view of the contact CH2 taken along line IV-IV.

Figure 7C:
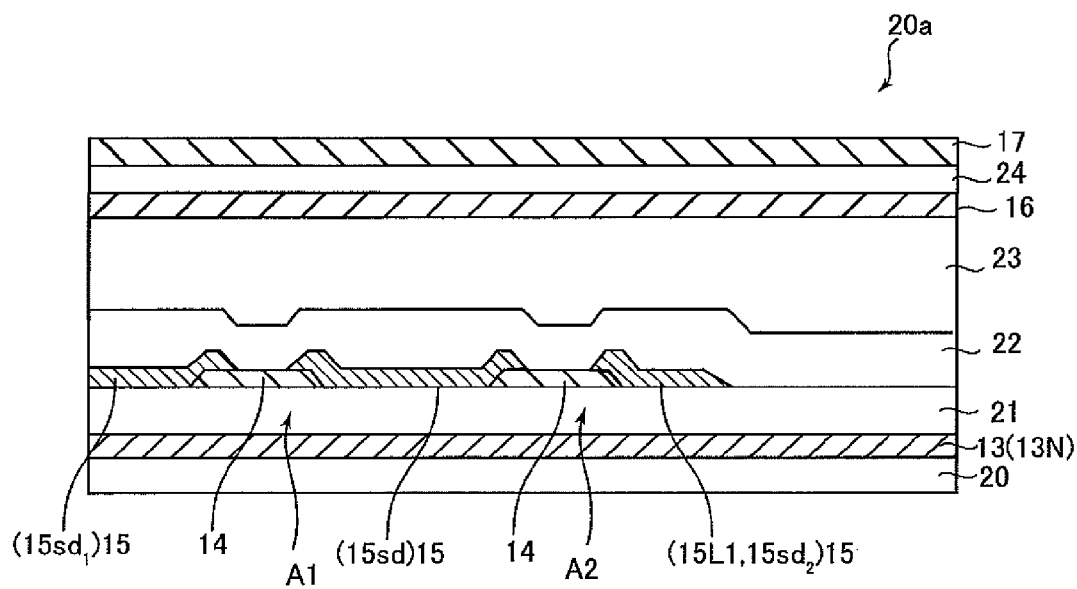
FIG. 7C is a cross-sectional view of the TFT-A of FIG. 6 taken along line III-III.
Figure 7D:
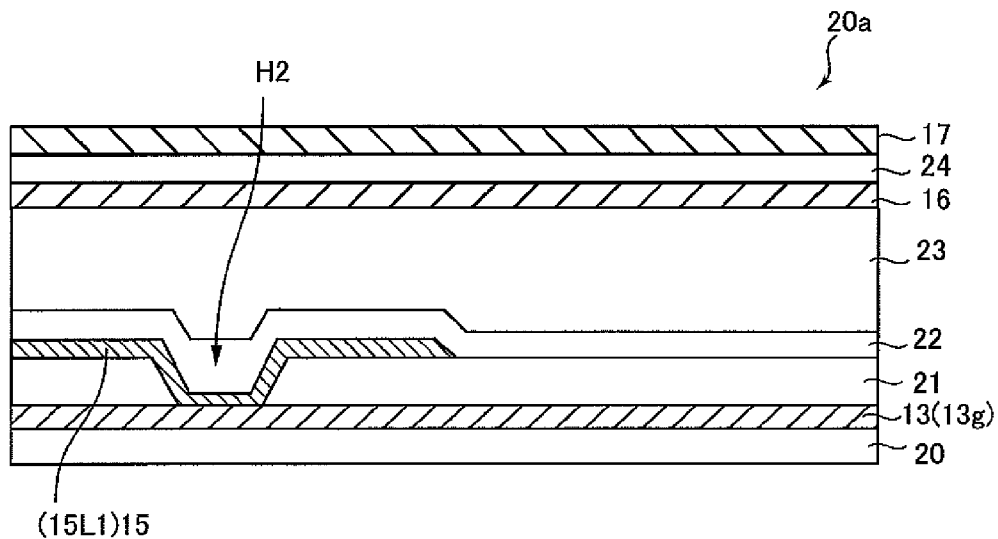
FIG. 7D is a cross-sectional view of the contact CH2 of FIG. 6 taken along line IV-IV.

As shown in FIGS. 7A, 7C and 7D, the gate line 13G, the gate terminal 13g of the TFT-A and the line 13N are formed as a gate line layer 13 is formed on the substrate 20. As shown in FIGS. 7A and 7C, a semiconductor layer portion 14 formed of an oxide semiconductor is provided on top of the gate line layer 13, with a gate insulating film 21 being present in between, in the areas where a TFT-PIX is to be formed and a TFT-A is to be formed. Further, above the substrate 20 which has the semiconductor layer portion 14 provided thereon is provided a source line layer 15 portions separated across the top of the semiconductor layer portion 14. Thus, as shown in FIGS. 7A to 7C, the source line 15S, the source-drain terminal 15SD of the TFT-PIX, the source-drain terminal $15sd$ (including $15sd_1$ and $15sd_2$) of the TFT-A and line 15L1 are formed.

As shown in FIG. 7D, at the contact CH2 of the pixel region 204B, a contact hole H2 is formed in the gate insulating film 21 to extend throughout to the surface of the gate line layer 13. The source line layer 15 (15L1) is provided on the gate insulating film 21 to contact the gate line layer 13 ($13g$) at the contact hole H2. Thus, the gate terminal $13g$ of the TFT-A is connected with the line 15L1 at the contact CH2 of the pixel region 204B. Similarly, at the contact CH2 of the pixel region 204G, the drain terminal $15sd_1$ of the element A1 of the TFT-A formed by the source line layer 15 is connected with the line 13N formed by the gate line layer 13. Thus, the TFT-A is connected with the netA, and a reset signal (CLR) is supplied through the line 15L1.

Further, as shown in FIGS. 7A to 7D, on top of the source line layer 15 are stacked a protection layer 22 and protection layer 23 to cover the source line layer 15. The protection layer 22 is formed of an inorganic insulating film such as $SiO_2$, for example. The protection layer 23 is formed of an organic insulating film such as a positive photosensitive resin film, for example. Further, as shown in FIGS. 7A and 7D, a shield layer 16 is provided on top of the protection layer 23. The shield layer 16 is formed of a transparent conductive film such as ITO, for example. Then, on top of the shield layer 16 is provided an interlayer insulating layer 24 formed of an inorganic insulating film such as $SiO_2$, for example. On top of the interlayer insulating layer 24 are provided pixel electrodes 17 formed of a transparent conductive film such as ITO, as shown in FIGS. 7C and 7D.

As shown in FIG. 7B, at the contact CH1, a contact hole H1 is provided above the drain terminal 15D of the TFT-PIX to extend through the interlayer insulating layer 24, shield layer 16 and protection layers 22 and 23. The pixel electrode 17 is provided on top of the interlayer insulating layer 24 to contact the drain terminal 15D in the contact hole H1. Forming the shield layer 16 forms a capacitance Cs between the pixel electrode 17 and shield layer 16, and the capacitance Cs stabilizes the potential of the pixel electrode 17.

Thus, the TFT-A and the line 13N and lines 15L1 connected with the TFT-A are located in two pixel regions, thereby reducing the decrease in the aperture ratio compared with implementations where they are located in one pixel region. Further, a shield layer 16 is provided between the pixel electrode 17 and the TFT-A, line 13N and lines 15L1, thereby reducing interference between the TFT-A or the like and the pixel electrode 17.

(TFT-B)

Figure 8A:
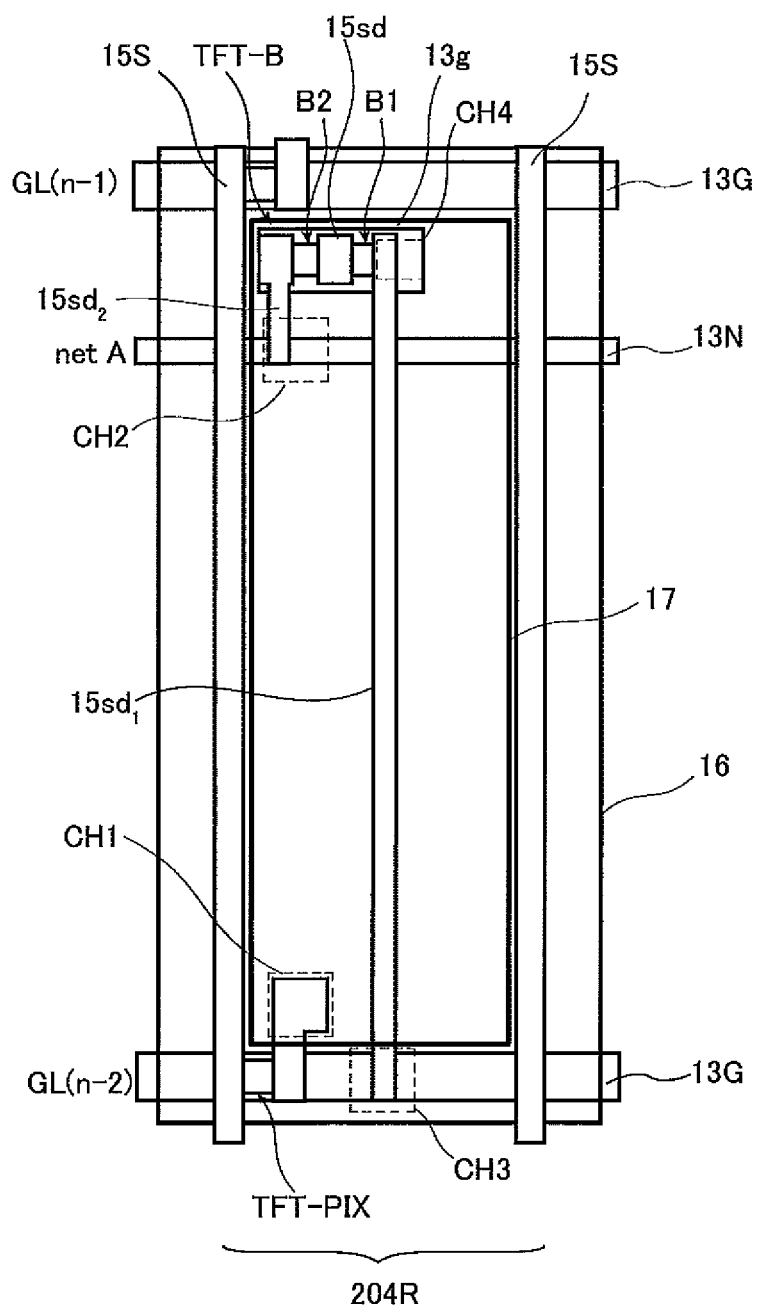
FIG. 8A is an enlarged plan view of the pixel region 204R of FIG. 5B.

How the TFT-B is connected will be described below. FIG. 8A is an enlarged plan view of the pixel region 204R of FIG. 5B. In FIG. 8A, the light-shielding region BM is not shown. As shown in FIG. 8A, in the pixel region 204R, as is the case in the pixel region 204G described above, a TFT-PIX is connected with a pixel electrode 17 at the contact CH1. Further, the source-drain terminal 15sd (including $15sd_1$ and $15sd_2$) of the TFT-B are formed by the source line layer 15. The gate terminal 13g of the TFT-B, the gate line 13G: GL(n-2) and line 13N are formed by the gate line layer 13.

The drain terminal $15sd_1$ of the element B1 crosses the gate line 13G: GL(n-2) and line 13N. At the contacts CH3 and CH4, as at the contact CH2 described above, a contact hole H2 is formed in the gate insulating film 21 for connecting the gate line layer 13 with the source line layer 15.

The drain terminal $15sd_1$ is connected with the gate line 13G: GL(n-2) via the contact CH3, and is connected with the gate terminal 13g via the contact CH4. The source terminal $15sd_2$ of the element B2 is connected with the line 13N via the contact CH2. Thus, the TFT-B is connected with the netA and receives a set signal (S) via the gate line 13G: GL (n-2).

(TFT-C)

Figure 8B:
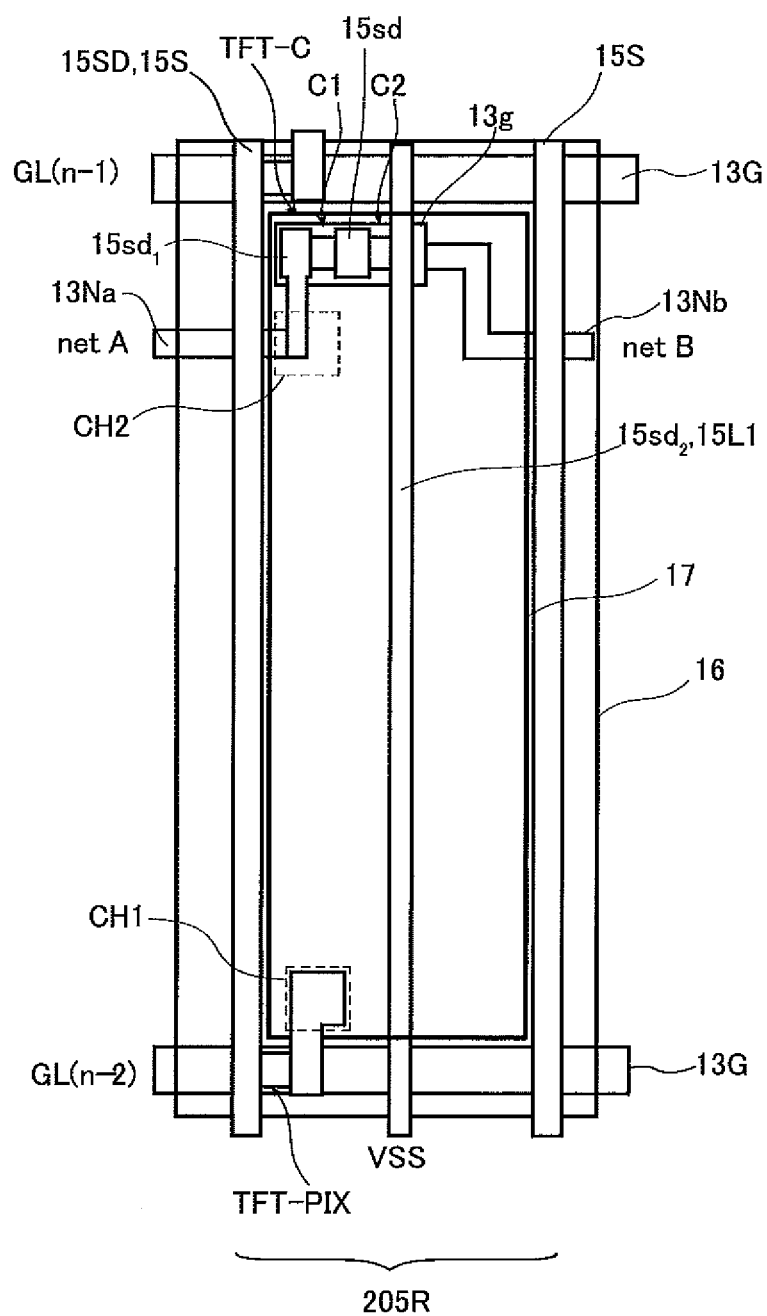
FIG. 8B is an enlarged plan view of the pixel region 205R of FIG. 5B.

How the TFT-C is connected will be described below. FIG. 8B is an enlarged plan view of the pixel region 205R of FIG. 5B. In FIG. 8B, the light-shielding region BM is not shown. As shown in FIG. 8B, in the pixel region 205R, as is the case in the pixel regions 204G and 204B described above, the TFT-PIX is connected with the pixel electrode 17 via the contact CH1. Further, the gate terminal 13g of the TFT-C, the gate line 13G and line 13N (13Na, 13Nb) are formed by the gate line layer 13. The source-drain terminal 15sd (including $15sd_1$ and $15sd_2$) of the TFT-C and line 15L1 are formed by the source line layer 15. The drain terminal $15sd_1$ of the element C1 is connected with the line 13Na via the contact CH2. The TFT-C is connected with the netA via the line 13Na, and is connected with the netB via the line 13Nb. Further, a power supply voltage signal (VSS) is supplied to the TFT-C via the line 15L1.

(TFT-F)

Figure 8C:
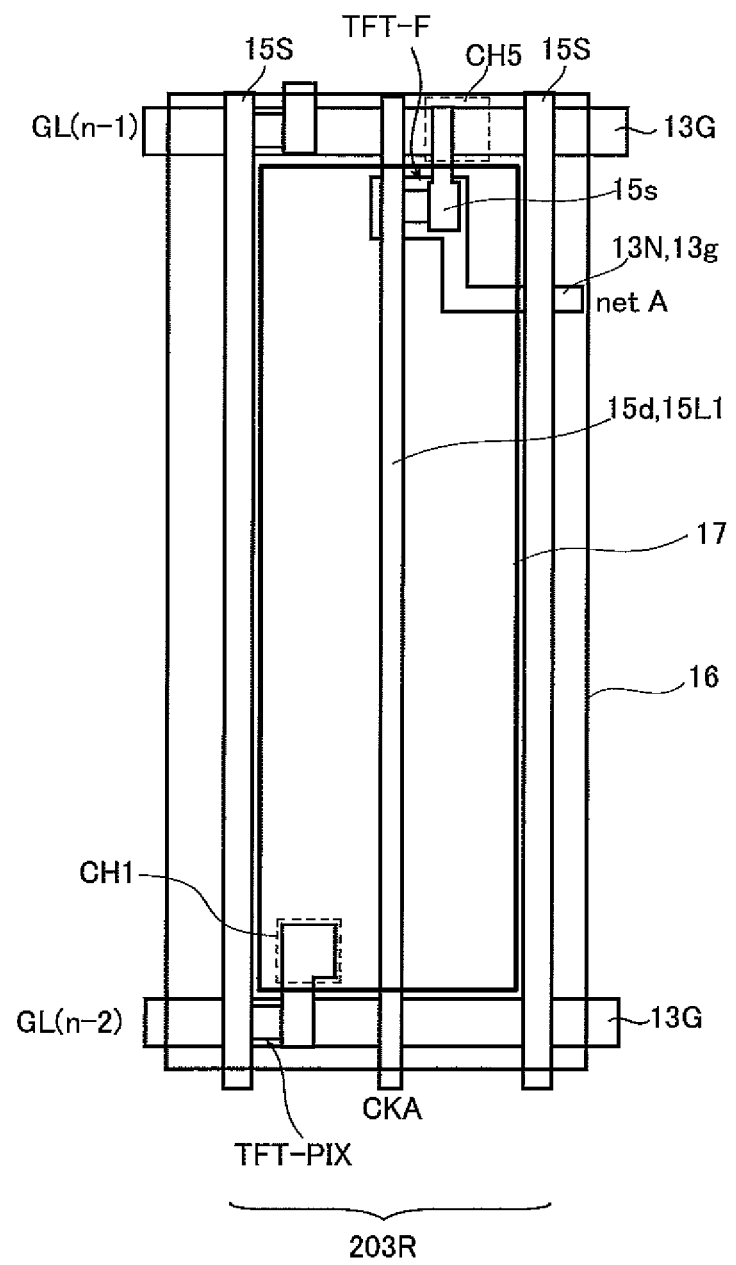
FIG. 8C is an enlarged plan view of the pixel region 203G of FIG. 5A.

How the TFT-F is connected will be described below. FIG. 8C is an enlarged plan view of the pixel region 203R of FIG. 5A. In FIG. 8C, the light-shielding region BM is not shown. As shown in FIG. 8C, in the pixel region 203R, as is the case in the pixel regions 204G and 204B, the TFT-PIX is connected with the pixel electrode 17 via the contact CH1. Further, the gate terminal 13g of the TFT-C, the gate line 13G and line 13N are formed by the gate line layer 13. The source terminal 15s of the TFT-F, the drain terminal 15d and line 15L1 are formed by the source line layer 15.

At the contact CH5, as at the contact CH2 described above, a contact hole H2 is provided for connecting the gate line layer 13 with the source line layer 15. The source terminal 15s of the TFT-F is connected with the gate line 13G: GL(n-1) via the contact CH5, and the gate terminal of the TFT-F is connected with the netA. A clock signal (CKA) is supplied to the drain terminal of the TFT-F via the line 15L1. Further, the TFT-F provides a set signal to the gate line 13G: GL(n-1) via the contact CH5.

(TFT-G)

Figure 8D:
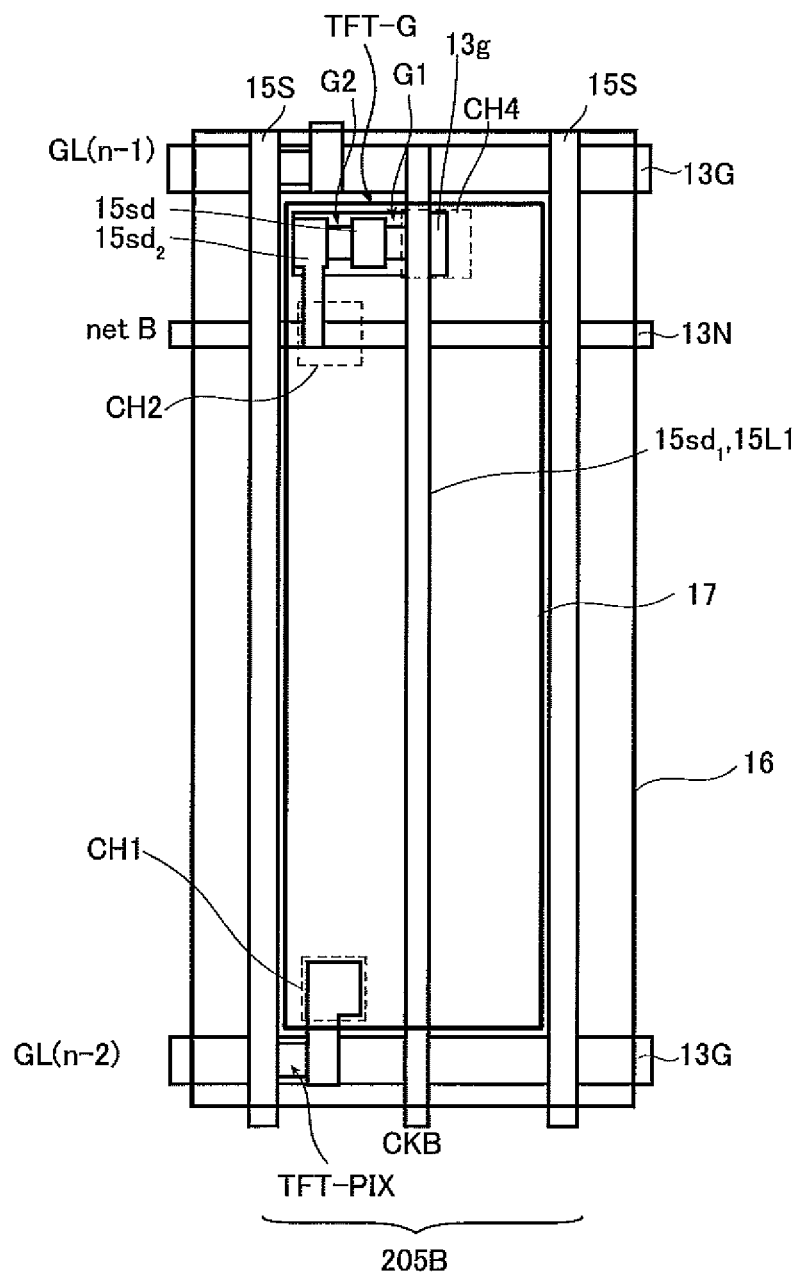
FIG. 8D is an enlarged plan view of the pixel region 205B of FIG. 5C.

How the TFT-G is connected will be described below. FIG. 8D is an enlarged plan view of the pixel region 205B of FIG. 5C. In FIG. 8D, the light-shielding region BM is not shown. As shown in FIG. 8D, in the pixel region 205B, as is the case in the pixel regions 204G and 204B, the TFT-PIX is connected with the pixel electrode 17 via the contact CH1. Further, the gate terminal 13g of the TFT-G, the gate line 13G and line 13N are formed by the gate line layer 13. The source-drain terminal 15sd (including $15sd_1$ and $15sd_2$) of the TFT-G and line 15L1 are formed by the source line layer 15. The source terminal $15sd_2$ of the element G2 of the TFT-G is connected with the line 13N via the contact CH2. The gate terminal 13g of the TFT-G is connected with the drain terminal $15sd_1$ of the element G1 and line 15L1 via the contact CH4. Thus, the TFT-G is connected with the netB, and a clock signal (CKB) is supplied thereto via the line 15L1.

(Cbst)

Figure 8E:
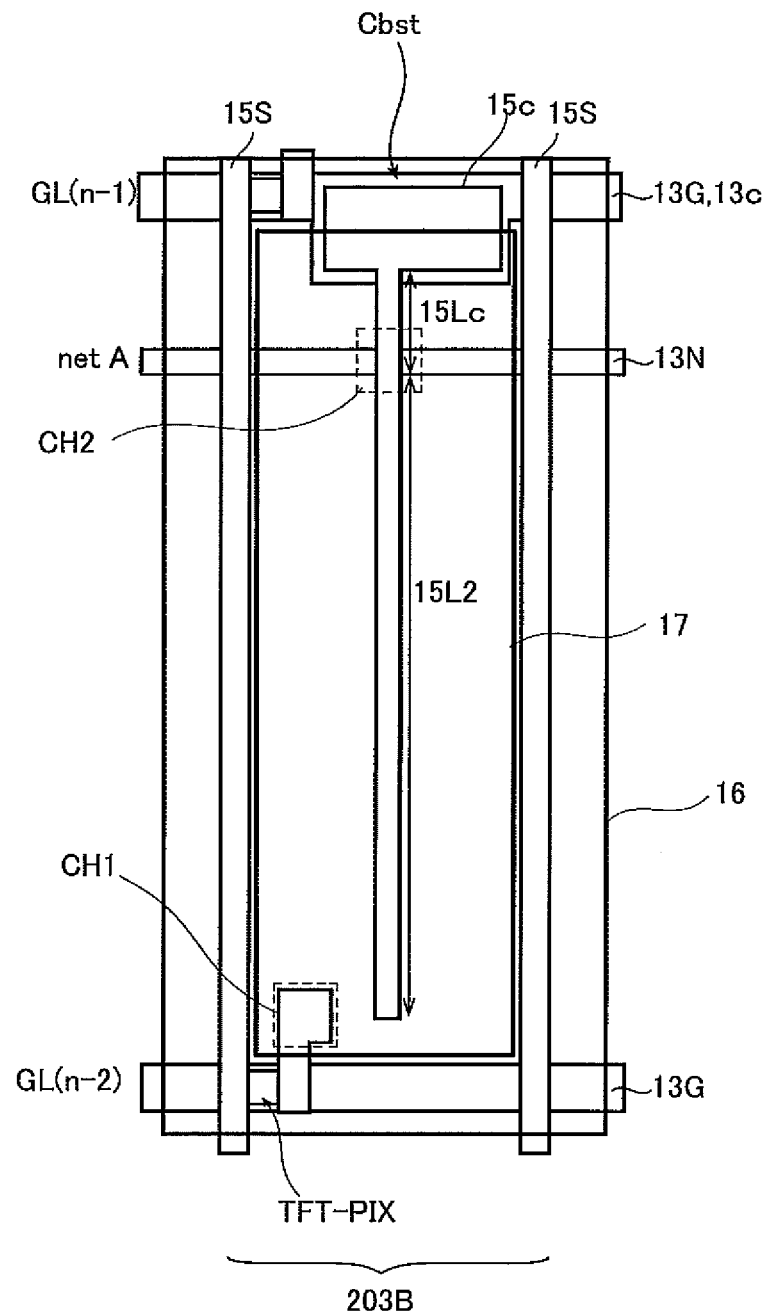
FIG. 8E is an enlarged plan view of the pixel region 203B of FIG. 5B.

How the capacitor Cbst is connected will be described below. FIG. 8E is an enlarged plan view of the pixel region 203B of FIG. 5B. In FIG. 8E, the light-shielding region BM is not shown. In the pixel region 203B, as is the case in the pixel regions 204G and 204B described above, the TFT-PIX is connected with the pixel electrode 17 via the contact CH1. Further, one of the electrodes constituting the capacitor Cbst, 13c, the gate line 13G and line 13N are formed by the gate line layer 13. The other one of the electrodes of the capacitor Cbst, 15c, the connection 15Lc and line 15L2 are formed by the source line layer 15. As shown in FIG. 8E, the connection 15Lc has substantially the same width as the line 13N, extends from the electrode 15c to the contact CH2 and is connected with the line 13N via the contact CH2. The line 15L2 extends from the end of the connection 15Lc adjacent the contact CH2 to the vicinity of the contact CH1. In the present embodiment, the line 15L2 is formed such that the aperture ratio of a pixel region with a capacitor Cbst is equal to that of other pixel regions. At the contact CH2, the electrode 15c is connected with the line 13N via the contact 15Lc. Thus, the capacitor Cbst is connected with the netA.

(TFT-D, E)

How the TFT-D and TFT-E are connected will be described below. In the TFT-D and TFT-E, as is the case in the TFT-A described above, the gate terminal 13g is located in two adjacent pixel regions, and the line 15L1 in one of the pixel regions is connected with the gate terminal 13g. The TFT-D and TFT-E are only different in that the reset signal (CLR) or clock signal (CKA) is supplied to the respective gate terminal; thus, only how the TFT-D is connected will be described.

Figure 8F:
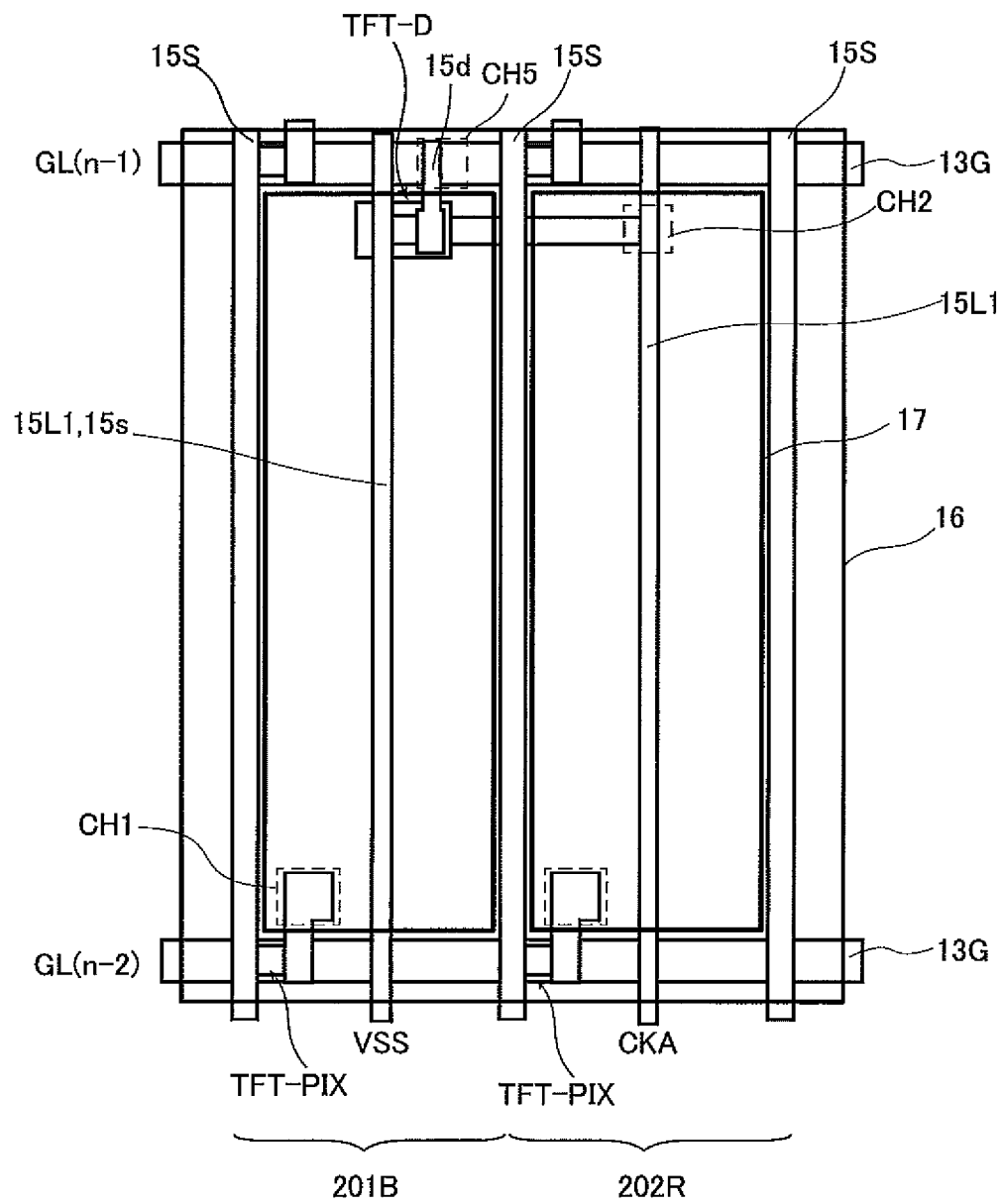
FIG. 8F is an enlarged plan view of the pixel regions 201R and 201G of FIG. 5A.

FIG. 8F is an enlarged plan view of the pixel regions 201B and 202R of FIG. 5A. In FIG. 8F, the light-shielding region BM is not shown. In the pixel regions 201B and 202R, as is the case in the pixel regions 204G and 204B described above, a source line layer 15 forms the source terminal 15s and drain terminal 15d of the TFT-D and the line 15L1. The drain terminal 15d is connected with the gate line 13G: GL(n−1) at the contact CH5 of the pixel region 201B. The power supply voltage signal (VSS) and clock signal (CKA) are supplied to the TFT-D via the lines 15L1 of the pixel regions 201B and 202R, and, at a time point where the clock signal (CKA) goes to H level, the TFT-D provides an L level voltage (VSS) to the gate line 13G: GL(n−1) via the contact CH5.

The foregoing is an example of how the gate driver 11 is constructed and how their elements are connected. The pixel regions in which the TFT-B to TFT-E, TFT-F, TFT-G, capacitor Cbst and TFT-D are provided are not described; in these pixel regions, as is the case in the pixel region in which the TFT-A is provided, a source line layer 15 is provided, and on top of this are stacked protection layers 22 and 23, a shield layer 16, an interlayer insulating film 24 and a pixel electrode 17.

(Operation of Gate Driver 11)

Now, the operation of a gate driver 11 will be described with reference to FIGS. 4 and 9. FIG. 9 is a timing chart showing signals encountered when the gate driver 11 scans a gate line 13G. In FIG. 9, the period from t3 to t4 is the period in which the gate line 13G: GL(n) is selected. Clock signals (CKA) and (CKB), whose phase is reversed at each horizontal scan interval, are supplied from the display control circuit 4 to the gate driver 11 via the terminals 116 to 119. Although not shown in FIG. 9, a reset signal (CLR) that goes to H (high) level at each vertical scan interval and remains that way for a predetermined period of time is supplied to the gate driver 11 by the display control circuit 4 via the terminals 113 to 115. When a reset signal (CLR) is supplied, the netA, netB and gate line 13G transition to L (low) level.

From time t0 to t1 of FIG. 9, an L level clock signal (CKA) is supplied to the terminals 116 and 117, and an H level clock signal (CKB) is supplied to the terminals 118 and 119. Thus, the TFT-G turns on and the TFT-H turns off such that the netB is charged to H level. Further, the TFT-C and TFT-D turn on and the TFT-F turns off such that the netA is charged to L level, i.e. the level of the power supply voltage (VSS), and the L-level potential is output at the terminal 120.

Next, at time t1, the clock signal (CKA) goes to H level and the clock signal (CKB) goes to L level, turning off the TFT-G and turning on the TFT-H such that the netB is charged to L level. Then, the TFT-C and the TFT-D turn off, which maintains the potential of the netA at L level, and the terminal 120 maintains the L level potential.

At time t2, the clock signal (CKA) goes to L level and the clock signal (CKB) goes to H level, and a set signal (S) is supplied to the terminals 111 and 112 via the gate line 13G: GL(n−1). This turns on the TFT-B and charges the netA to H level. Further, the TFT-J turns on, the TFT-G turns on and the TFT-H turns off such that the netB is maintained at L level. The TFT-C and the TFT-F turn off such that the potential of the netA does not decrease, i.e. is maintained. Meanwhile, since the TFT-D is on, the L-level potential is output at the terminal 120.

At time t3, the clock signal (CKA) goes to H level and the clock signal (CKB) goes to L level, turning on the TFT-F and turning off the TFT-D. Since the capacitor Cbst is provided between the netA and terminal 120, the netA is charged to a potential higher than the H level of the clock signal (CKA) as the potential of the terminal 116 of the TFT-F increases. Meanwhile, the TFT-G and the TFT-J are off and the TFT-H is on such that the potential of the netB is maintained at L level. Since the TFT-C is off, the potential of the netA does not decrease, and the H-level potential (i.e. selection voltage) of the clock signal (CKA) is output at the terminal 120. Thus, the gate line 13G: GL(n) connected with the terminal 120 is charged to H level and is in the selected state, and a set signal (S) is provided to the terminals 111 and 112 of the row GL(n+1).

At time t4, the clock signal (CKA) goes to L level and the clock signal (CKB) goes to H level, turning on the TFT-G and turning off the TFT-H such that the netB is charged to H level. Thus, the TFT-C turns on and the netA is charged to L level. Meanwhile, the TFT-D is on and the TFT-F is off such that the L-level potential is output at the terminal 120, and the gate line 13G: GL(n) is charged to L level.

Thus, as a set signal (S) is provided to a gate line 13G from the terminal 120 of the gate driver 11, this gate line 13G enters the selected state. The liquid crystal display device 1 uses a plurality of gate drivers 11 connected with the gate lines 13G to sequentially scan the gate lines 13G and uses the source driver 3 to supply data signals to the source lines 15S to display an image on the display panel 2.

In the first embodiment described above, in the display region, a plurality of gate drivers 11 for driving each one of the gate lines 13G are provided between gate lines 13G. Thus, even if the length of the gate lines 13G depends on the width of the outer shape of the display panel 2, each gate line 13G can be selected one after another by a set signal provided by a gate driver 11 in the display region.

Further, control signals such as a clock signal and power supply voltage signal supplied to gate drivers 11 are supplied through one side of the display panel 2 along which the source driver 3 is provided. Thus, the size of the picture-frame region portions along the other sides, where no source driver 3 is provided, can be reduced such that the design of the outer shape of the display panel 2 is not restricted by the provision of the gate drivers 11, thereby improving the freedom of design.

<Second Embodiment>

Figure 10:
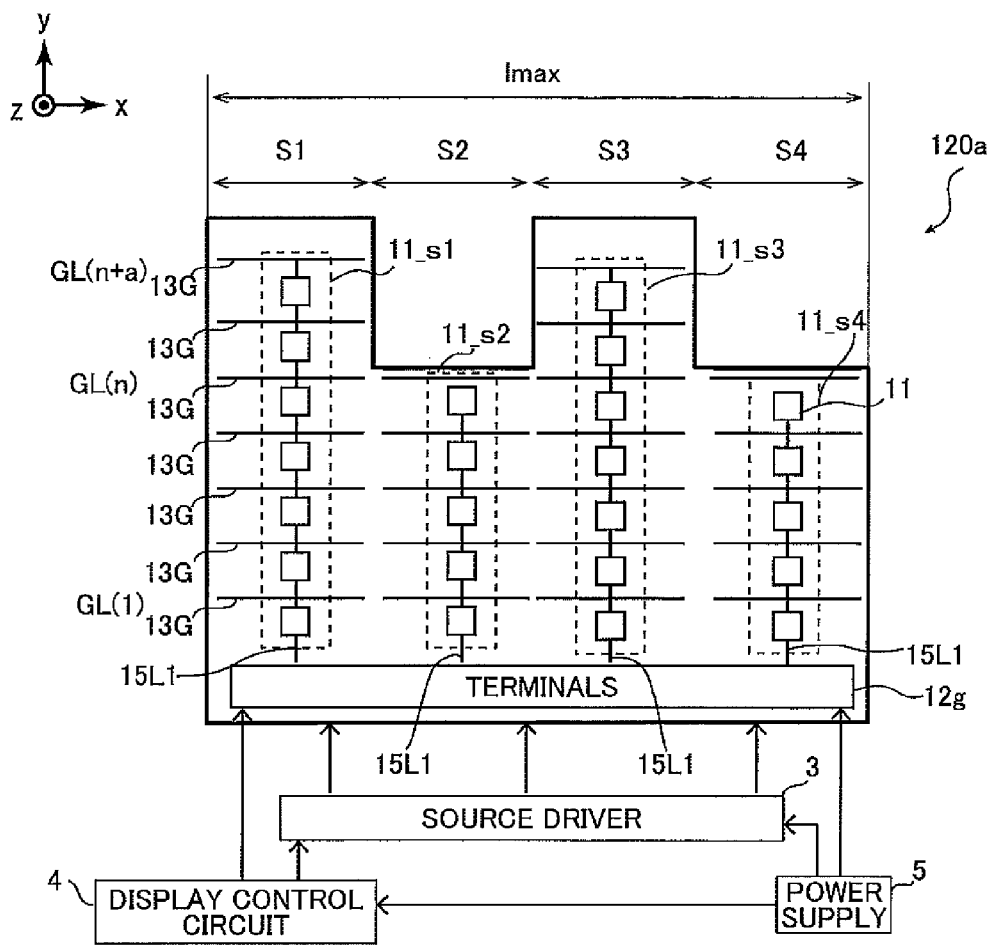
FIG. 10 is a schematic view of an active-matrix substrate according to a second embodiment.

FIG. 10 is a schematic plan view of an active-matrix substrate according to the present embodiment. In this drawing, the same components as in the first embodiment are labeled with the same characters as in the first embodiment. The components that are different from those of the first embodiment will be described below. As shown in FIG. 10, the side of the active-matrix substrate 120a of the present embodiment that is parallel to the direction in which the gate lines 13G extend (i.e. X-direction) and is opposite to the side having the source driver 3 has protrusions and recesses. A group of gate lines 13G having a length that is substantially equal to the width of each recess/protrusion on the active-matrix substrate 120a as measured in the X-direction is provided in each of the columns having this width (hereinafter referred to as columns S1, S2, S3 and S4). That is, in the implementation of FIG. 10, each gate line 13G has a length that is smaller than the maximum value lmax of the width of the active-matrix substrate 120a as measured in the direction in which the gate lines 13G extend (i.e. X-direction).

The gate lines 13G extend generally parallel and are arranged in the Y-direction in each column and spaced apart at a regular interval. In the columns S1 and S3, the gate lines 13G: GL(1) to GL(n+a) are provided. In the columns S2 and S4, the gate lines 13G: GL(1) to GL(n) are provided. Although not shown in FIG. 10, source lines 15S are provided on the active-matrix substrate 120a that are parallel to the Y-axis and cross the gate lines 13G, and terminals 12s are provided in the portion of the picture-frame region that is adjacent to the source driver 3.

Although shown in a simplified manner in FIG. 10, similar to the gate drivers of the first embodiment, gate drivers 11 are provided in the display region and located between gate lines 13G arranged in the columns S1 to S4, and the gate drivers 11 in each column are connected via a line 15L1 (see FIG. 3, for example). The gate drivers 11 in each column are supplied with control signals such as a clock signal and power supply voltage signal from a terminal 12g via the line 15L1. Thus, in this implementation, the gate lines 13G in the column S1 are scanned one after another by the gate driver group 11_s1, and the gate lines 13G in the column S2 are scanned one after another by the gate driver group 11_s2. The gate lines 13G in the column S3 are scanned one after another by the gate driver group 11_s3, and the gate lines 13G in the column S4 are scanned by the gate driver group 11_s4.

In the implementation of FIG. 10, one gate driver 11 is connected to one gate line 13G; alternatively, a plurality of gate drivers 11 may be connected to one gate line 13G. Each gate line 13G is only required to have a length that allows the switching elements of at least one gate driver 11 to be provided.

Figure 11:
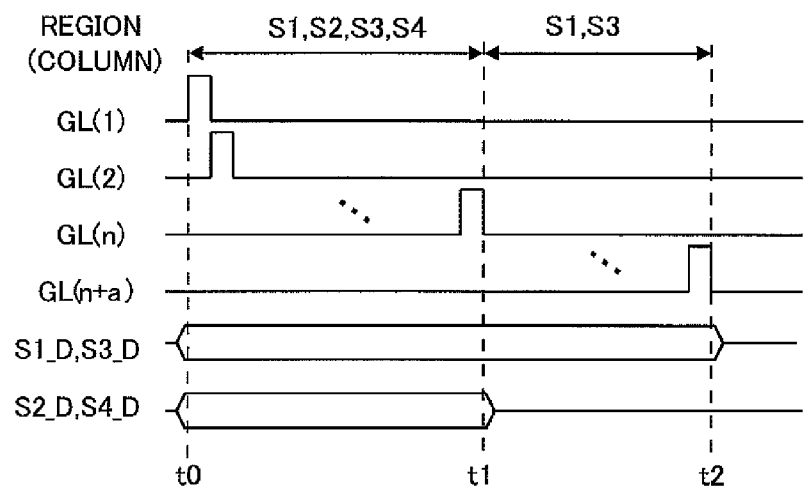
FIG. 11 illustrates the timing with which to drive the active-matrix substrate shown in FIG. 10.

FIG. 11 illustrates the timing with which to drive the active-matrix substrate 120a. In response to control signals, the gate driver groups 11_s1 and 11_s3 in the columns S1 and S3 consecutively drive their gate lines 13G: GL(1) to GL(n+a) and provide a set signal. In response to control signals, the gate driver groups 11_s2 and 11_s4 in the columns S2 and S4 consecutively drive their gate lines 13G: GL(1) to GL(n) and provide a set signal. Thus, as shown in FIG. 11, after scanning is started at t0, scanning is finished in the columns S2 and S4 at time t1, and scanning is finished in the columns S1 and S3 at time t2.

The source driver 3 provides data signals S1_D and S3_D for the columns S1 and S3 that correspond to a video signal to the source lines 15S (not shown) in the columns S1 and S3 during the scan period t0 to t2 for the gate lines 13G: GL(1) to GL(n+a). Then, the source driver provides data signals S2_D and S4_D for the columns S2 and S4 that correspond to a video signal to the source lines 15S (not shown) in the columns S2 and S4 during the scan period t0 to t1 for the gate lines 13G: GL(1) to GL(n), and, after scanning is finished, provides a data signal having the minimum amplitude during the period t1 to t2. For example, if the active-matrix substrate 120a is of normally black display mode, a data signal indicating black may be output from t1 onward.

If one side of the active-matrix substrate 120a has recesses and protrusions as in the second embodiment described above, gate lines 13G having a length depending on the width of each recess/protrusion may be provided on the active-matrix substrate 120a and gate drivers 11 may be provided between the gate lines 13G such that the display can be controlled for each display region having the width of a recess/protrusion. Further, the scanning time for the gate lines 13G in the columns having a recess (S2 and S4) is shorter than the scan time for the gate lines 13G in the columns having a protrusion (S1 and S3). In the second embodiment described above, after scanning for the gate lines in the columns having a recess is finished, a data signal having the minimum amplitude is output until scanning for the columns having a protrusion is finished, thereby reducing power consumption for driving the source lines 15S in the columns having a recess.

<Third Embodiment>

Figure 12A:
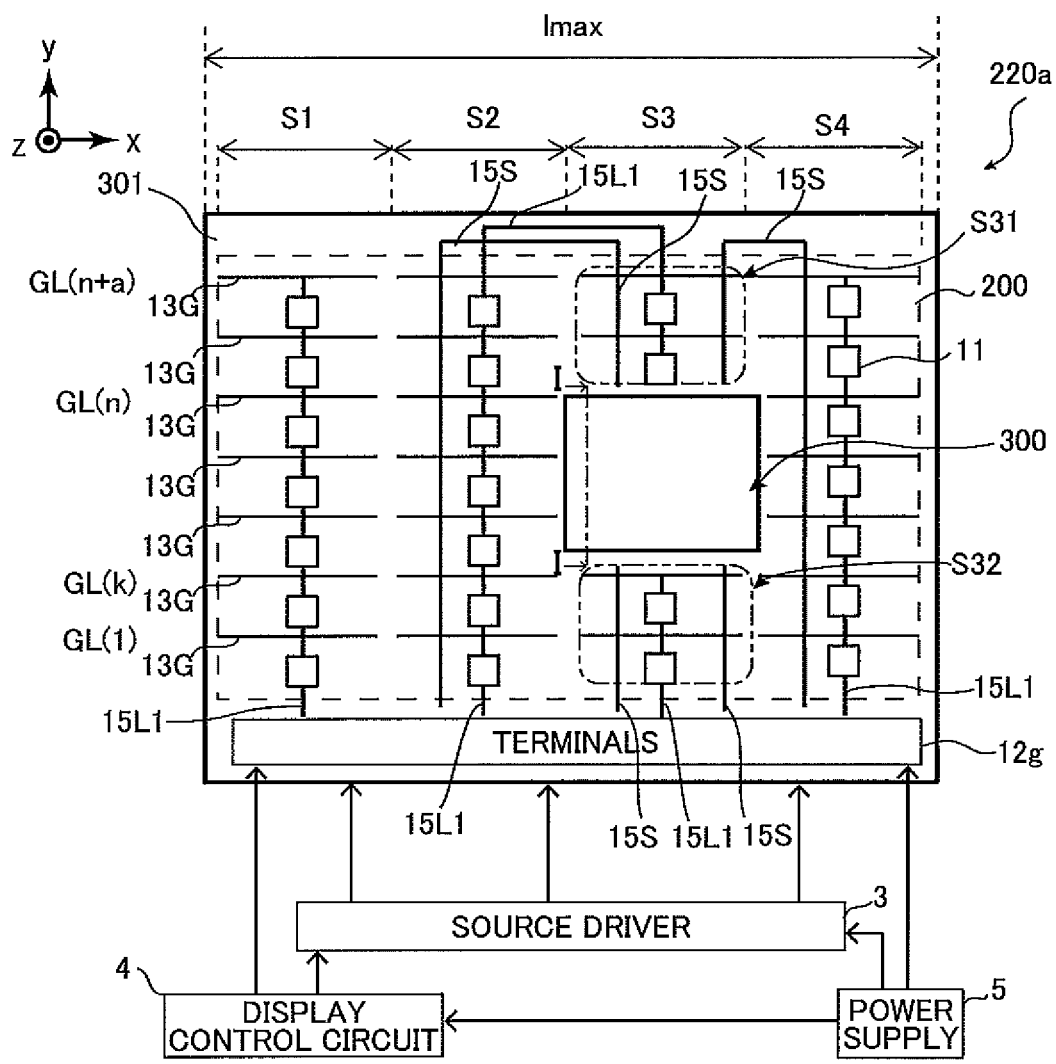
FIG. 12A is a schematic view of an active-matrix substrate according to a third embodiment.

The present embodiment describes an example active-matrix substrate having a non-display region within the display region. FIG. 12A is a schematic plan view of an active-matrix substrate according to the present embodiment. In FIG. 12A, the same components as in the first embodiment are labeled with the same characters as in the first embodiment. The components that are different from those of the first embodiment will be described below.

As shown in FIG. 12A, the active-matrix substrate 220a of the present embodiment includes a non-display region 300 within the display region 200 indicated by broken lines.

Figure 12B:
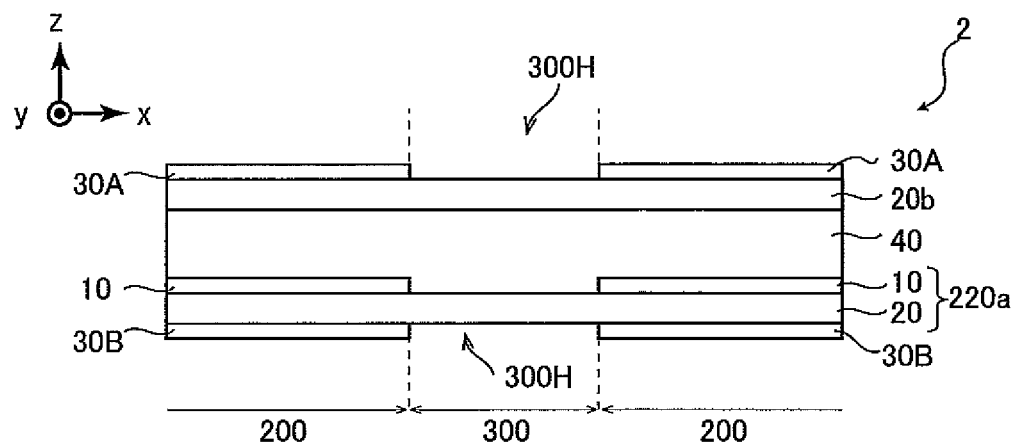
FIG. 12B is a schematic view of a cross-section of an example non-display region in the display panel according to the third embodiment.

FIG. 12B is a cross-sectional view of the display panel 2 taken along line I-I of FIG. 12A. As shown in FIG. 12B, in the present embodiment, an element layer 10 including a gate line layer 13, source line layer 15 and semiconductor layer 14 is provided in the display region 200 on the substrate 20 of the active-matrix substrate 220a, and no element layer 10 is present in the non-display region 300. A liquid crystal layer 40 provided between the active-matrix substrate 20a and counter-substrate 20b is present in the non-display region 300 and display region 200. A polarizer 30A on the counter-substrate 20b and a polarizer 30B on the active-matrix substrate 20a are present in the display region 200, and include a hole 300H aligned with the non-display region 300. Thus, in the display panel 2 of the present embodiment, the hole 300H aligned with the non-display region 300 is not present in the substrate 20 and counter-substrate 20b; in the non-display region 300, the element layer 10 and polarizers 30A and 30B are not present.

Figure 12C:
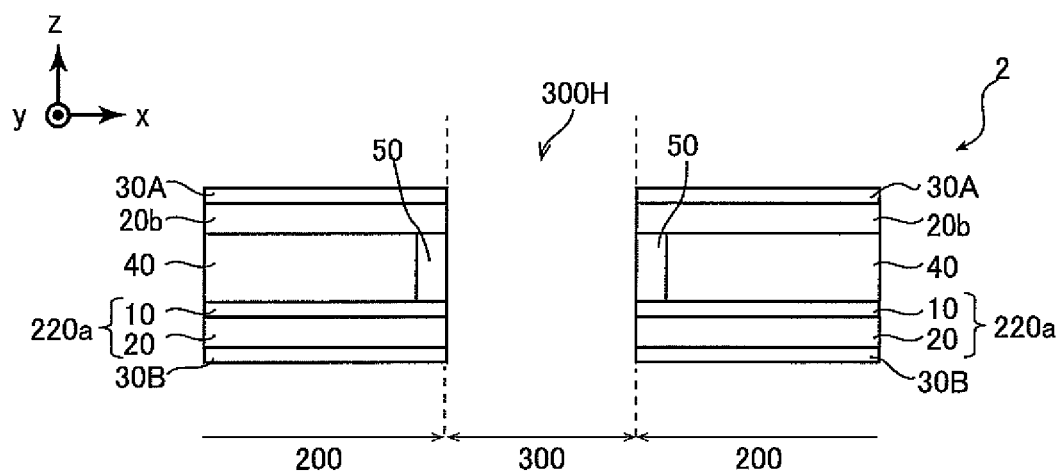
FIG. 12C is a schematic view of a cross section of another example non-display region in the display panel according to the third embodiment.

The display panel 2 including a non-display region 300 is not limited to the configuration shown in FIG. 12B, and may have the configuration shown in FIG. 12C, for example. In FIG. 12C, a hole 300H aligned with the non-display region 300 is provided in the substrate 20 and counter-substrate 20b. Further, seal members 50 for sealing the liquid crystal layer 40 are provided between the counter-substrate 20b and active-matrix substrate 20a at the boundary between the non-display region 300 and display region 200. Thus, the present embodiment may have any of the configurations of FIGS. 12B and 12C, provided that a non-display region is provided within the display region of the display panel 2.

Returning to FIG. 12A, on the active-matrix substrate 220a, groups of gate line 13G are provided in a column S3 having the non-display region 300 and columns S1, S2 and S4 where the non-display region 300 is not present, each gate line having a length that is substantially equal to the width of each column. That is, each gate line 13G has a length that is smaller than the maximum value lmax of the width of the active-matrix substrate 220a as measured in the direction in which the gate lines 13G extend (i.e. X-direction). The gate lines 13G are provided in each column and are arranged in the Y-direction with a regular interval, and are generally parallel to each other. Gate lines 13G: GL(1) to GL(n+a) are provided in the columns S1, S2 and S4. The non-display region 300 is sandwiched between regions S32 and S31 in the column S3, the region S32 being adjacent to the terminals 12g and the regions S31 being adjacent to the picture-frame region 301, and gate lines 13G: GL(1) to GL(k) are provided in the region S32, while gate lines 13G: GL(n) to GL(n+a) are provided in the region S31. In the implementation of FIG. 12A, the gate lines in the columns S1 to S4 are divided near the borders between the adjacent columns; however, the gate lines other than those in the region S31 do not need to be divided.

Although not shown for convenience, similar to the source lines of the first embodiment, source lines 15S parallel to the Y-axis are provided in each column on the active-matrix substrate 220a, and terminals 12s are provided in the portion of the picture-frame region that is adjacent to the source driver 3. Further, gate drivers 11 connected by lines 15L1 (see FIGS. 3, 5A to 5C, for example) are provided between the gate lines 13G.

The gate drivers 11 located in the region S31 in the column S3 are not connected with the gate drivers 11 located in the region S32, but are connected with the gate drivers 11 connected with the gate line 13G: GL(n) in the column S2 via a line 15L1 routed around through the picture-frame region 301. The gate drivers 11 located in the region S31 are supplied with control signals such as a clock signal and power supply voltage signal from a terminal 12g via the line 15L1 located in the column S2 and picture-frame region 301. The gate driver 11 connected with the gate line 13G: GL(n+a) in the region S31 receives a set signal (S) from the gate driver 11 provided in the column S2 and connected with the gate line 13G: GL(n+a). That is, the direction in which the gate lines 13G in the region S31 are scanned is opposite to the scan direction for the other regions.

Further, source lines 15S extending from the columns S2 and S4 and routed around through the picture-frame region 301 are provided in the region S31 in the column S3. Thus, the source lines 15S in the region S31 are not connected with the source lines 15S in the region S32. Thus, data signals are supplied to the region S32 from the source driver 3 in the direction in which the gate lines 13G are scanned, while data signals are supplied to the region S31 from the picture-frame region 301 via the source lines 15S in the columns S2 and S4. That is, the direction in which gate lines 13G are scanned in the region S31 is opposite to the scan direction for other regions, such that data is written beginning with GL(n+a) and ending with GL(n). Thus, the source driver 3 outputs data signals that are rearranged such that the data to be written to the rows GL(n) to GL(n+a) in the region S31 is written beginning with GL(n+a) and ending with GL(n) at the time points for driving the gate lines 13G: GL(n+a) to GL(n) in the region S31.

Figure 13:
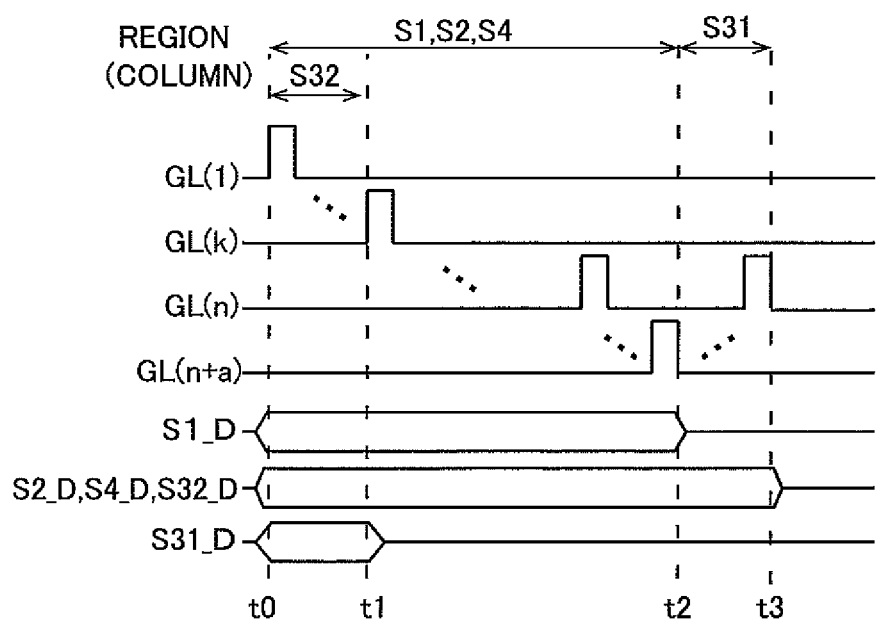
FIG. 13 illustrates the timing with which to drive the active-matrix substrate shown in FIG. 12A.

FIG. 13 illustrates the timing with which to drive the active-matrix substrate 220a shown in FIG. 12A. In response to control signals, the gate drivers 11 in the column S1 consecutively scans the gate lines 13G: GL(1) to GL(n+a). In response to control signals, the gate drivers 11 in the region S32 in the column S3 consecutively scans the gate lines 13G: GL(1) to GL(k). In response to control signals, the gate drivers 11 in the column S2 consecutively scans the gate lines 13G: GL(1) to GL(n+a). The gate drivers 11 in the region S31 in the column S3 receives a set signal (S) from the gate driver 11 that scans the gate line 13G: GL(n+a) in the column S2 and, in response to control signals supplied via the line 15L1 extending through the picture-frame region 301, consecutively scans the gate lines 13G: GL(n+a) to GL(n).

Thus, as shown in FIG. 13, after scanning is started at time t0, scanning of the gate lines 13G: GL(1) to GL(k) in the region S32 finishes at time t1, and scanning of the gate lines 13G: GL(1) to GL(n+a) in the columns S1, S2 and S4 finishes at time t2 (>t1). Then, scanning of the gate lines 13G: GL(n+a) to GL(n) in the region S31 starts at t2 at which scanning of the column S2 finishes, and finishes at time t3 (>t2).

The source driver 3 provides a data signal S32_D for the region S32 that corresponds to a video signal to the source lines 15S in the region S32 during the scanning period t0 to t1 for the rows GL(1) to GL(k) and, from t1 onward, provides a data signal having the minimum amplitude. Further, the source driver provides a data signal S1_D for the column S1 that corresponds to a video signal to the source lines 15S in the column S1 during the scan period t0 to t2 for the rows GL(1) to GL(n+a) and, from t2 onward, provides a data signal having the minimum amplitude. The data signal having the minimum amplitude may be, for example, a data signal indicating black if the active-matrix substrate 220a is of normally-black display mode. The source driver provides data signals S2_D and S4_D for the columns S2 and S4 that correspond to a video signal to the source lines 15S in the columns S2 and S4 during the scan period t0 to t2 for the rows GL(1) to GL(n+a) and, from t2 onward, provides a data signal S31_D for the region S31 that corresponds to a video signal.

Even if a non-display region is provided within the display region as in the third embodiment described above, gate lines 13G and source lines 15S are provided for the display regions (S31 and S32) in the column having the non-display region so as to allow them to be driven in the same manner as those of in the other columns of the display region. This allows a display panel 2 to be designed without restrictions imposed by the provision of gate drivers 11 or the routing around of source lines 15S and gate lines 13G.

<Fourth Embodiment>

Figure 14:
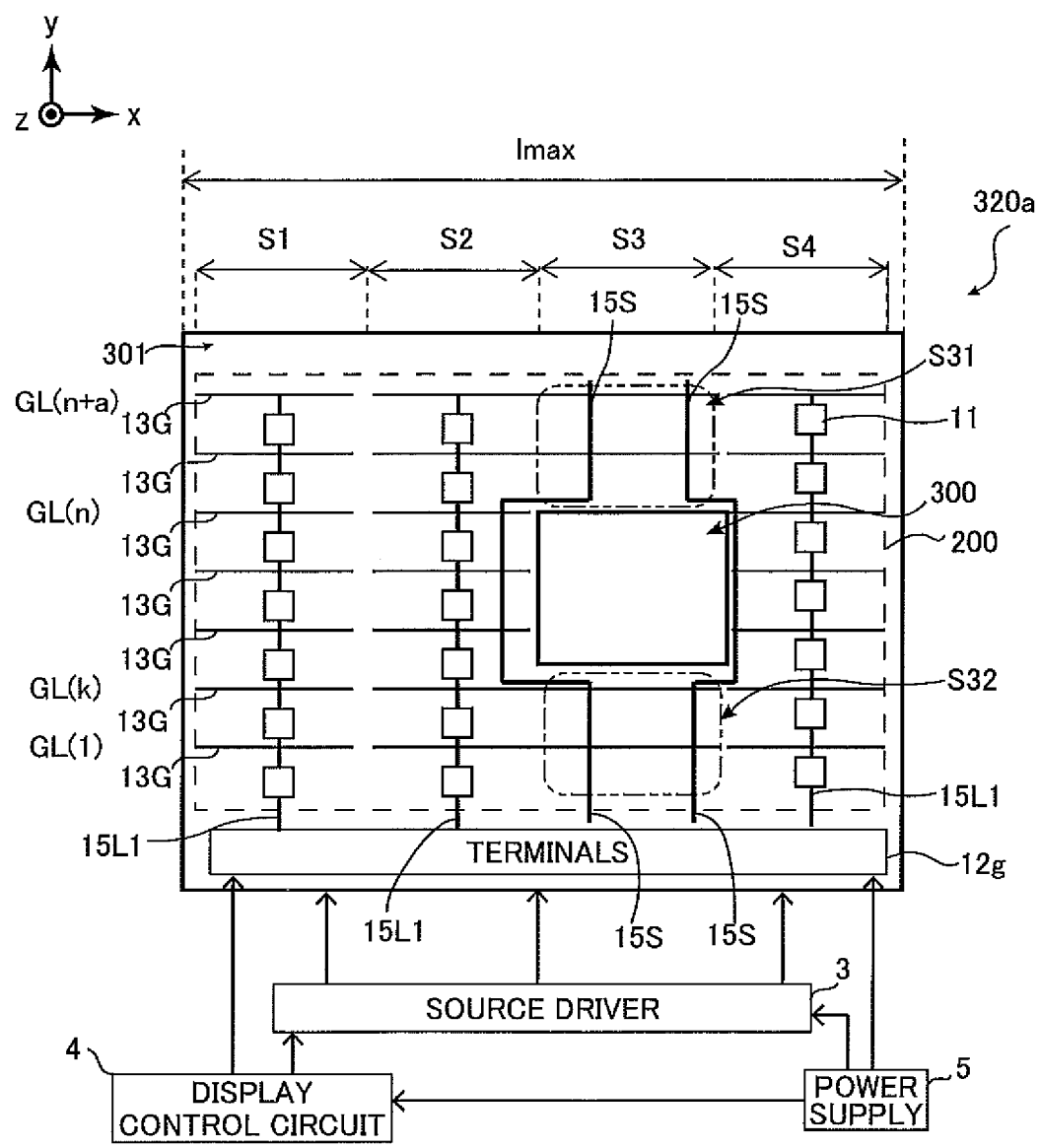
FIG. 14 is a schematic view of an active-matrix substrate according to a fourth embodiment.

In the third embodiment described above, the source lines 15S in columns in which the non-display region 300 is not present are routed around through the picture-frame region 301 and turned to the column having the non-display region 300 to provide source lines 15S in the region S31, which is located in the column having the non-display region 300 and adjacent the side of the non-display region that is opposite the side that is adjacent the source driver 3. In the present embodiment, a source line 15S is provided in the column having the non-display region 300 without a source line 15S in a column in which the non-display region 300 is not provided being routed around through the picture-frame region 301. FIG. 14 is a schematic plan view of an active-matrix substrate according to the present embodiment. In FIG. 14, the same components as in the first and third embodiments are labeled with the same characters as in the first and third embodiments. The components that are different from those of the third embodiment will be described below.

As shown in FIG. 14, similar to the active-matrix substrate of the third embodiment, the active-matrix substrate 320a of the present embodiment includes a non-display region 300 within the display region 200. Groups of gate lines 13G are provided in columns S1 and S4 of the active-matrix substrate 320a, each gate line having a length substantially equal to the width of a column, and gate drivers 11 are provided between the gate lines 13G in the columns S1 and S4. Further, in this implementation, in the column S2, gate lines 13G having a length substantially equal to the width of the column S2 are provided in the rows GL(k+1) to GL(n) in which the non-display region 300 is present. Gate lines 13G extend from the column S2 to the column S3 in rows of the columns S2 and S3 that are other than those having the non-display region 300. Gate drivers 11 are provided in the column S2 between the gate lines 13G for the columns S2 and S3. Thus, in this implementation, no gate driver 11 is provided in the regions S31 and S32 in the column S3 which includes the non-display region 300. In the implementation of FIG. 14, the gate lines 13G are divided near the border between the columns S1 and S2, near the border between the columns S3 and S4 and at the non-display region 300; however, the gate lines do not need to be divided except at the non-display region 300.

Further, as shown in FIG. 14, in the column S3, source lines 15S are provided that detour from the edge of the region S32 that is adjacent the terminals 12g to near the edge of the region S31 that is adjacent to the picture-frame region 301, connected via detour lines 15SL and 13n (see FIG. 15) that extends along the periphery of the non-display region 300. How the source lines 15S are connected in the region S32 will be described in detail below.

Figure 15:
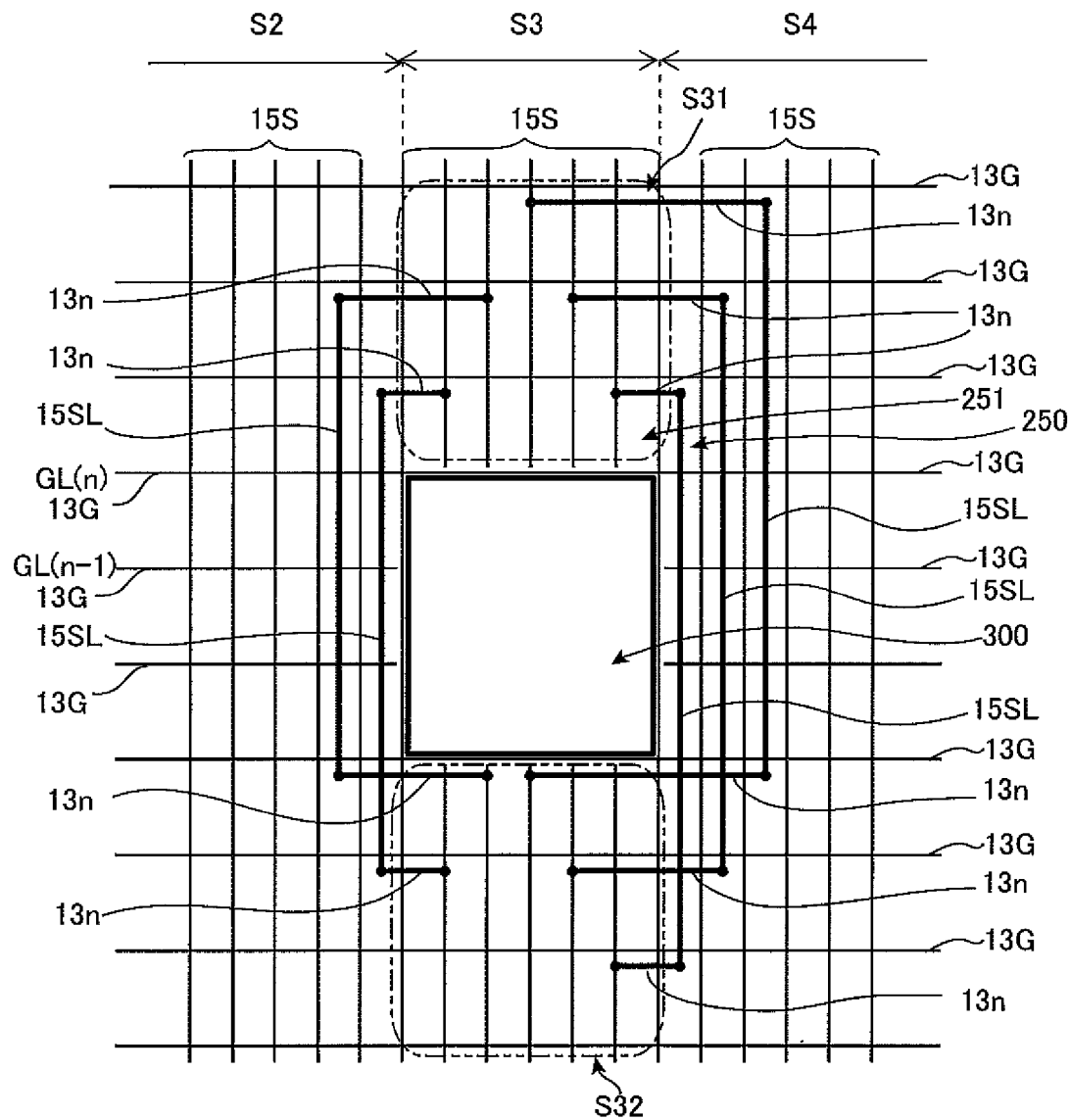
FIG. 15 is an enlarged schematic view of a part of the active-matrix substrate shown in FIG. 14.

FIG. 15 shows an implementation with a non-display region 300 having a size in the X-direction of 6 pixels (RGB×2) and a size in the Y-direction of 3 pixels. Although no gate driver 11 is shown in FIG. 15 for convenience, gate drivers 11 are provided between the gate drivers 13G.

Figure 16:
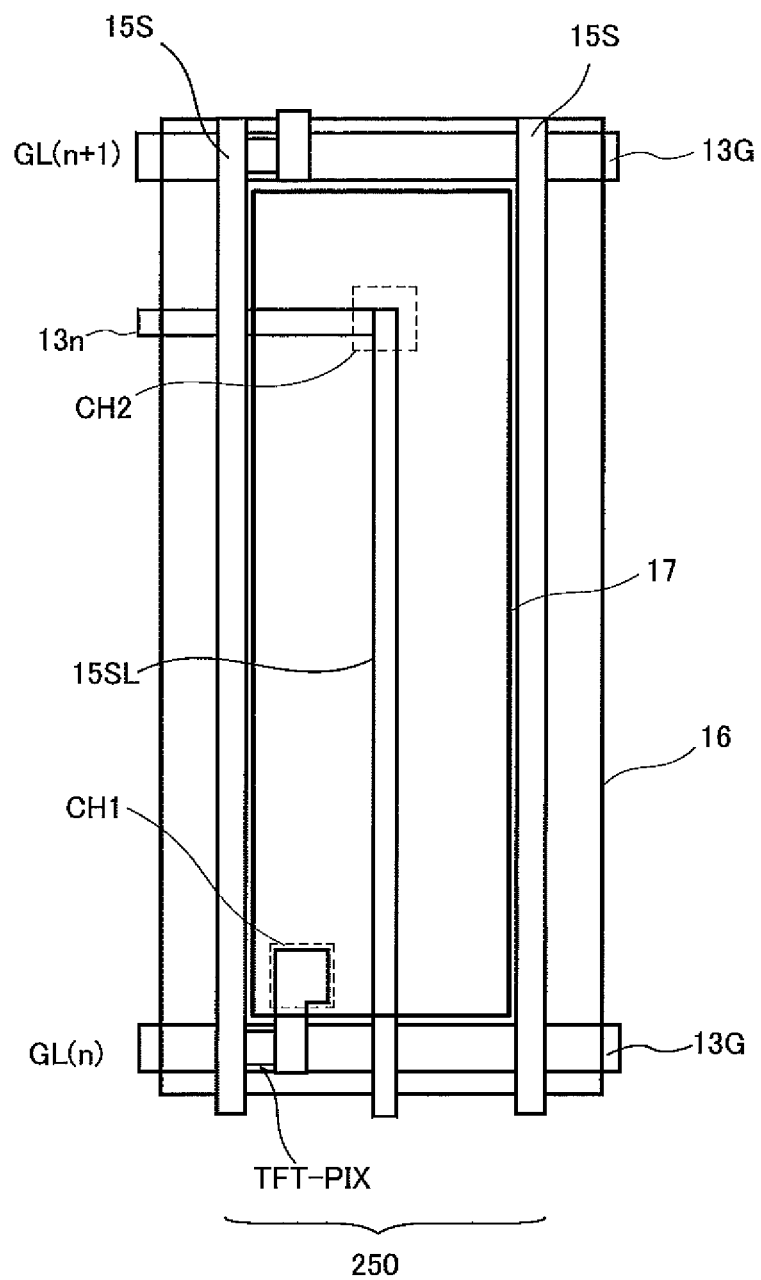
FIG. 16 is an enlarged schematic view of a part of a pixel region shown in FIG. 15.

As shown in FIG. 15, the source lines 15S in the regions S32 and S31 in the column S3 are connected via detour lines 13n extending to pixel regions in the columns S2 and S4 and detour lines 15SL connecting these pixel regions. The pixel regions having the detour lines 15SL are ones in which no switching element of a gate driver 11 is provided. FIG. 16 shows an enlarged schematic view of a pixel region 250 in FIG. 15.

As shown in FIG. 16, the pixel region 250 is a pixel region in which no gate driver 11 is present. In the pixel region 250, a detour line 15SL formed by the source line layer 15 is provided between source lines 15S constituting part of the pixel region 250 and extends generally parallel to the source lines 15S. A detour line 13n connected with the detour line 15SL via a contact CH2 extends generally parallel to the gate lines 13G. The detour line 13n is formed by the gate line layer 13 and the contact CH2 has a construction similar to that in FIG. 7D for the first embodiment. The detour line 13n extends to a source line 15S provided in a pixel region 251 in the column S3 shown in FIG. 15, and connected with the source line 15S in the pixel region 251 via a contact CH2 (not shown). The detour lines 15SL and 13n are positioned and sized similarly to the lines 15L1 for a clock signal or power supply voltage signal so as to provide an aperture ratio that is substantially equal to the aperture ratio of the pixel regions having a switching element of a gate driver 11.

As detour lines 15SL and 13n are provided in pixel regions in which no gate driver 11 is present, source lines 15S may be routed to a column having a non-display region 300 such that data signals may be supplied from the source driver 3. Further, since in the fourth embodiment no gate driver 11 is provided in the column having the non-display region 300, lines 15L1 for supplying control signals to the gate drivers 11 in the regions S31 and S32 in the column having the non-display region 300 do not have to be extended to the picture-frame region 301 and routed around as in the third embodiment, thereby reducing the size of the picture-frame region compared with the third embodiment. Further, the detour lines 15SL and 13n are disposed so as to provide an aperture ratio that is substantially equal to the aperture ratio of the pixel regions having a gate driver 11, preventing unevenness in luminance or the like.

<Fifth Embodiment>

The present embodiment describes an implementation where some portions of the display region are driven at a first driving frequency and the other portions are driven at a second driving frequency that is lower than the first driving frequency. The same components as in the preceding embodiments are labeled with the same characters, and the components that are different from those of the preceding embodiments will be described.

The liquid crystal layer of the display panel 2 is sealed by a seal material made of a resin between the counter-substrate 20b and active-matrix substrate 20a. When the liquid crystal layer is sealed by a seal material, impurities in the seal material may enter the portions of the liquid crystal layer near the seal material. This may result in the portions of the liquid crystal layer near the seal material having an effective voltage lower than that of the other portions. If the display panel 2 is driven at 1 Hz instead of 60 Hz to reduce power consumption, the display speed in the portions near the seal material may decrease.

Figure 17:
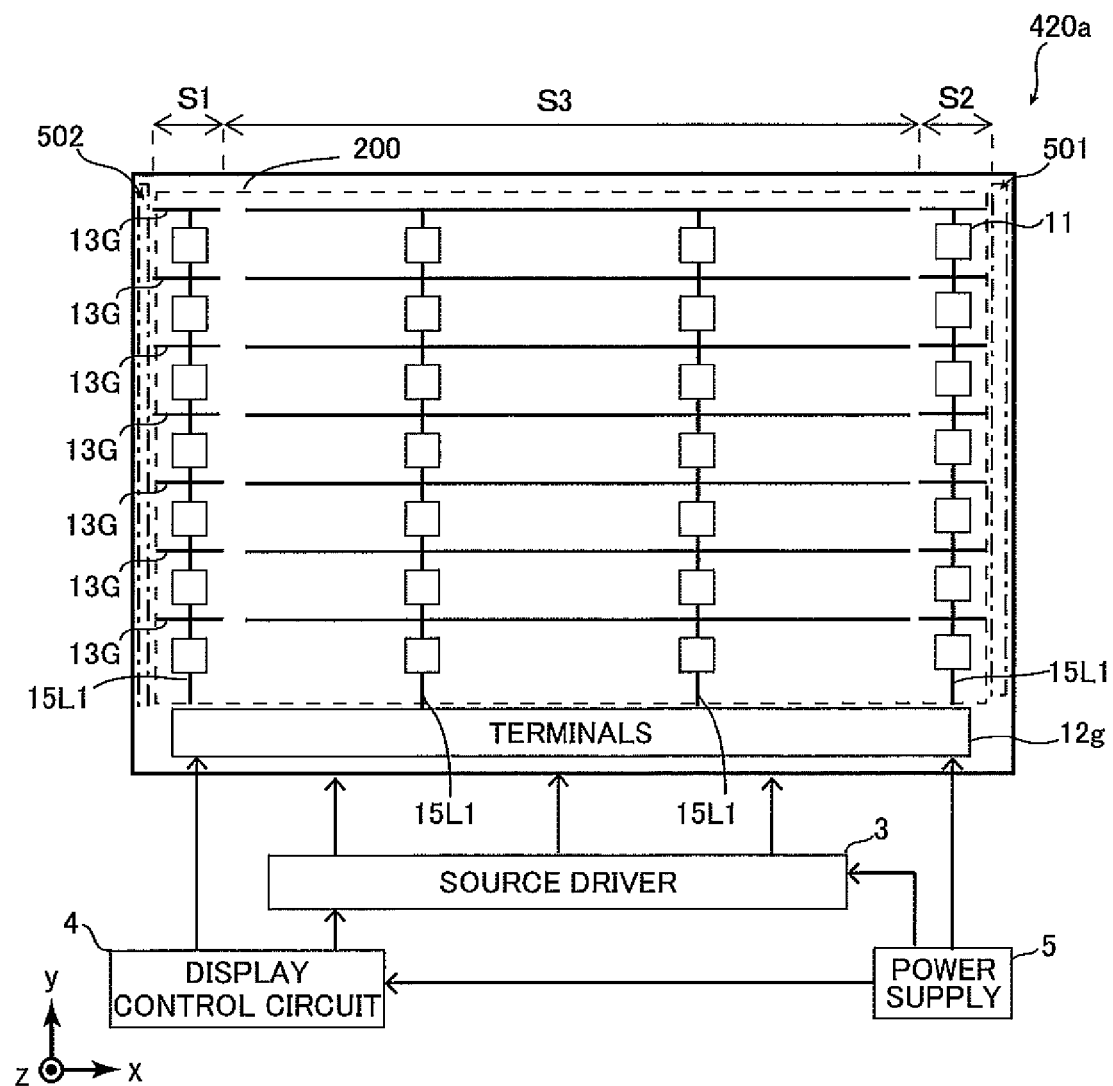
FIG. 17 is a schematic view of an active-matrix substrate according to a fifth embodiment.

The present embodiment describes an implementation where some portions of the periphery of the display region 200 are driven at a driving frequency (60 Hz, for example) that is higher than a driving frequency (1 Hz, for example) in the other portions. FIG. 17 is a schematic plan view of an active-matrix substrate 420a of the present embodiment. Rectangular regions 501 and 502 of the active-matrix substrate 420a are the portions of the picture-frame region that have a seal material (hereinafter referred to as seal material regions 501 and 502). Regions S1 and S2 having a predetermined width starting from the borders between the seal material regions 501 and 502 and the display region 200 (hereinafter referred to as seal material proximity regions) includes groups of gate lines 13G having the length equal to the width of the seal material proximity regions. A region S3, which is the portion of the display region 200 other than the seal material proximity regions S1 and S2, includes a group of gate lines 13G having the length equal to the width of the region S3. At least one gate driver 11 for driving one gate line 13G is provided between the gate lines 13G in the seal material proximity regions S1 and S2 and region S3.

Although shown in a simplified manner in FIG. 17, the gate drivers 11 for the regions are connected via lines 15L1 (see FIGS. 3, 5A to 5C, for example), and control signals are supplied to the gate drivers 11 from the terminals 12g via the lines 15L1. Further, although not shown in FIG. 17, the display region 200 includes groups of source lines 15S crossing the gate lines 13G and terminals 12s in the portion of the picture-frame region adjacent the source driver 3.

If, for example, a moving image for about 60 Hz is to be displayed and the region S3 is driven at 1 Hz and the seal material proximity regions S1 and S2 are driven at 60 Hz, the display control circuit 4 provides, to the gate drivers 11 in the seal material proximity regions S1 and S2, control signals for driving at 60 Hz the gate lines 13G in the seal material proximity regions S1 and S2 via the associated terminals 12g. The circuit provides, to the gate drivers 11 in the region S3, control signals for driving at 1 Hz the gate lines 13G in the region S3 via the associated terminals 12g. For each frame of a video signal supplied from the outside, the source driver 3 supplies the source lines 15S (not shown) in the seal material proximity regions S1 and S2 and region S3 with a data signal indicating moving image data to be displayed in the regions for this frame. In this case, the gate lines 13G in the region S3 are driven at 1 Hz and the gate lines 13G in the seal material proximity regions S1 and S2 are driven at 60 Hz, thereby preventing the display speed in the seal material proximity regions S1 and S2 from becoming lower than that in the region S3.

If, for example, an image for about 1 Hz or a still image is to be displayed, the display control circuit 4, in a similar manner, provides, to the gate drivers 11 in the seal material proximity regions S1 and S2, control signals for driving at 60 Hz the gate lines 13G in the seal material proximity regions S1 and S2 via the terminals 12g. The circuit provides, to the gate drivers 11 in the region S3, control signals for driving at 1 Hz the gate lines 13G in the region S3 via the associated terminals 12g.

In this case, the source driver 3 includes buffer circuits (not shown) corresponding to the source lines 15S (not shown). The source driver 3 causes the buffer circuits (not shown) to hold those portions of image data for about 1 Hz provided from the outside that are to be sent to the source lines 15S in the seal material proximity regions S1 and S2. Then, it reads the image data held in the buffer circuits (not shown) and supplies data signals indicating these image data portions to the source lines 15S (not shown) in the seal material proximity regions S1 and S2 at an interval of 1/60 seconds. Thus, the same image is written to the seal material proximity regions S1 and S2 60 times. On the other hand, the source driver supplies, each second, the source lines 15S (not shown) in the region S3 with image data to be sent to the source lines 15S in the region S3. In this case, the source driver 3 sends data signals at a driving frequency of about 1 Hz, and the gate drivers 11 in the region S3 drive their gate lines 13G at a driving frequency of about 1 Hz. This reduces power consumption for controlling display in the region S3 compared with implementations where a moving image for about 60 Hz as described above is displayed.

In the fifth embodiment described above, the seal material proximity regions are, by way of example, regions near the two sides of the display region 200 parallel to the Y-axis; alternatively, they may be the regions near the two sides of the display region 200 parallel to the X-axis, or the regions near the four sides of the display region 200.

<Sixth Embodiment>

In FIG. 17 for the fifth embodiment described above, the gate lines 13G in the regions S1 to S3 have a length that is substantially equal to the width of the regions. In the implementation of FIG. 17, the border between the regions S1 and S2 driven at about 1 Hz and the region S3 driven at about 60 Hz is linear such that the border can be easily perceived by the human eyes. To address this, the present embodiment describes an implementation where the gate lines 13G are disposed such that the borders between the regions with different driving frequencies are non-linear.

Figure 18:
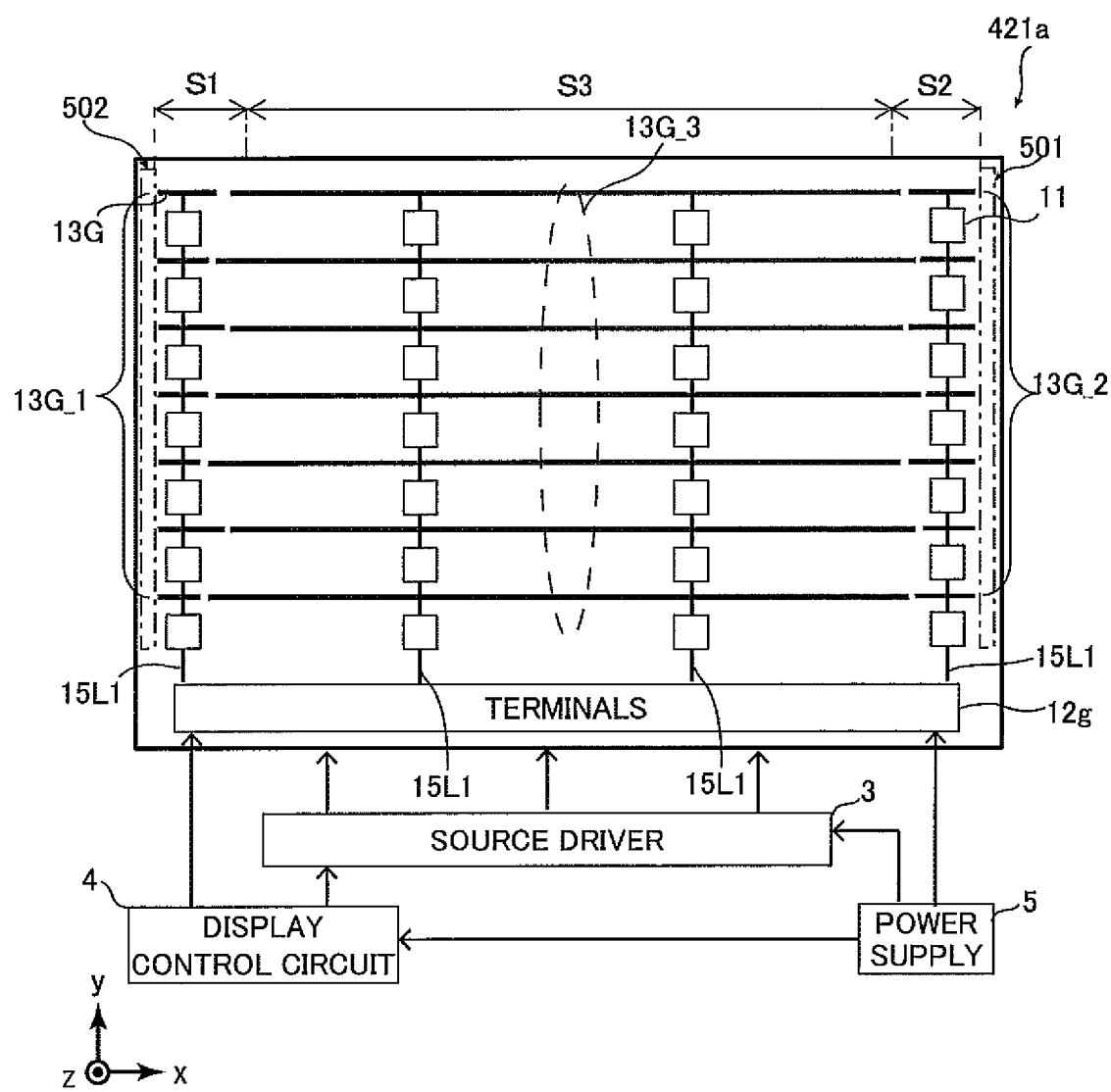
FIG. 18 is a schematic view of an active-matrix substrate according to a sixth embodiment.

FIG. 18 is a schematic plan view of an active-matrix substrate 421a of the present embodiment. In FIG. 18, the same components as in the fifth embodiment are labeled with the same characters. Similar to the source lines of the fifth embodiment, the source lines 15S (not shown) in the seal material proximity regions S1 and S2 are supplied with data signals at a driving frequency of about 60 Hz and the source lines 15S (not shown) in the region S3 are supplied with data signals at a driving frequency of about 1 Hz.

As shown in FIG. 18, a group of gate lines 13G_3 in the region S3 cover the region S3 and overlap parts of the seal material proximity regions S1 and S2. A groups of gate lines 13G_1 and 13G_2 in the seal material proximity regions S1 and S2 are located between the borders to the seal material regions 501 and 502 and the ends of the gate lines 13G_3.

The gate lines 13G of the gate line groups 13G_1, 13G_2 and 13G_3 have such lengths that the borders between the gate line groups 13G_1 and 13G_2 and the gate line group 13G_3 is non-linear. That is, in order that the border between the gate line groups in a region with a low driving frequency (hereinafter referred to as first region) and an adjacent region with a higher driving frequency (hereinafter referred to as second region) is non-linear, the gate lines in the first region partially enter the second region.

The gate drivers 11 connected with the gate line groups 13G_1 and 13G_2 are supplied with control signals for driving the gate line groups 13G_1 and 13G_2 at a driving frequency of about 60 Hz from the display control circuit 4 via the terminals 12g. The gate drivers 11 connected with the gate line group 13G_3 are supplied with control signals for driving the gate line group 13G_3 at a driving frequency of about 1 Hz from the display control circuit 4 via the terminals 12g.

Thus, in the pixel regions in the portion of the region S3 in which the gate line group 13G_3 is provided, the gate lines 13G are driven at a driving frequency of about 1 Hz and data signals are output at a driving frequency of about 1 Hz such that data is written 1/60 times. In the pixel regions in the portion of the region S1 in which the gate line group 13G_3 is provided, data signals are output at a driving frequency of about 60 Hz, but the gate lines 13G are driven at a driving frequency of about 1 Hz such that data is only written 1/60 times, and no data is written for the period corresponding to 59/60 times.

If, contrary to the above, the gate line groups 13G_1 and 13G_2 partially enter the region S3 such that the border between the gate line groups 13G_1 and 13G_2 and the gate line group 13G_3 is non-linear, then, in the pixel regions in the portion of the region S3 in which the gate line groups 13G_1 and 13G_2 are provided, data signals are output at a driving frequency of about 1 Hz, but the gate lines 13G are driven at a driving frequency of about 60 Hz. As a result, a voltage from the common electrode or the like may be written unintendedly during a period in which no data signal is being output. In view of this, the gate lines for driving the second region are suitably disposed so as not to partially enter the first region.

<Seventh Embodiment>

The sixth embodiment described above describes an implementation where different columns in the display region are driven at different driving frequencies. The present embodiment describes an implementation where different columns and different rows in the display region are driven at different driving frequencies.

Figure 19:
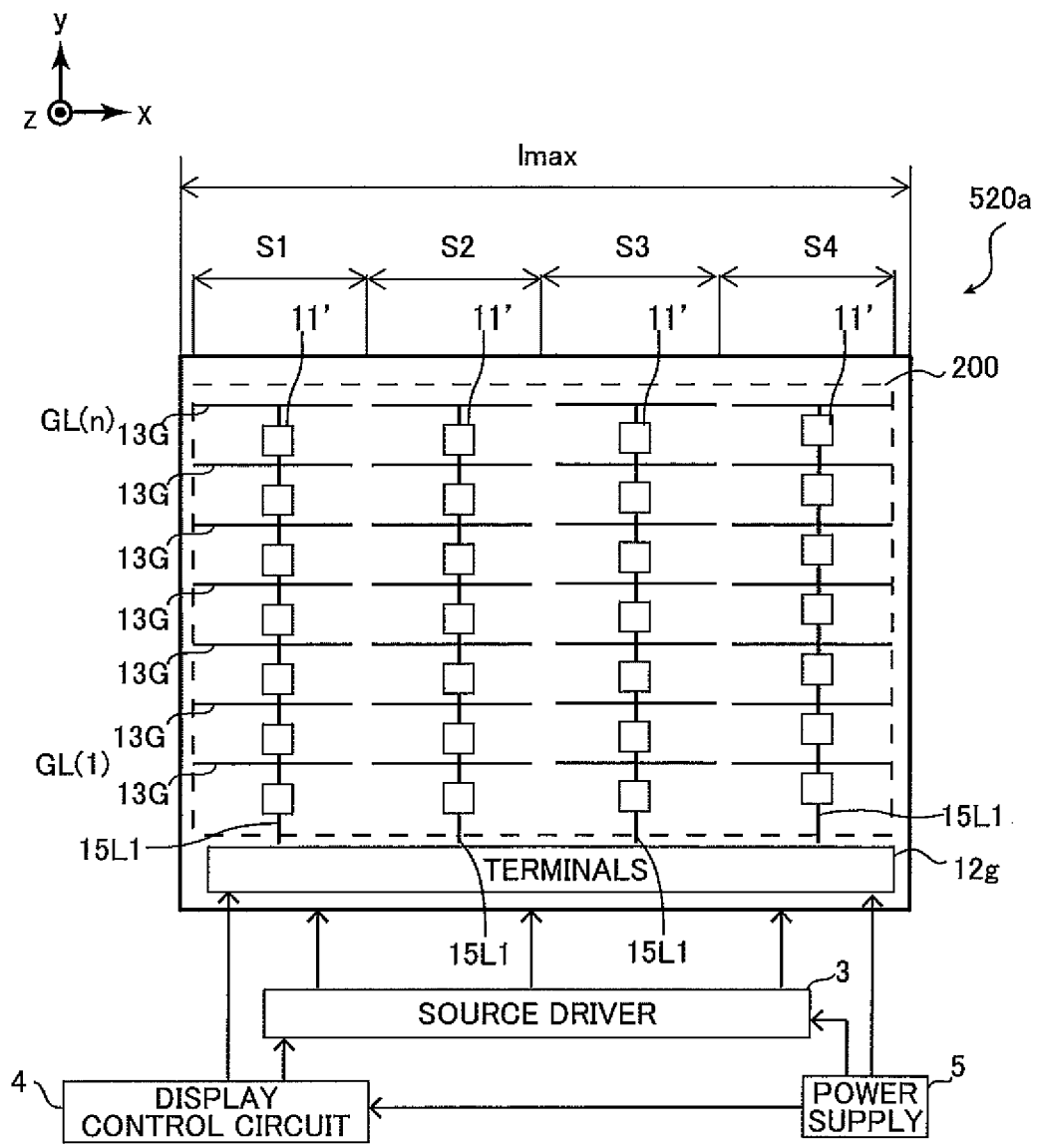
FIG. 19 is a schematic view of an active-matrix substrate according to a seventh embodiment.

FIG. 19 is a schematic plan view of an active-matrix substrate of the present embodiment. In the implementation of FIG. 19, the display region 200 of the active-matrix substrate 520a is divided into four sections arranged in the X-direction, and groups of gate lines 13G: GL(1) to GL(n) with a length that depends on the width of each section are provided in their respective sections. The columns forming these sections will be denoted by S1, S2, S3 and S4. In the present implementation, the gate lines 13G in each column has a length that is smaller than the width of the active-matrix substrate 520a measured in the X-direction (maximum value lmax).

Although shown in a simplified manner in FIG. 19, at least one gate driver 11' is provided between two adjacent gate lines 13G in each column, and, similar to the gate drivers of the first embodiment, the gate drivers 11' in each column are connected by a line 15L1 (see FIGS. 3, 5A to 5C, for example). The gate drivers 11' in each column receives control signals from the display control circuit 4 via its line 15L1. The gate lines 13G in each column are scanned by its gate drivers 11' at a predetermined driving frequency, beginning with GL(1) and ending with GL(n).

Although not shown in FIG. 19, groups of source lines 15S parallel to the Y-direction are provided in the display region 200 to cross the groups of gate lines 13G, and terminals 12s are provided in the portion of the picture-frame region that is adjacent to the source driver 3 for supplying data signals from the source driver 3 to the source lines 15S. The source driver 3 provides data signals to the source lines 15S (not shown) at a predetermined driving frequency.

Figure 20:
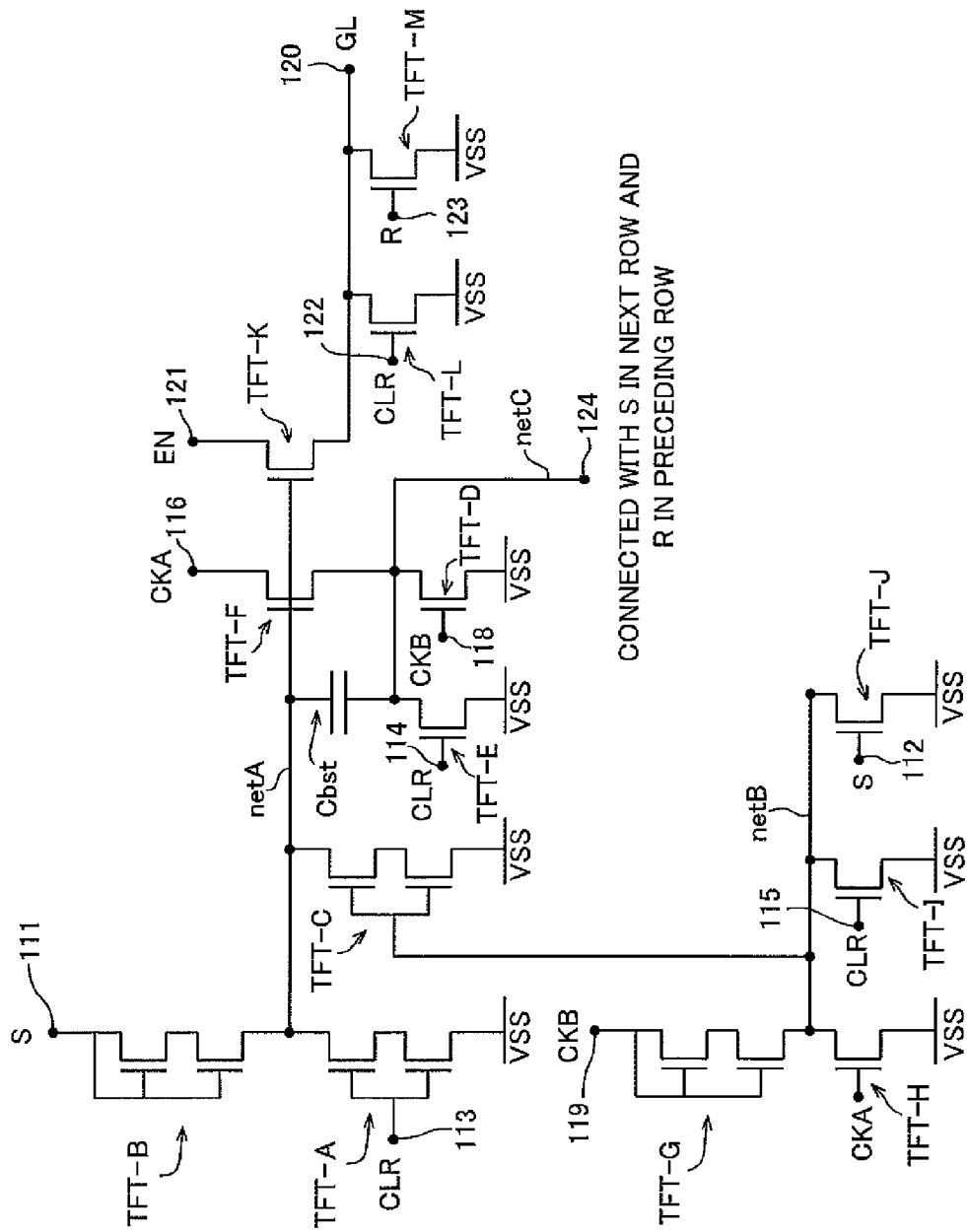
FIG. 20 is an example equivalent circuit of a gate driver according to the seventh embodiment.

The configuration of the gate drivers 11' of the present embodiment will be described. FIG. 20 shows an example equivalent circuit of a gate driver 11'. In this implementation, the gate driver 11' is provided between the gate lines 13G: GL(n−1) and GL(n). The gate driver 11' receives a set signal (S) from the gate driver 11' that scans the gate line 13G: GL(n−1) (i.e. the gate driver of the preceding row), drives the gate line 13G: GL(n) in response to a control signal, and provides a set signal (S) to the gate driver 11' that drives the gate line 13G: GL(n+1) (i.e. the gate driver of the next row).

As shown in FIG. 20, the gate driver 11' includes switching elements TFT-A to TFT-M constituted by TFTs, a capacitor Cbst, terminals 111 to 124, and a group of terminals for receiving low-level power supply voltage signals (VSS). That is, the gate driver 11' includes, in addition to the switching elements of the gate driver 11 of the first embodiment shown in FIG. 9, the elements TFT-K, TFT-L and TFT-M and terminals 121 to 124.

The terminal 121 receives a row selection signal (EN) from the display control circuit 4. The row selection signal (EN) is a power supply voltage signal indicating VDD (H level) or VSS (L level). The terminal 122 receives a reset signal (CLR) from the display control circuit 4. The terminal 123 receives, from the terminal 124 of the gate driver 11' of the next row, a signal (R) for switching the element TFT-M between on and off.

In FIG. 20, the element TFT-K has a gate terminal connected with the line netA, and a drain terminal connected with the terminal 121. The element TFT-K has a source terminal connected with the drain terminals of the elements TFT-L and TFT-M and the terminal 120. The terminal 120 is connected with the gate line 13G: GL(n).

The terminal TFT-L has a gate terminal connected with the terminal 122, a drain terminal connected with the source terminals of the elements TFT-K and TFT-M and the terminal 120, and a source terminal connected with the power supply voltage terminal VSS. The element TFT-M has a gate terminal connected with the terminal 123, a drain terminal connected with the source terminals of the elements TFT-K and TFT-L and the terminal 120, and a source terminal connected with the power supply voltage terminal VSS.

In this implementation, the line to which one electrode of the capacitor Cbst, the drain terminals of the elements TFT-E and TFT-D and the source terminal of the element TFT-F are connected will be referred as netC.

The row selection signal (EN) is a signal for controlling the driving of the gate line 13G: GL(n) between on and off. For example, when the gate line 13G: GL(n) is being scanned and the row selection signal (EN) indicating VDD (H level) is provided to the gate driver 11', the gate line 13G: GL(n) transitions from L level to H level in response to clock signals (CKA and CKB), and is driven. When the gate line 13G: GL(n) is being scanned and the row selection signal (EN) indicating VSS (L level) is provided to the gate driver 11', the gate line 13G: GL(n) maintains the L level. The operation of the gate driver 11' will be described in detail below.

Figure 21A:
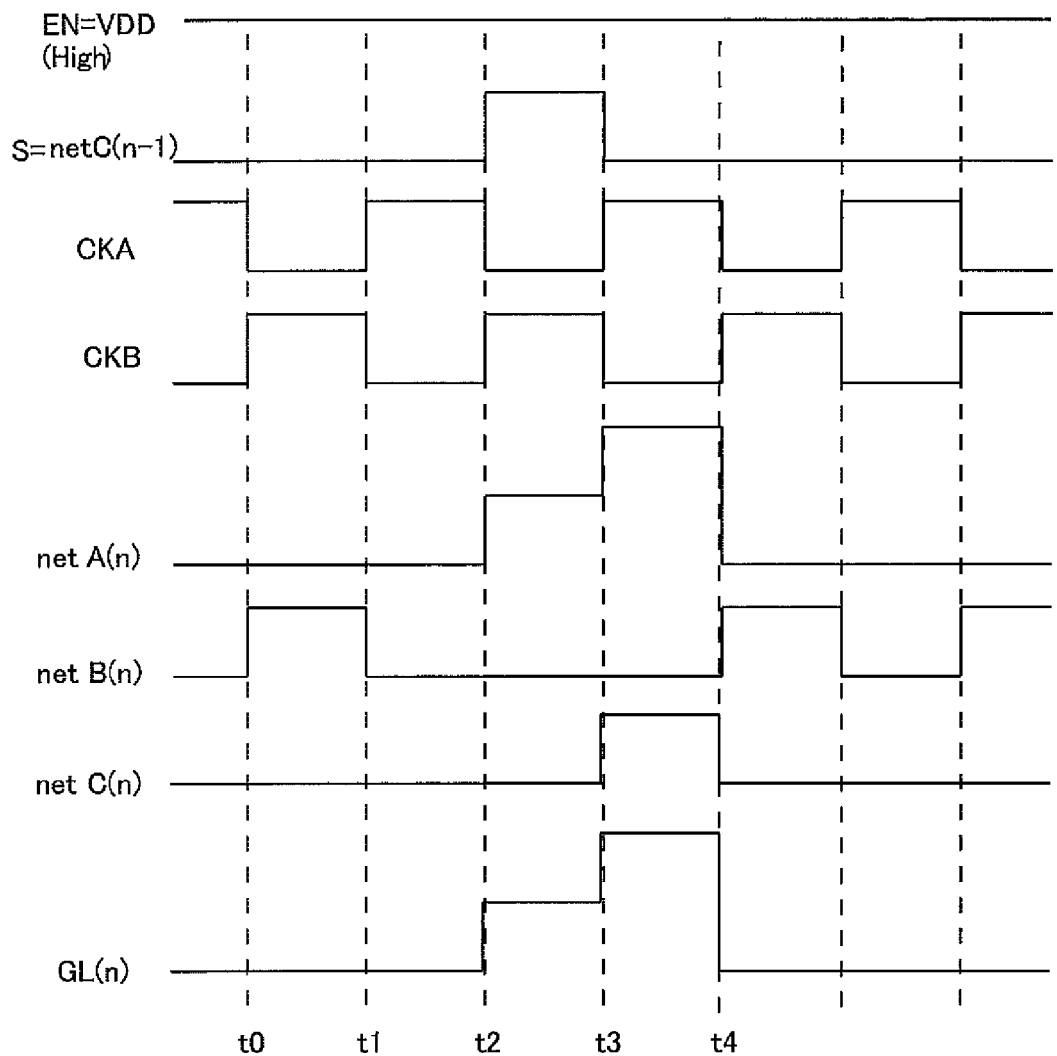
FIG. 21A is a timing chart showing signals encountered when the gate driver shown in FIG. 20 scans a gate line.

FIG. 21A is a timing chart illustrating how the row selection signal (EN) indicating VDD (H level) provided to the gate driver 11' scans gate lines 13G. In FIG. 21A, the period from t3 to t4 is the period in which the gate line 13G: GL(n) is being selected. The clock signals (CKA) and (CKB) supplied from the display control circuit 4 and reversed in phase for each horizontal scan period are provided to the gate driver 11' via the terminals 116 to 119. Although not shown in FIG. 21A, the reset signal (CLR) that goes to H level for each vertical scan period and remains that way for a predetermined period of time is provided to the gate driver 11' from the display control circuit 4 via the terminals 113 to 115 and 122. When the reset signal (CLR) is supplied, the lines netA, netB and netC and gate line 13G transition to L level.

From time t0 to t1 in FIG. 21A, the clock signal (CKA) at L level is provided to the terminals 116 and 117 and the clock signal (CKB) at H level is supplied to the terminals 118 and 119. Thus, the element TFT-G is turned on and the element TFT-H is turned off such that the line netB is charged to H level. Further, the elements TFT-C and TFT-D are turned on and the element TFT-F is turned off such that the line netA is charged to the L level power supply voltage (VSS) and the potential at L level is provided by the terminal 120.

Next, at time t1, the clock signal (CKA) goes to H level and the clock signal (CKB) goes to L level, which turns the element TFT-G off and turns the element TFT-H on such that the line netB is charged to L level. The elements TFT-C and TFT-D are turned off such that the potentials of the lines netA and netC are maintained at L level. Since the elements TFT-L and TFT-M are off, the terminal 120 maintains the L level potential.

At time t2, the clock signal (CKA) goes to L level and the clock signal (CKB) goes to H level such that the set signal (S) is supplied to the terminals 111 and 112 via the line netC(n−1). Thus, the element TFT-B is turned on and the line netA is charged to H level. Further, the element TFT-J is turned on, the element TFT-G is turned on and the element TFT-H is turned off such that the line netB is maintained at L level. Further, the elements TFT-C and TFT-F are turned off such that the potential of the line netA does not fall but is maintained. The elements TFT-L and TFT-M are off such that the H level potential of the line netA is provided to the gate line 13G: GL(n) from the terminal 120. During this, the element TFT-D is on, such that the L level potential of the line netC is provided to the terminals 111 and 112 of the gate driver 11' of the next row and the terminal 123 of the gate driver 11' of the preceding row from the terminal 124.

At time t3, the clock signal (CKA) goes to H level and the clock signal (CKB) goes to L level, which turns the element TFT-F on and turns the element TFT-D off. Since the capacitor Cbst is provided between the line netA and the terminal 124, the line netA is charged as the potential of the terminal 116 of the element TFT-F rises, and reaches a potential that is higher than the H level of the clock signal (CKA), and the line netC is also charged to H level. During this, the elements TFT-G and TFT-J are off and the element TFT-H is on such that the potential of the line netB is maintained at L level. Since the element TFT-C is off, the potential of the line netA does not fall. As such, the elements TFT-L and TFT-M are off, such that the H level potential of the clock signal (CKA) is provided to the gate line 13G: GL(n) from the terminal 120. Further, the H level potential of the line netC is provided, as a set signal (S) for the gate driver 11' of the next row, to the terminals 111 and 112 of the gate driver 11' of the next row from the terminal 124. Further, the H level potential of the line netC is provided, as a signal (R) for the gate driver 11' of the preceding row, to the terminal 123 of the gate driver 11' of the preceding row from the terminal 124. Thus, the element TFT-M of the gate driver 11' of the preceding row is turned on and the potential of the gate line 13G: GL(n-1) transitions from H level to L level. The gate line 13G: GL(n) is charged to H level and is in the selected state.

At time t4, the clock signal (CKA) goes to L level and the clock signal (CKB) goes to H level, which turns the element TFT-G on and turns the element TFT-H off, such that the line netB is charged to H level. Thus, the element TFT-C is turned on and the potential of the line netA transitions from H level to L level. Further, the element TFT-D is on and the element TFT-F is off such that the potential of the line netC transitions from H level to L level. The H level potential (VDD) of the line netC(n+1) is provided to the terminal 123 and the element TFT-M is turned on. Thus, the L level potential is provided to the gate line 13G: GL(n) from the terminal 120 and the gate line 13G: GL(n) is charged to L level. The L level potential of the line netC is provided to the gate driver 11' of the next row and the gate driver 11' of the preceding row from the terminal 124.

Figure 21B:
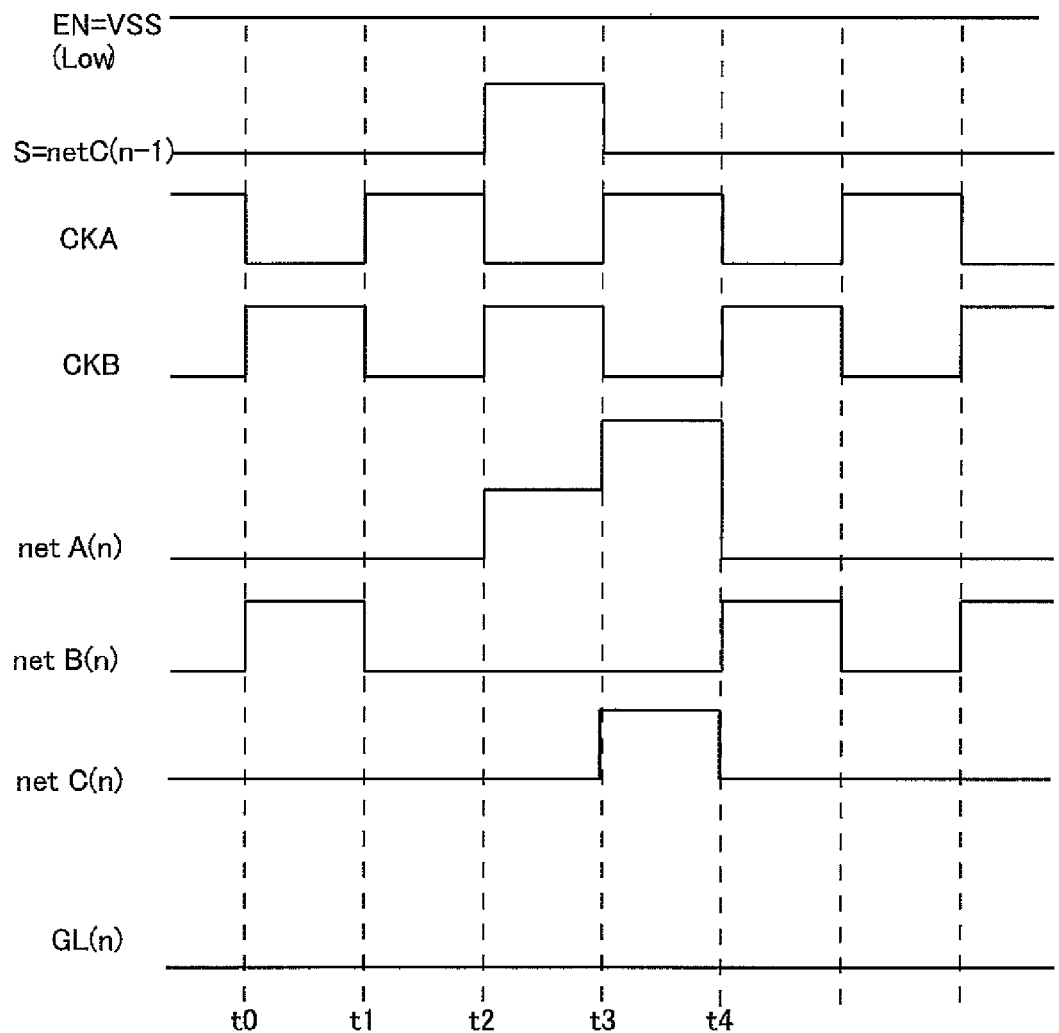
FIG. 21B is a timing chart showing signals encountered when the gate driver shown in FIG. 20 scans a gate line.

FIG. 21B is a timing chart illustrating how the row selection signal (EN) indicating VSS (L level) provided to the gate driver 11' scans the gate line 13G. In connection with FIG. 21B, the operations until time t2 are the same as those for FIG. 21A, and thus will not be described.

At time t2, the clock signal (CKA) goes to L level and the clock signal (CKB) goes to H level such that the set signal (S) is provided to the terminals 111 and 112 via the line netC(n-1). Thus, the element TFT-B is on and the line netA is charged to H level; however, since the L level row selection signal (EN) is provided to the terminal 121, the L level potential of the line netA is provided to the gate line 13G: GL(n) from the terminal 120.

At time t3, the clock signal (CKA) goes to H level and the clock signal (CKB) goes to L level, which turns the element TFT-F on and turns the element TFT-D off. The line netA is charged to a potential that is higher than the H level of the clock signal (CKA) and the line netC is charged to H level, and the L level row selection signal (EN) is provided to the terminal 121. Thus, the L level potential is provided to the gate line 13G: GL(n) from the terminal 120. The H level potential of the line netC is provided from the terminal 124 as a set signal (S) for the gate driver 11' of the next row and is provided from the terminal 124 as a signal (R) for the gate driver 11' of the preceding row. Thus, as the row selection signal (EN) at VSS (L level) is supplied, the gate line 13G: GL(n) maintains the L level potential and thus is not driven.

Thus, the circuit portion composed of elements TFT-K, TFT-L and TFT-M of the gate driver 11' of the present embodiment provides a signal for switching the gate line 13G: GL(n) to the selected or non-selected state in response to the row selection signal (EN) supplied from the display control circuit 4, and the other circuit portion of the gate driver 11' provides a set signal to the gate driver 11' of the next row based on the start pulse from the display control circuit 4 or the set signal (S) from the gate driver 11' of the preceding row, and the clock signals from the display control circuit 4.

Figure 22A:
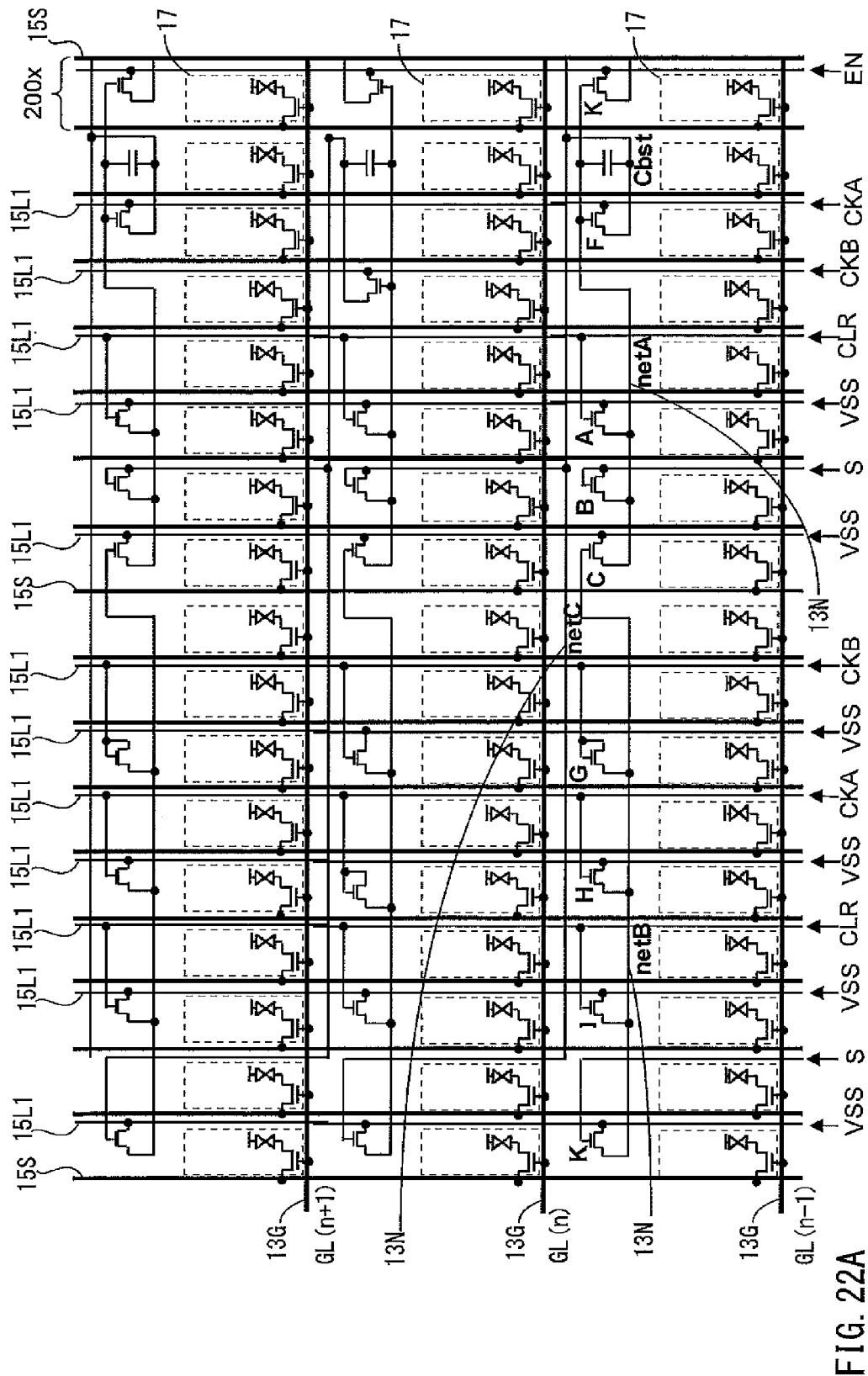
FIG. 22A illustrates an example arrangement of the gate driver shown in FIG. 20.
Figure 22B:
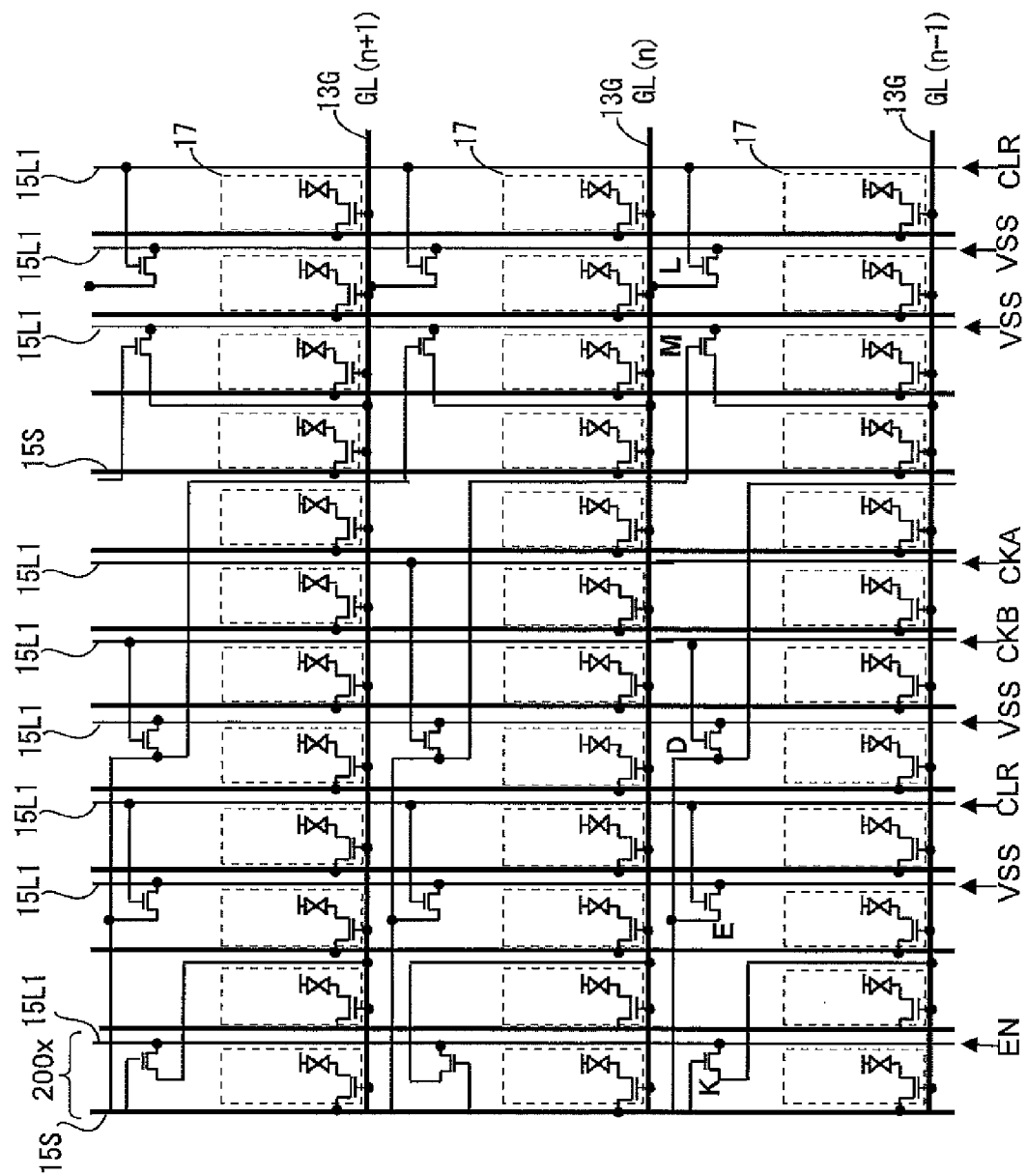
FIG. 22B illustrates the example arrangement of the gate driver shown in FIG. 20.

An example arrangement of a gate driver 11' in the display region 200 will be described below. FIGS. 22A and 22B illustrate the overall layout of a gate driver 11' disposed between the gate lines 13G: GL(n-1) to GL(n+1). For convenience, the illustration is divided into FIGS. 22A and 22B; in reality, they are connected at the column 200x of FIG. 22A and the column 200x of FIG. 22B and are continuous.

In FIGS. 22A and 22B, a pixel electrode 17 is provided in each pixel region formed by a source line 15S and a gate line 13G. A group of elements constituting one gate driver 11' are provided between gate lines 13G. For convenience, in FIGS. 22A and 22B, the characters "TFT-" are omitted from the switching elements of the driver 11'; "A" to "M" shown in FIGS. 22A and 22B indicate TFT-A to TFT-M of the gate driver 11' shown in FIG. 20. The gate driver 11' provided between the gate lines 13G: GL(n-1) to GL(n) receives a set signal (S) from the gate driver 11' of the preceding row that drives the gate line 13G: GL(n-1), drives the gate line GL(n) in response to the control signals (CKA, CKB, EN, CLR and VSS), and provides a set signal (5) to the gate driver 11' of the next row that drives the gate line 13G: GL(n+1).

The elements of the gate driver 11' shown in FIG. 20 are dispersed in different pixel regions. The gate driver 11' of each row is disposed in such a way that the clock signals (CKA and CKB) provided to its switching elements (TFT-D, TFT-F, TFT-G and TFT-H) are in the phase opposite to that for the clock signals (CKA and CKB) provided to the corresponding switching elements of the preceding and next rows. In FIGS. 22A and 22B, the elements of the gate driver 11' do not overlie the pixel electrodes 17 of the pixel regions where they are disposed; however, as described in connection with the first embodiment (see FIGS. 7A to 7D), a shield layer 16 is provided between the pixel electrodes 17 and the elements; as such, even if the elements overlie pixel electrodes 17, they are prevented from interfering with the pixel electrodes 17.

A pixel region in which an element receiving one of the clock signals (CKA and CKB), reset signal (CLR), row selection signal (EN) and power supply voltage signal (VSS) is disposed includes a line 15L1 for supplying this signal. The line 15L1 extends across the pixel regions in which the gate driver 11' is disposed across the gate lines GL(n-1) to GL(n+1) so as to be generally parallel to the source lines 15S.

The lines netA, netB and netC in the gate driver 11' are constituted by lines 13N formed by the gate line layer 13, similar to those of the gate driver 11 shown in FIG. 9. The lines 13N extend across the pixel regions in which the elements connected with the lines netA, netB and netC are disposed so as to be generally parallel to the gate lines 13G.

Figure 23A:
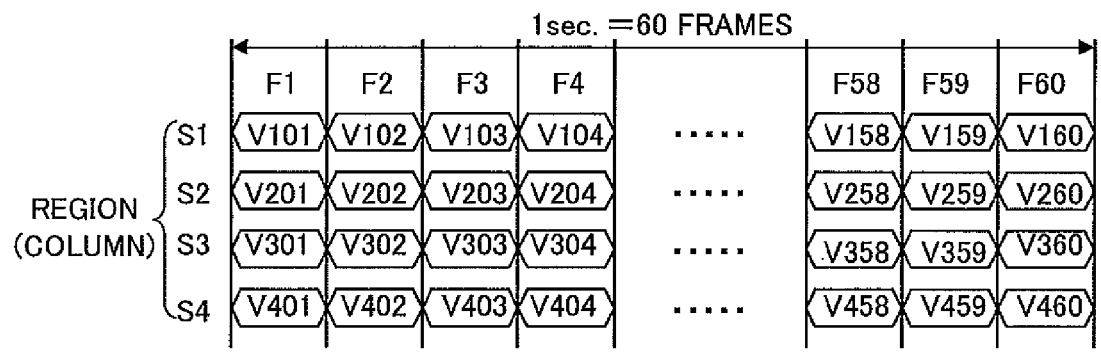
FIG. 23A illustrates example moving image data to be displayed on the active-matrix substrate shown in FIG. 19.

How a moving image (for about 60 Hz) is displayed on the display region 200 shown in FIG. 19 will be described below. FIG. 23A illustrates example data for the frames to be written to the regions of the columns S1 to S4 in the display region 200. To the region of the column S1 are written data sets V101, V102, . . . , V160 for the frames F1 to F60. To the region of the column S2 are written data sets V201, V202, . . . , V260 for the frames F1 to F60. To the region of the column S3 are written data sets V301, V302, . . . , V360 for the frames F1 to F60. To the region of the column S4 are written data sets V401, V402, . . . , V460 for the frames F1 to F60.

Figure 23B:
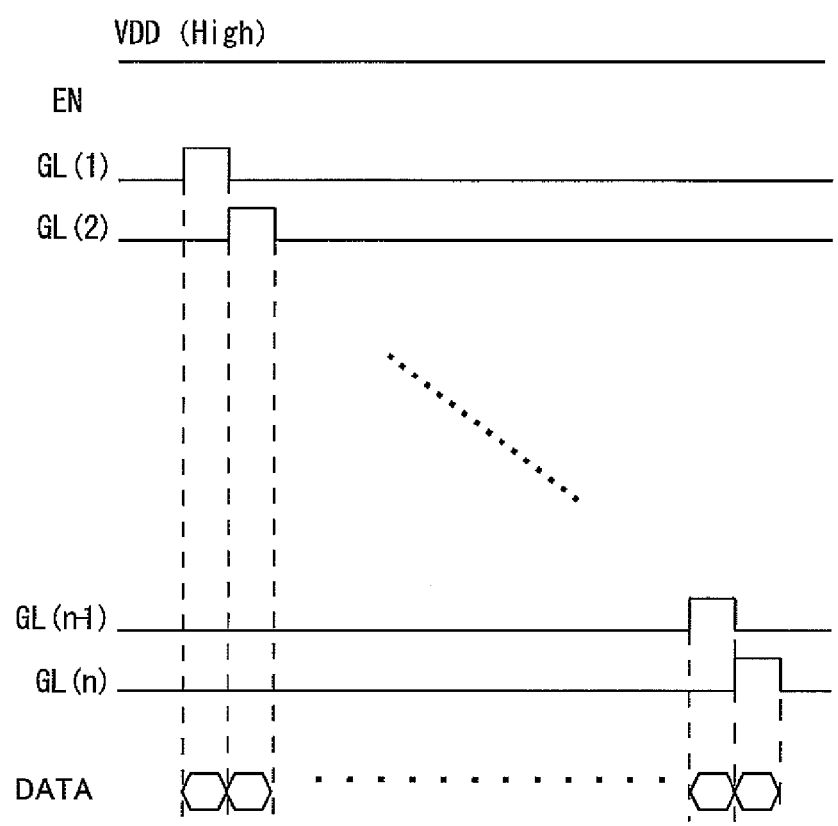
FIG. 23B illustrates drive timing when a moving image is to be displayed on the active-matrix substrate shown in FIG. 19.

FIG. 23B illustrates drive timing when the display region 200 is driven at a driving frequency of 60 Hz. When a moving image for about 60 Hz is to be displayed in each of the regions of the columns S1 to S4, the row selection signal (EN) indicating VDD (H level) is provided to the terminal 121 of each gate driver 11' in each column from the display control circuit 4 during a period in which the gate lines 13G: GL(1) to GL(n) are scanned. Further, the clock signals (CKA and CKB) are supplied to the gate drivers 11' for driving the gate lines 13G in the various columns at a driving frequency of 60 Hz. Thus, in response to the clock signals (CKA and CKB), the gate drivers 11' in the columns S1 to S4 scan the gate lines 13G of the columns at a driving frequency of 60 Hz, such that the gate lines 13G are driven as shown in FIG. 23B, beginning with GL(1) and ending with GL(n).

Further, data signals for the frames shown in FIG. 23A are provided to the source lines 15S (see FIG. 22) in the regions of the various columns at a driving frequency of 60 Hz from the source driver 3. Thus, as shown in FIG. 23B, the data of the data signals for the frames provided to the source lines 15S (see FIG. 22) of the various columns are written to the pixel regions for the first to 60th frames at time points at which the gate lines 13G: GL(1) to GL(n) in the various columns are consecutively driven.

Figure 24A:
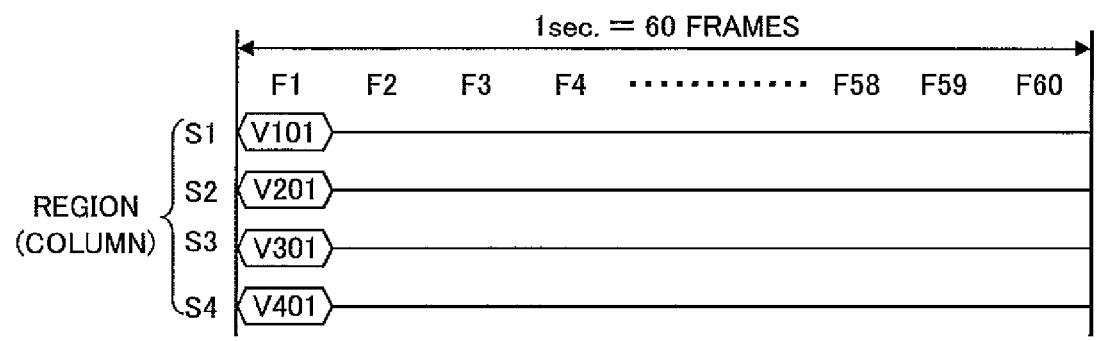
FIG. 24A illustrates example still image data to be displayed on the active-matrix substrate shown in FIG. 19.

How data is written when a still image is displayed on the display region 200 shown in FIG. 19 will be described below. FIG. 24A illustrates example data of frames to be written to the regions of the columns S1 to S4 in the display region 200. In the present embodiment, when still image data is to be written, data is written to the regions of the various columns only for the first frame, and no data is written for the second to 60th frames. Thus, until scanning of the regions of the columns S1 to S4 for the first frame is finished, the source driver 3 provides data signals of the data sets V101, V201, V301 and V401 for the frame F1, and, for the second to 60th frames, provides a data signal having a potential that is about the same as the potential of the common electrode, for example.

Figure 24B:
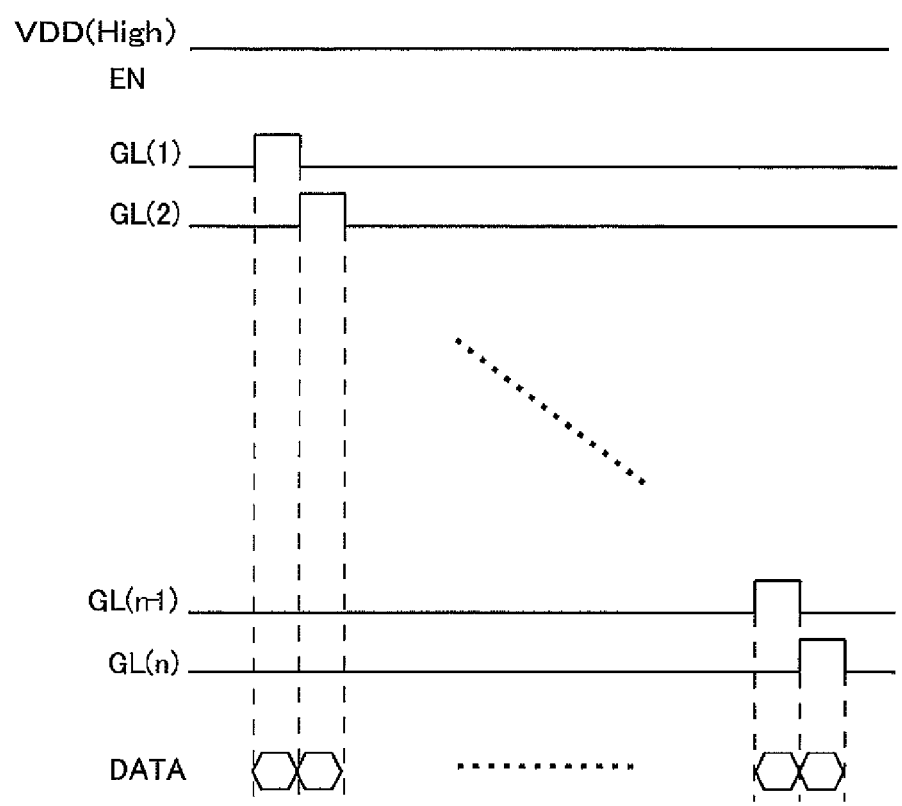
FIG. 24B illustrates drive timing for the first frame when a still image is to be displayed on the active-matrix substrate shown in FIG. 19.

FIG. 24B shows the driving timing for the first frame. As shown in FIG. 24B, for the first frame, the row selection signal (EN) indicating VDD (H level) is provided to the gate drivers 11' in the various columns from the display control circuit 4. The clock signals (CKA and CKB) are supplied to the gate drivers 11' so as to drive the gate lines 13G in the various columns at a driving frequency of 60 Hz. Data signals for the first frame shown in FIG. 24A are provided to the source lines 15S (see FIG. 22) in the regions of the various columns from the source driver 3 at a driving frequency of 60 Hz. Thus, as shown in FIG. 24B, the data of the data signals for the first frame provided to the source lines 15S (see FIGS. 22A and 22B) in the various columns is written to the pixel regions at the time points at which the gate lines 13G: GL(1) to GL(n) are consecutively driven.

Figure 24C:
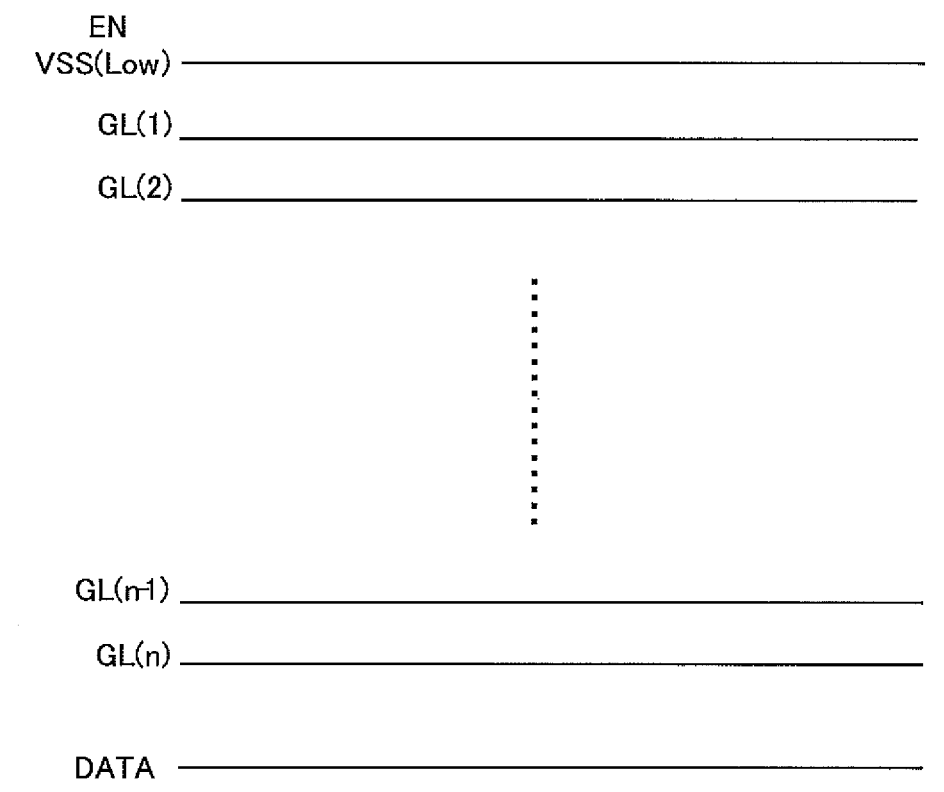

For the second to 60th frames, the display control circuit 4 provides the row selection signal (EN) indicating VSS (L level) to the gate drivers 11' in the various columns, and the source driver 3 provides a data signal indicating the potential of the column electrode to the source lines 15S (see FIGS. 22A and 22B). Thus, as shown in FIG. 24C, the gate lines 13G: GL(1) to GL(n) in the various columns are not driven, and the data of the data signals provided to the source lines 15S (see FIGS. 22A and 22B) in the various columns is not written. Thus, when a still image is to be written, the gate lines 13G are driven only for the first frame and the gate lines 13G are not driven for the second to 60th frames to save power. Since the gate lines 13G are not driven for the second to 60th frames, the display control circuit 4 do not have to supply the clock signals (CKA and CKB) for the second to 60th frames. This configuration will further reduce power consumption.

Figure 25:
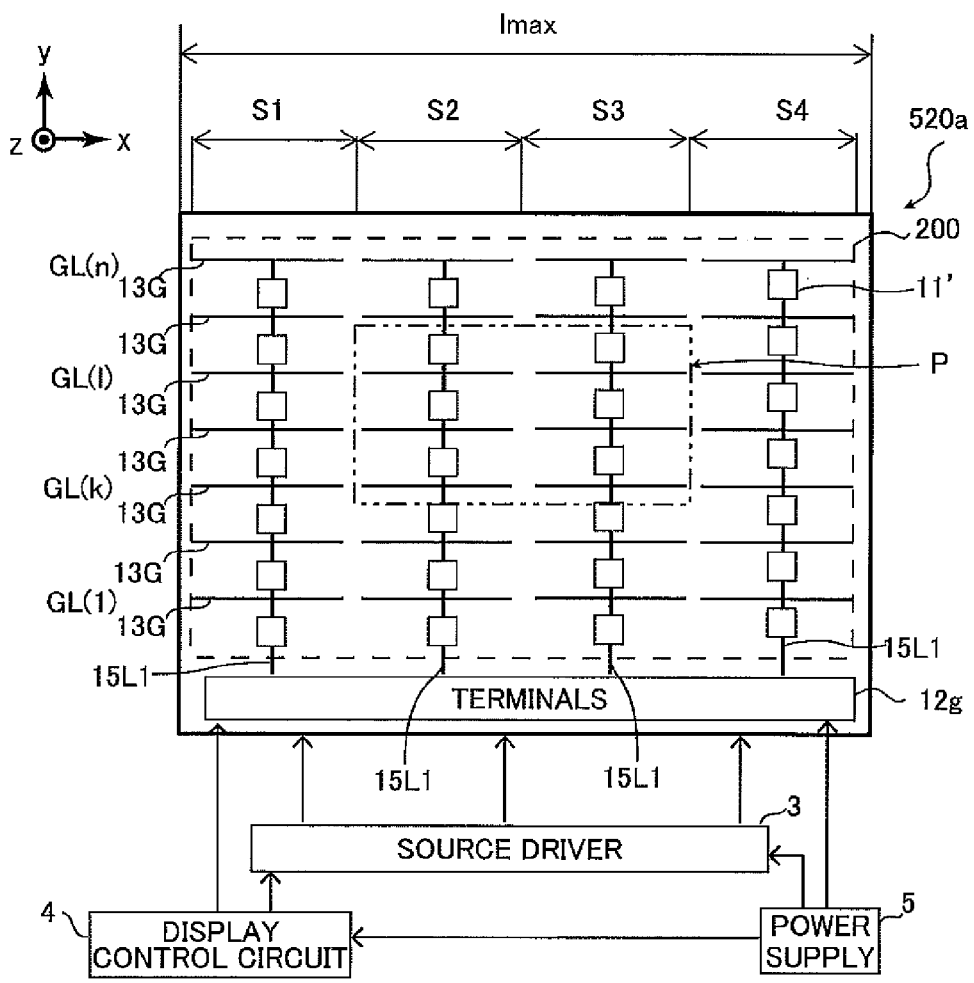
FIG. 25 shows the active-matrix substrate shown in FIG. 19 where a portion of the display region displays a moving image.

An implementation of the active-matrix substrate 520a where a moving image for about 60 Hz is displayed in a region P in the display region 200 shown in FIG. 25 and a still image is displayed in the remaining region will be described below. In the implementation of FIG. 25, the region P includes the gate lines 13G: GL(k) to GL(l) in the regions of the columns S2 and S3.

Figure 26:
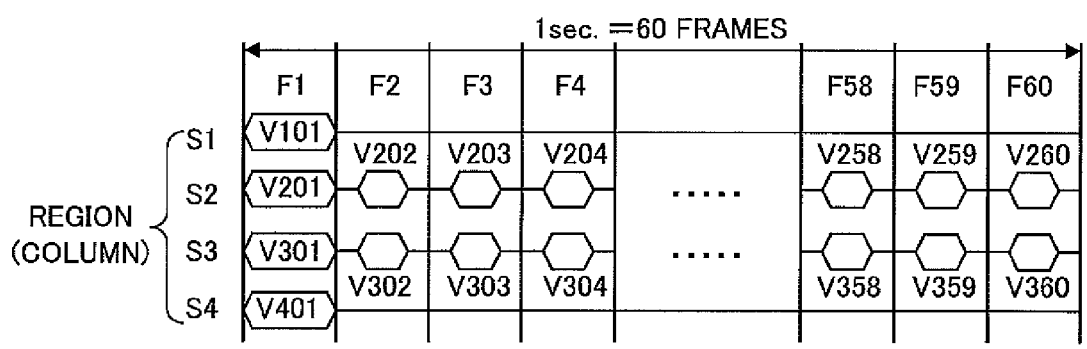
FIG. 26 illustrates example data to be displayed on the active-matrix substrate shown in FIG. 25.

FIG. 26 illustrates example data for the frames to be written in the regions of the columns S1 to S4 in the display region 200. Since a still image is displayed in the regions of the columns S1 and S4, data is written to the regions of the columns S1 and S4 only for the first frame, and data is not written for the second to 60th frames, as shown in FIG. 26.

Until scanning of the gate lines 13G in the regions of the columns S1 and S2 for the first frame is finished, the source driver 3 provides data signals of the data sets V101 and V401 for the frame F1 to the source lines 15S (see FIGS. 22A and 22B) in the columns S1 and S2.

Since the region P in the columns S2 and S4 displays a moving image and the remaining region displays a still image, the source driver 3 provides the data signals indicating V201 and V301 to be displayed in the regions of the columns S2 and S3 to the source lines 15S in the columns S2 and S3 (see FIGS. 22A and 22B) until scanning of the gate lines 13G in the columns S2 and S3 for the first frame is finished.

For the first frame, the display control circuit 4 provides the row selection signal (EN) indicating VDD (H level) to the gate drivers 11' in the columns S1 to S4, and supplies the clock signals (CKA and CKB) for driving the gate lines 13G at a driving frequency of 60 Hz. Thus, as shown in FIG. 23B, the data sets (V101 to V401) for the columns for the first frame are written to the display region 200 at the time points at which the gate lines 13G in the various columns are consecutively driven.

For the second and following frames, the source driver 3 provides a data signal having a potential that is about the same as the potential of the common electrode to the source lines 15S (see FIGS. 22A and 22B) in the columns S1 and S4. Further, the source driver 3 provides the data signals indicating the data sets V202 to V260 and V302 to V360 for the frames to be displayed in the region P to the source lines 15S (see FIGS. 22A and 22B) in the columns S2 and S3.

For the second and following frames, the display control circuit 4 supplies the row selection signal (EN) indicating VSS (L level) to the gate drivers 11' in the columns S1 and S4. Further, the circuit supplies the row selection signal (EN) indicating VSS (L level) to the gate drivers 11' in the columns S2 and S3 during the scan period for the gate lines 13G: GL(1) to GL(k−1), and supplies the row selection signal (EN) indicating VDD (H level) during the scan period for the gate lines 13G: GL(k) to GL(l). The circuit supplies the row selection signal (EN) indicating VSS (L level) during the scan period for the gate lines 13G: GL(l+1) to GL(n).

Figure 27A:
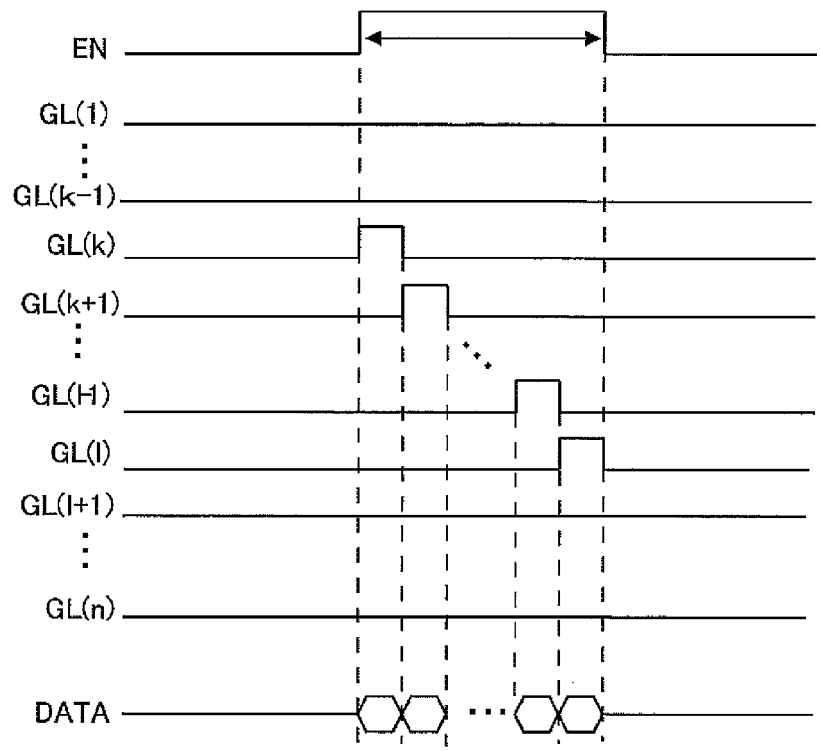
FIG. 27A illustrates drive timing for the second to sixtieth frames for the region P in the active-matrix substrate shown in FIG. 25.
Figure 27B:
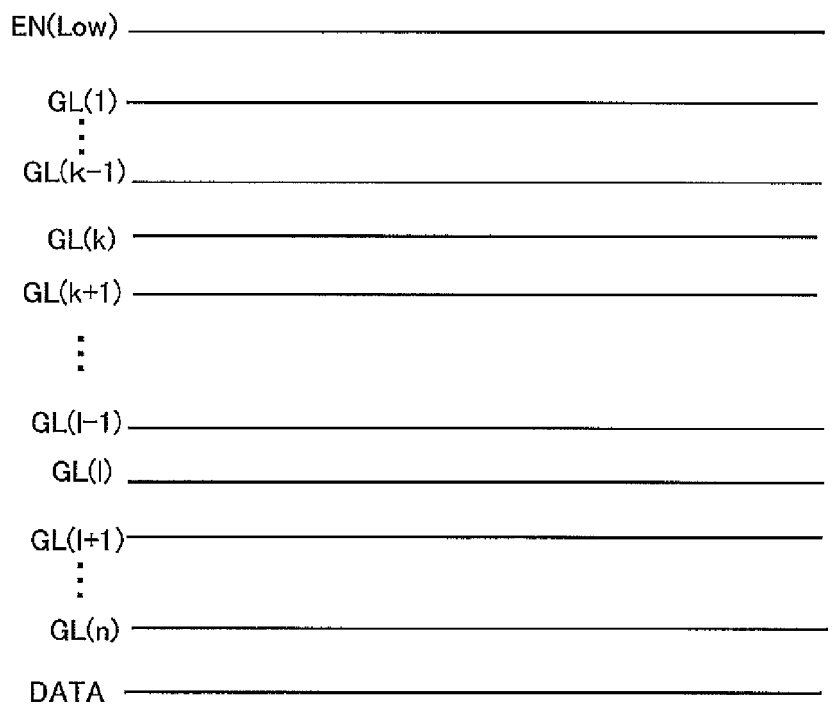
FIG. 27B illustrates drive timing for the second to sixtieth frames for the region other than the region P in the active-matrix substrate shown in FIG. 25.

Thus, for the second to 60th frames, in the regions of the columns S2 and S3, as shown in FIG. 27A, the row selection signal (EN) is at H level during the scan period for the gate lines 13G: GL(k) to GL(l) for each frame, and data is written to the region P at the time points at which the gate lines 13G: GL(k) to GL(l) are consecutively driven. On the other hand, in the regions of the columns S1 and S4, for the second to 60th frames, as shown in FIG. 27B, the row selection signal (EN) is at L level during the period in which the gate lines 13G: GL(1) to GL(n) are scanned such that the gate lines 13G in the columns S1 and S4 are not driven and no data is written.

<Eighth Embodiment>

In the third and fourth embodiments described above, terminals 12s are provided in the portion of the picture-frame region adjacent the side along which the terminals 12g are provided, and data signals are supplied to the source lines 15S via the terminals 12s. In the present embodiment, a non-display region is provided within the display region, as is the case with the third and fourth embodiments, but terminals for supplying data signals are also provided adjacent the side opposite the side along which the terminals 12s are provided, and data signals are supplied to the source lines 15S from both sets of terminals.

Figure 28A:
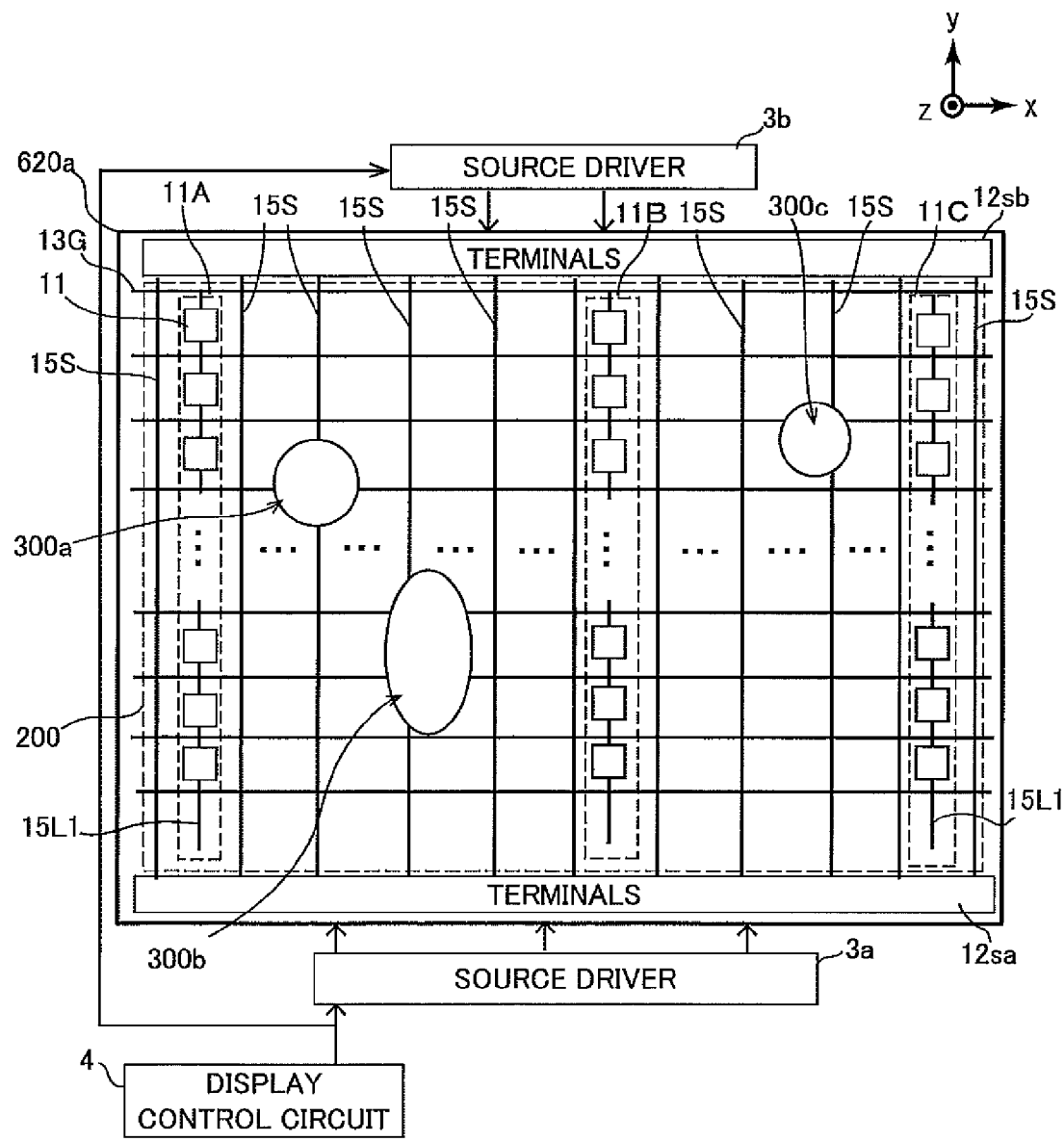
FIG. 28A is a schematic view of an active-matrix substrate according to an eighth embodiment.

FIG. 28A is a schematic view of the active-matrix substrate of the present embodiment and the various components connected with the active-matrix substrate. As illustrated in FIG. 28A, similar to the active-matrix substrate of the third embodiment, the active-matrix substrate 620a includes a plurality of gate lines 13G and a plurality of source lines 15S. In this implementation, groups of gate drivers 11A, 11B and 11C are provided in the display region 200. Each gate driver group includes gate drivers 11 corresponding to the gate lines 13G. The gate drivers 11 in each gate driver group is connected via a line 15L1, as described above.

The active-matrix substrate 620a includes terminals 12sa and 12sb for supplying data signals. The terminals 12sa and 12sb are provided in the picture-frame region and disposed along two sides that extend generally parallel to each other in the direction in which the gate drivers 13G extend (i.e. X-direction). Outside the active-matrix substrate 620a is provided a source driver 3a, located adjacent the side along which the terminals 12sa are provided. The terminals 12sa are connected with the source driver 3a. Also outside the active-matrix substrate 620a is provided a source driver 3b, located adjacent the side along which the terminals 12sb are provided. The terminals 12sb are connected with the source driver 3b. The source drivers 3a and 3b provide the same data signals to the terminals 12sa and 12sb simultaneously.

Although the terminals 12g are not shown in FIG. 28A, the terminals 12g are located in the portion of the picture-frame region along which the terminals 12sa are provided. Further, although the power supply 5 (see FIG. 14, for example) is not shown in the present implementation, the power supply 5 is provided adjacent the side along which the terminals 12g are provided, similar to the power supply of the third embodiment. The power supply 5 provides a power supply voltage signal to the active-matrix substrate 620a, display control circuit 4 and source drivers 3a and 3b.

The active-matrix substrate 620a includes non-display regions 300a and 300b located between the gate driver groups 11A and 11B, and a non-display region 300c located between the gate driver groups 11B and 11C. The gate lines 13G and source lines 15S that would cross each other at the non-display regions 300a, 300b and 300c are divided at the non-display regions 300a, 300b and 300c.

The source lines 15S on which none of the non-display regions 300a, 300b and 300c is located extend from the terminals 12sa to the terminals 12sb and are connected with the terminals 12sa and 12sb. Thus, the source lines 15S on which none of the non-display regions 300a, 300b and 300c is located are supplied with data signals from the source driver 3a via the terminals 12sa and supplied with data signals from the source driver 3b via the terminals 12sb.

The portions of the source lines 15S divided at the non-display regions 300a, 300b and 300c that are located closer to the terminals 12sa are connected with the terminals 12sa, and are supplied with data signals by the source driver 3a. The portions of those source lines 15S that are located closer to the terminals 12sb are connected with the terminals 12sb, and are supplied with data signals by the source driver 3b.

Figure 28B:
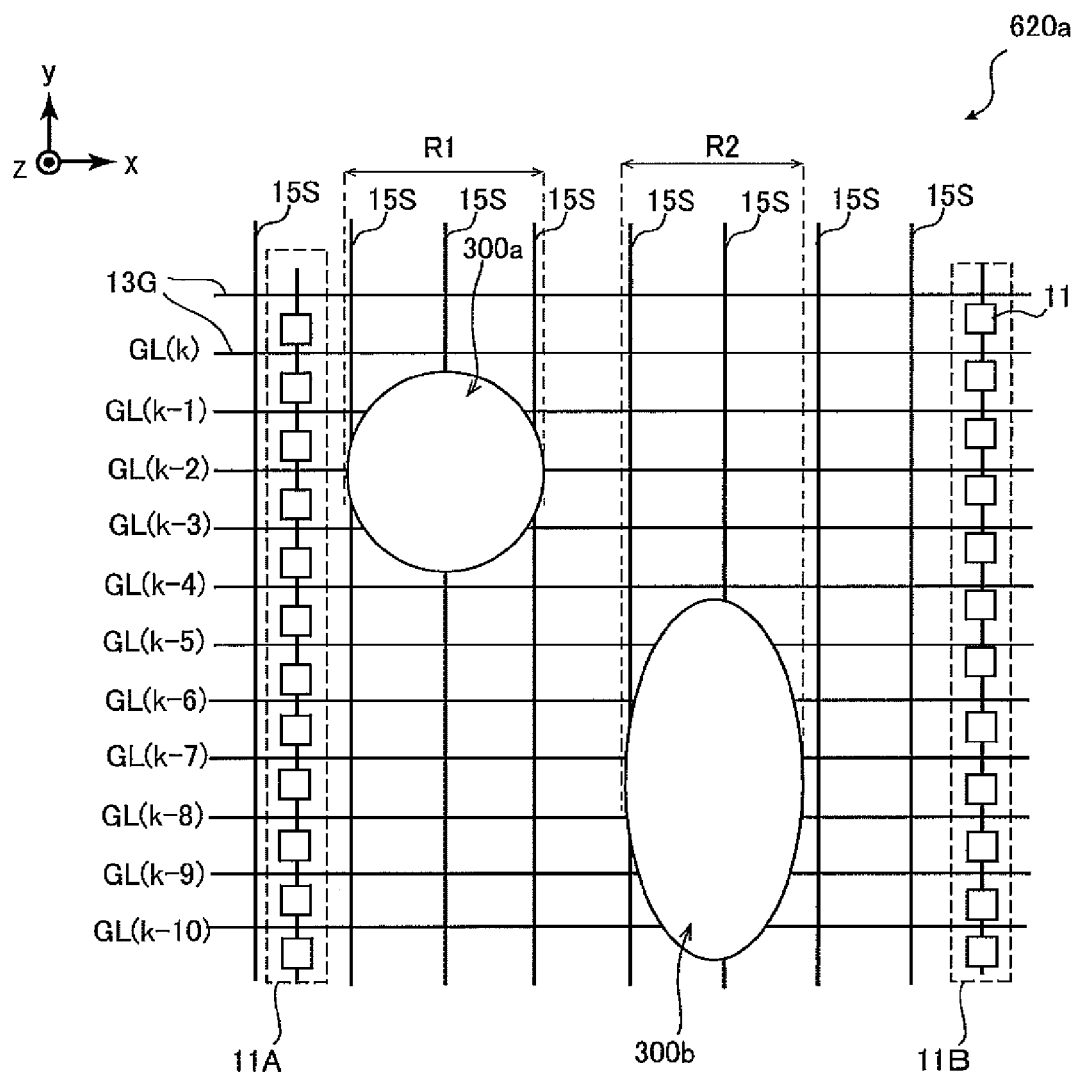
FIG. 28B is an enlarged schematic view of a part of the active-matrix substrate shown in FIG. 28A.

FIG. 28 is an enlarged schematic view of the portion of the substrate of FIG. 28A that includes the non-display regions 300a and 300b. As illustrated in FIG. 28B, the active-matrix substrate 620a includes a region with a width R1 measured in the x-direction of the non-display region 300a and a region with a width R2 measured in the x-direction of the non-display region 300b, and the source lines 15S located in these regions are divided and extend only to the vicinities of the borders of the non-display regions 300a and 300b. Those of the source lines 15S divided at the non-display regions 300a that are located closer to the terminals 12sa are supplied with data signals via the terminals 12sa, while those of the source lines 15S that are located closer to the terminals 12sb are supplied with data signals via the terminals 12sb.

The gate lines 13G of the rows where the non-display regions 300a and 300b are located (i.e. GL(k−3) to GL(k−1) and GL(k−10) to GL(k−5)) are divided and only extend to the vicinities of the borders of the non-display regions 300a and 300b. In this implementation, those portions of the gate lines 13G: GL(k−3) to GL(k−1) that are located to the left of the non-display region 300a (toward the negative x-direction) are driven by the gate drivers 11 of the gate driver group 11A that drive the gate lines GL(k−3) to GL(k−1). Those portions of the gate lines 13G: GL(k−3) to GL(k−1) that are located to the right of the non-display region 300a (toward the positive x-direction) are driven by the gate drivers 11 of the gate driver group 11B that drive the gate lines GL(k−3) to GL(k−1).

Those portions of the gate lines 13G: GL(k−10) to GL(k−5) that are located to the left of the non-display region 300b (toward the negative x-direction) are driven by the gate drivers 11 of the gate driver group 11A that drive the gate lines GL(k−10) to GL(k−5). Those portions of the gate lines 13G: GL(k−10) to GL(k−5) that are located to the right of the non-display region 300b (toward the positive x-direction) are driven by the gate drivers 11 of the gate driver group 11B that drive the gate lines GL(k−10) to GL(k−5).

As illustrated in FIGS. 28A and 28B, if a plurality of gate drivers 11 are provided for one gate line 13G and a plurality of non-display regions are provided between the gate drivers, the non-display regions are suitably located such that the gate lines 13G and source lines 15S that cross at one non-display region are different from the gate lines and source lines that cross at another non-display region. This arrangement allows the portions of the gate lines 13G to the left of the non-display regions to be driven by the gate drivers 11 located to the left of the non-display regions, and allows the portions of the gate lines 13G to the right of the non-display regions to be driven by the gate drivers 11 located to the right of the non-display regions. Further, those portions of the source lines 15S divided by the non-display regions that are located closer to the terminals 12sa can be supplied with data signals by the source driver 3a, while those portions of the source lines 15S that are closer to the terminals 12sb can be supplied with data signals by the source driver 3b. This eliminates the necessity to route source lines 15S of other columns around to the columns having the non-display regions or to provide detour lines for the source lines 15S divided at the non-display regions, thereby reducing the parasitic capacitance of the source lines 15S.

21 Example Application 1 of Eighth Embodiment>

The eighth embodiment described above describes an implementation where the source lines 15S that have no non-display region are supplied with data signals by the source drivers 3a and 3b via the terminals 12sa and 12sb; alternatively, the source lines 15S that have no non-display region may be configured so as to be supplied with data signals by one of the source drivers 3a and 3b. In this case, the other source driver does not provide data signals to the source lines 15S that have no non-display region. Alternatively, the source lines 15S that have no non-display region may be connected with one of the sets of terminals 12sa and 12sb and not connected with the other set of terminals.

<Example Application 2 of Eighth Embodiment>

Figure 29:
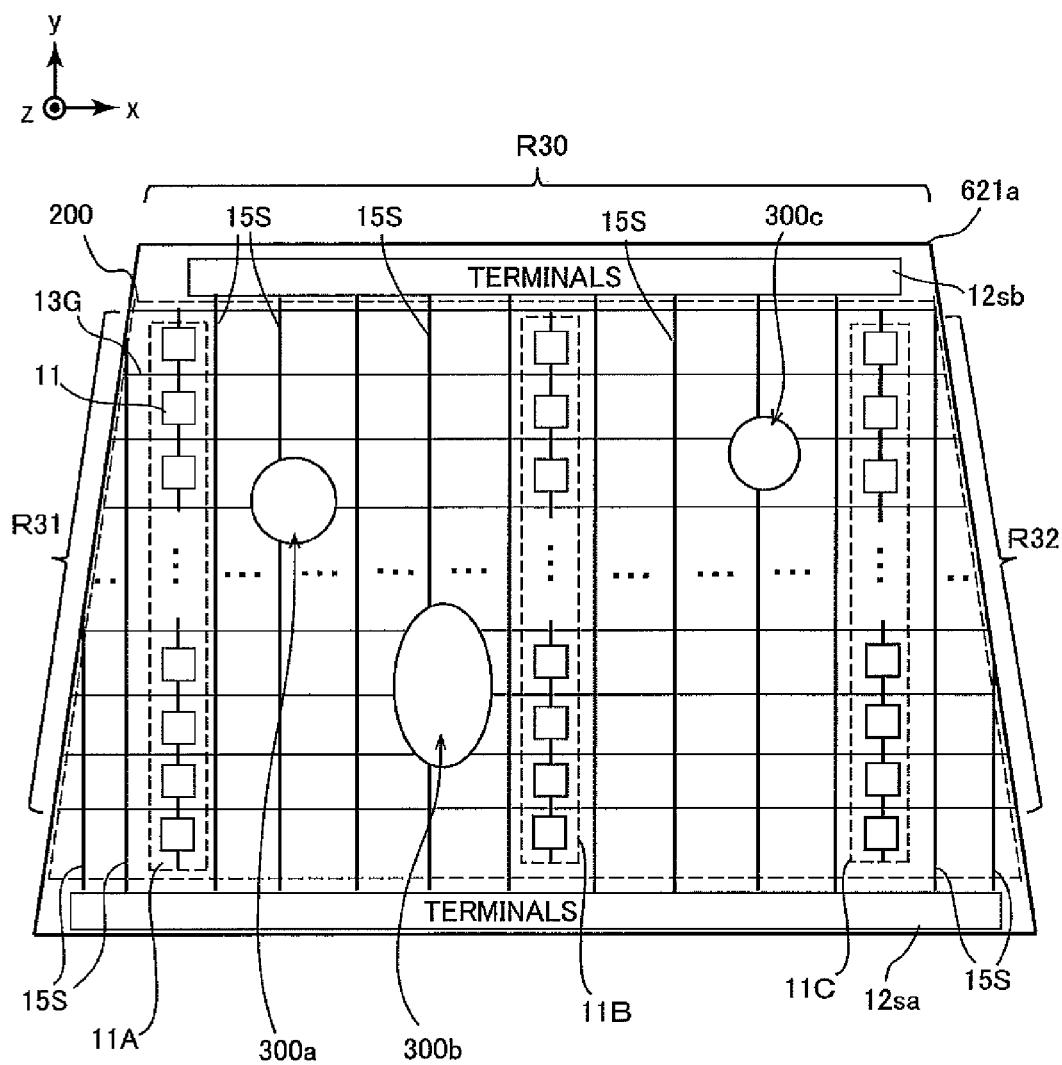
FIG. 29 is a schematic view of an active-matrix substrate according to an example application of the eighth embodiment.

In the implementation of the eighth embodiment described above, the active-matrix substrate 620a is generally rectangular in shape and includes a non-display region located within the display region; alternatively, for example, as illustrated in FIG. 29, an active-matrix substrate 621a may be trapezoidal in shape and include a non-display region within the display region 200.

In the implementation of FIG. 29, the terminals 12sb are provided in the picture-frame region and located along the shorter one of the two sides of the active-matrix substrate 621a that are generally parallel to each other, and the terminals 12sa are provided in the picture-frame region and located along the longer side. The terminals 12sb are connected with those of the source lines 15S that are located in a region R30 of the active-matrix substrate 621a that has a width that is substantially equal to the length of the shorter side. The terminals 12sa are connected with those of the source lines 15S that are located in the other regions of the active-matrix substrate 621a, i.e. regions R31 and R32. Although not shown in FIG. 29, the terminals 12g are provided in the portion of the picture-frame region on which the terminals 12sa are provided.

Although not shown in FIG. 29, similar to the terminals in FIG. 28A discussed above, the terminals 12sa are connected with a source driver 3a that is provided outside the active-matrix substrate 621a and located adjacent the side along which the terminals 12sa are provided. The terminals 12sb are connected with a source driver 3b that is provided outside the active-matrix substrate 621a and located adjacent the side along which the terminals 12sb are provided. The terminals 12sa supply data signals from the source driver 3a to the source lines 15S located in the regions R31 and R32, while the terminals 12sb supply data signals from the source driver 3b to the source lines 15S located in the region R30.

As illustrated in FIG. 29, the active-matrix substrate 621a is not generally rectangular in shape such that the source lines 15S in the regions R31 and R32 are shorter than those of the source lines 15S in the region R30 that have no non-display region; however, they are connected with one set of terminals 12sa and thus can be supplied with data signals.

<Ninth Embodiment22

The outer shape of the active-matrix substrate 20a of the first embodiment described above has arc-shaped top left and right corners as shown in FIG. 2, and the other portions have substantially the same width. The display region provided in this active-matrix substrate 20a has a shape analogous to the outer shape. An example method of manufacturing such an active-matrix substrate 20a will be described below.

(First Manufacturing Method)

First, on a substrate 20 that is generally rectangular in shape are formed, as shown in FIGS. 7A to 7D, a gate line layer 13, a gate insulating film 21, a semiconductor layer 14, a source line layer 15, a protection layer 22, a protection layer 23, a shield layer 16, an interlayer insulating layer 24 and pixel electrodes 17 in this order, thereby forming an active-matrix substrate having a generally rectangular display region (i.e. first active-matrix substrate). That is, the first active-matrix substrate includes a plurality of gate lines 13G having substantially the same length and arranged at a regular interval, a plurality of source lines 15S having substantially the same length and arranged at a regular interval to cross the gate lines 13G, and other layers needed for display.

Next, a resist is applied to the first active-matrix substrate, and a predetermined mask pattern adapted to the above shape is used to conduct dry etching. After dry etching, the unnecessary portions of the layers that were not removed may be removed by wet etching. Thus, the layers on the substrate 20 are etched to provide a shape that is analogous to the outer shape of the active-matrix substrate 20a shown in FIG. 2. That is, portions of the layers on the first active-matrix substrate are removed such that some gate lines 13G have a length that is smaller than the maximum value of the display region as measured in the direction in which the gate lines 13G extend. After all the layers on the first active-matrix substrate have been etched, the substrate 20 is treated to take a predetermined shape. A resist is applied to the substrate 20, and the above predetermined mask pattern is used to etch the substrate 20 using an etchant containing hydrofluoric acid or ammonium hydrogen fluoride and/or ammonium phosphate salts. Thus, the substrate 20 is etched to take a predetermined shape, resulting in an active-matrix substrate 20a illustrated in FIG. 2 (i.e. second active-matrix substrate). The cutting of the substrate 20 is not limited to etching using hydrofluoric acid or the like, and the substrate may be cut by a diamond cutter or cut by a grinder.

Further, after the first active-matrix substrate has been formed, the first active-matrix substrate, the first active-matrix substrate with a counter-substrate attached thereto, or a display panel having a liquid crystal layer enclosed between the first active-matrix substrate and counter-substrate may be cut by a diamond cutter, grinder or the like to provide a predetermined shape. Alternatively, a resist may be applied and the predetermined mask pattern may be used to conduct etching using an etchant containing hydrofluoric acid or ammonium hydrogen fluoride and/or ammonium phosphate salts.

According to the first manufacturing method described above, after all the layers are formed on a generally rectangular substrate 20 to provide a first active-matrix substrate having a generally rectangular display region, portions of the first active-matrix substrate are removed such that at least some of the gate lines 13G have a length that is smaller than the maximum value of the width of the display region as measured in the direction in which the gate lines 13G extend, thereby providing a second active-matrix substrate. According to a second manufacturing method described below, each time a layer is formed above the substrate 20, portions of this layer are removed to provide a second active-matrix substrate. The second manufacturing method will be described below.

(Second Manufacturing Method)

Figure 30A:
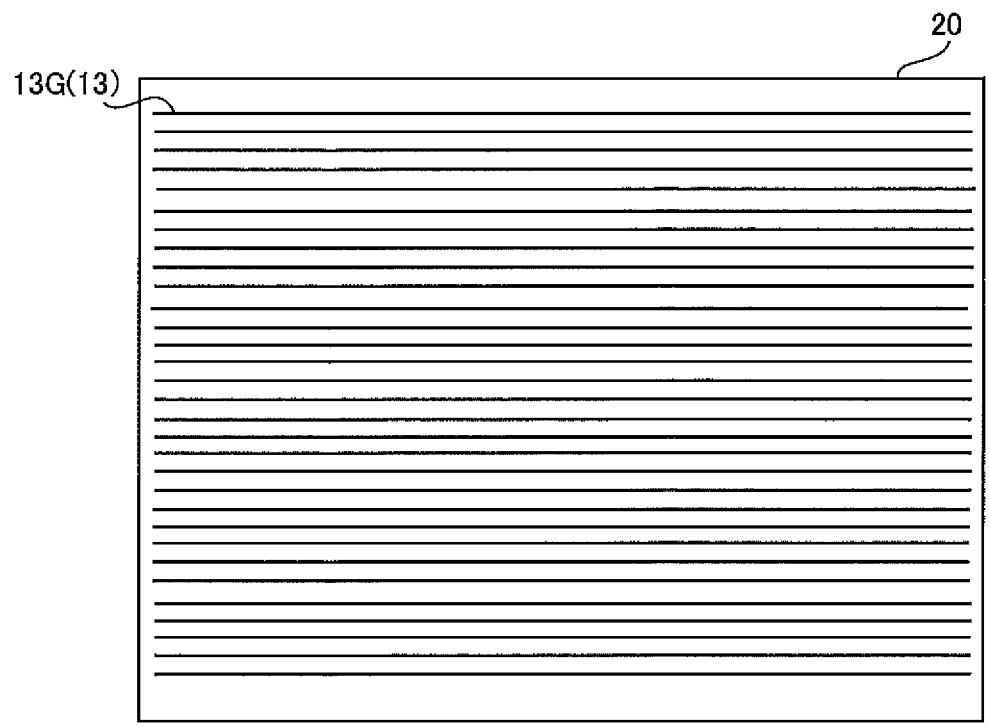
FIG. 30A illustrates a second manufacturing method according to a ninth embodiment.

First, on a generally rectangular substrate 20 is formed a gate line layer 13. FIG. 30A is a schematic plan view of the substrate 20 on which the gate line layer 13 has been formed.

Figure 30B:
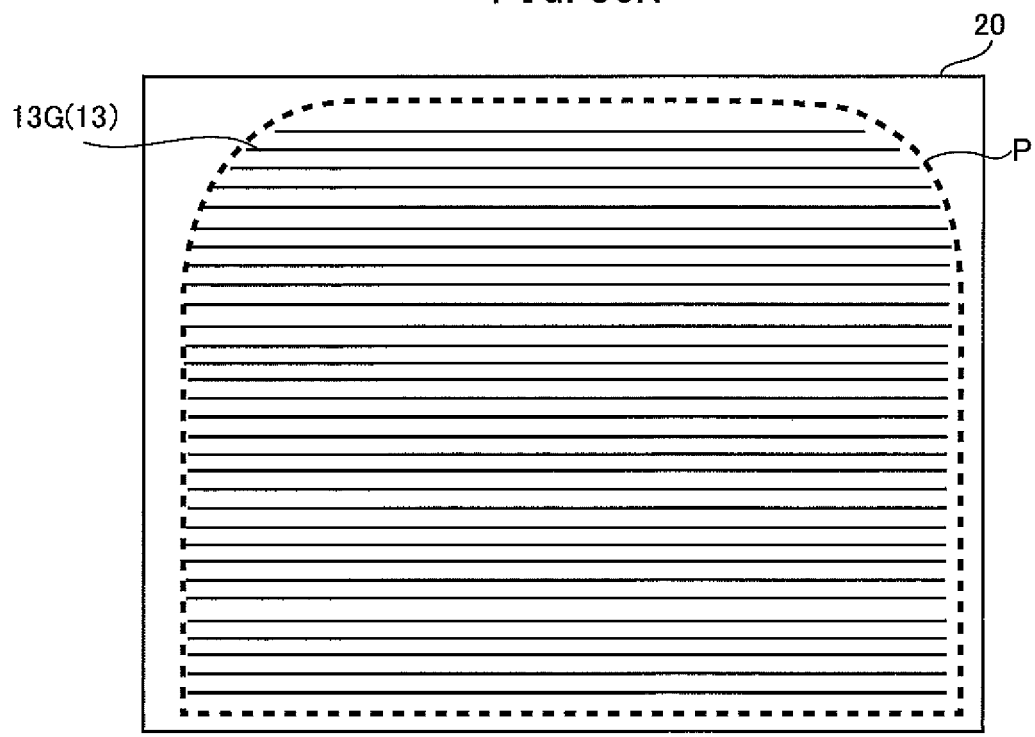
FIG. 30B illustrates the second manufacturing method according to the ninth embodiment.

Forming the gate line layer 13 forms a plurality of gate lines 13G having substantially the same length that extend generally parallel and are spaced apart with a regular interval, as shown in FIG. 30A. After the gate line layer 13 has been formed, a resist is applied to the gate line layer 13 and a predetermined mask pattern is used to etch the gate line layer 13. Thus, as shown in FIG. 30B, the portions of the gate lines 13G that are located outside the shape P defining the predetermined mask pattern in FIG. 30A are removed. As a result, those of the gate lines 13G that are located in the regions that include an arc-shaped portion are shorter than the other gate lines 13G.

Subsequently, as shown in FIGS. 7A to 7D, a gate insulating film 21 is formed on top of the gate line layer 13, and a resist is then applied to the gate insulating film 21 and a predetermined mask pattern is used to etch the gate insulating film 21. Thus, the portions of the gate insulating film 21 that are located outside the shape P defining the predetermined mask pattern are removed (not shown).

Subsequently, as shown in FIGS. 7A to 7D, a semiconductor layer 14 is formed on top of the gate insulating film 21, and a resist is then applied to the semiconductor layer 14 and a predetermined mask pattern is used to etch the semiconductor layer 14. Thus, the portions of the semiconductor layer 14 that are located outside the shape P defining the predetermined mask pattern are removed (not shown).

Figure 30C:
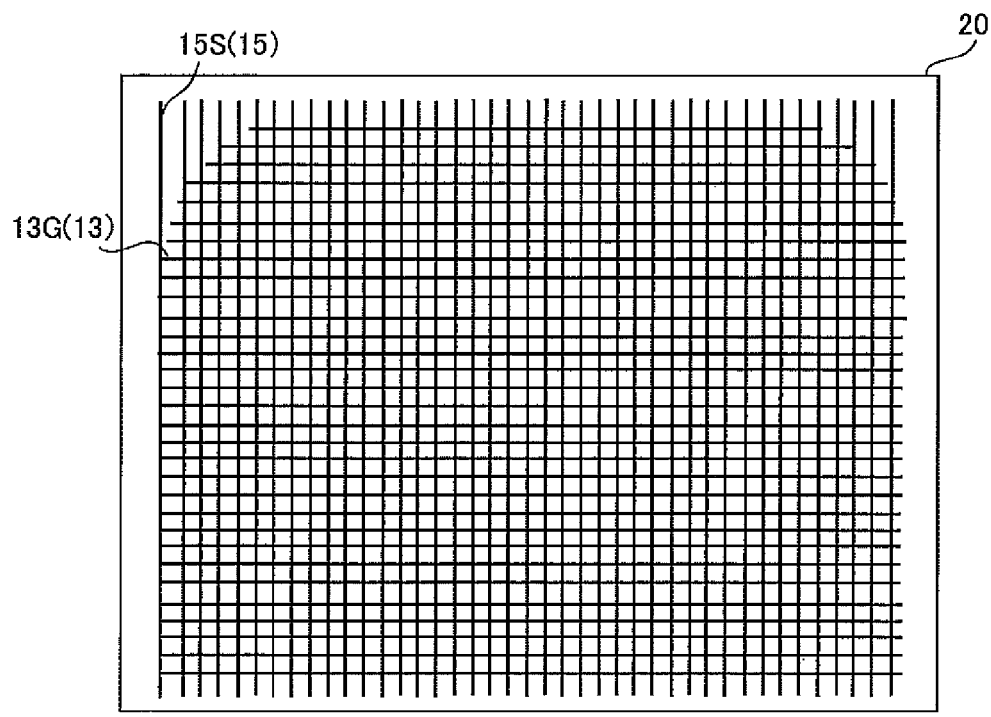
FIG. 30C illustrates the second manufacturing method according to the ninth embodiment.
Figure 30D:
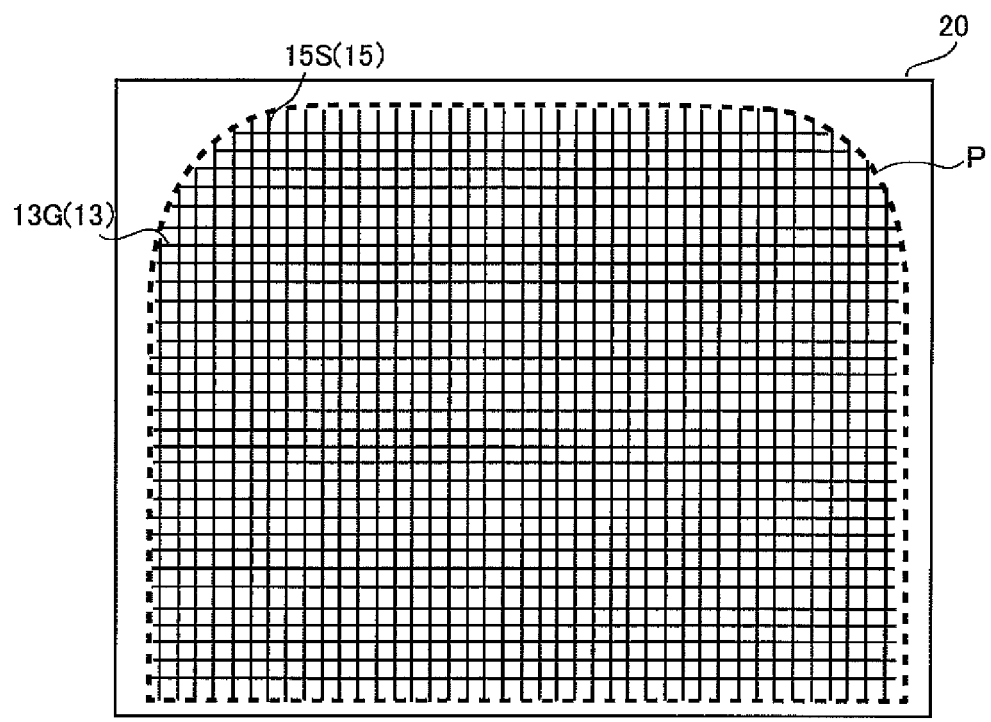
FIG. 30D illustrates the second manufacturing method according to the ninth embodiment.

Next, a source line layer 15 is formed on top of the semiconductor layer 14. Thus, as shown in FIG. 30C, source lines 15S are formed that have substantially the same length and are spaced apart at a regular interval to cross the gate lines 13G. After the source line layer 15 has been formed, a resist is applied to the source line layer 15 and a predetermined mask pattern is used to etch the source line layer 15. Thus, as shown in FIG. 30D, the portions of the source line layer 15 that are located outside the shape P defining the predetermined mask pattern in FIG. 30C are removed.

After the source line layer 15 has been etched, a protection layer 22, a protection layer 23, a shield layer 16, an interlayer insulating layer 24, pixel electrodes 17, and contact holes H1 and H2 shown in FIGS. 7A to 7D are formed in this order (not shown). Each time a layer is formed, a resist is applied thereto and etched using a predetermined mask pattern. Thus, each of the layers on the substrate 20 is etched to take a shape that is analogous to the outer shape of the active-matrix substrate 20a shown in FIG. 2. Then, as in the first manufacturing method, a resist is applied to the substrate 20 and the substrate 20 is etched using a predetermined mask pattern, which ultimately results in a second active-matrix substrate.

<Example Applications of Ninth Embodiment>

According to the ninth embodiment described above, an active-matrix substrate must by produced using the above manufacturing method depending on the size (or number of pixels) of the display. As such, if active-matrix substrates to be used in displays with a plurality of sizes are to be manufactured, a plurality of manufacturing lines are needed for the different display sizes. In the present example applications, a first active-matrix substrate to be used in a display with a certain number of pixels (first pixel number) is cut to produce a plurality of second active-matrix substrates to be used in displays with a second pixel number which is smaller than the first pixel number.

(Example Application 1)

Figure 31A:
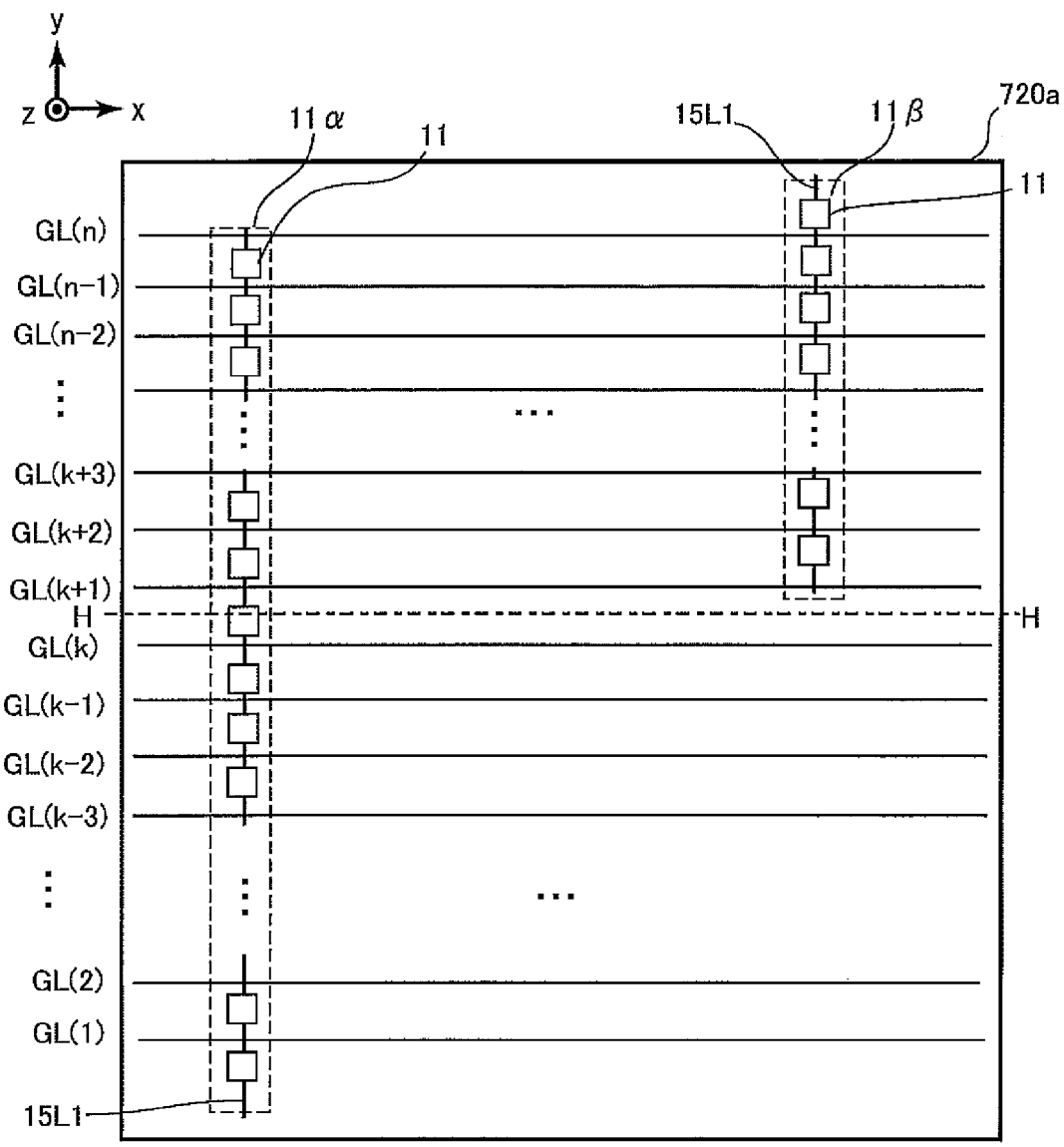
FIG. 31A is a schematic view of a first active-matrix substrate of Example Application 1 according to the ninth embodiment.

FIG. 31A is a schematic view of an example first active-matrix substrate of the present example application. In FIG. 31A, the source lines 15S are not shown; however, a plurality of source lines 15S are provided on an active-matrix substrate 720a, which is one example of a first active-matrix substrate, to cross the gate lines 13G.

The active-matrix substrate 720a includes gate lines 13G: GL(1) to GL(n). The active-matrix substrate 720a includes groups of gate drivers 11α and 11β. The gate driver group 11α includes gate drivers 11 corresponding to the gate lines 13G: GL(1) to GL(n). The gate driver group 11β includes gate drivers 11 corresponding to the gate lines 13G: GL(k+1) to GL(n). The gate drivers 11 in each of the gate driver groups 11α and 11β are connected by a line 15L1, similar to the gate drivers of the first embodiment described above.

When a start pulse signal is provided to that gate driver 11 in the gate driver group 11α which drives the gate line 13G: GL(1) via the associated line 15L1, the gate lines 13G are driven, beginning with GL(1), by the gate drivers 11 in the gate driver group 11α. When a start pulse signal is provided to that gate driver 11 in the gate driver group 11β which drives the gate line 13G: GL(n) via the associated line 15L, the gate lines 13G are driven, beginning with GL(n), by the gate drivers 11 in the gate driver group 11β.

Figure 31B:
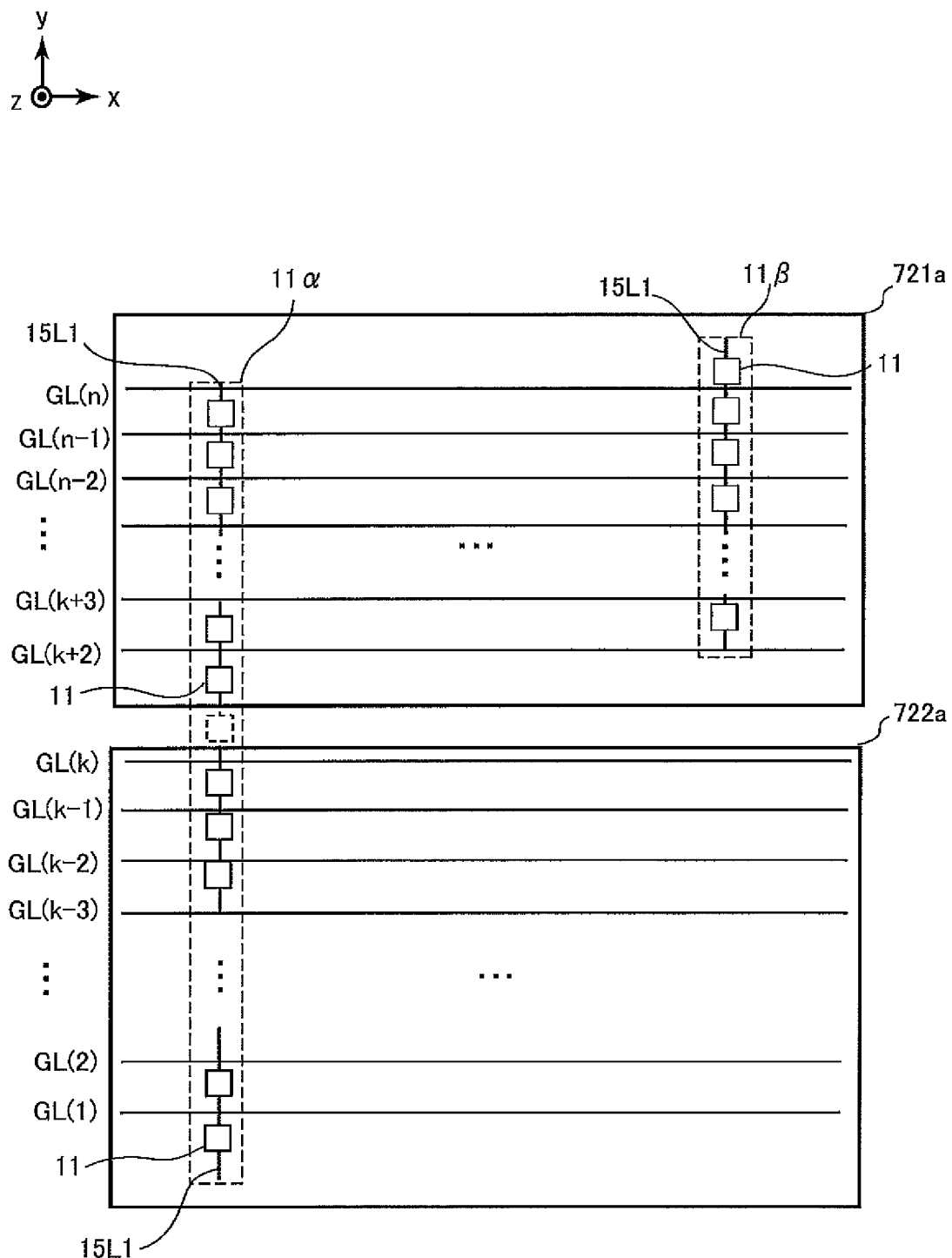
FIG. 31B shows the first active-matrix substrate shown in FIG. 31A after being cut.

To produce from the active-matrix substrate 720a an active-matrix substrate with the second pixel number, the substrate is cut along a gate line 13G between the portion including the gate driver group 11β and the portion in which the gate driver group 11β is not present. In this implementation, for example, the active-matrix substrate 720a is cut along the cut line H between the gate lines 13G: GL(k) and GL(k+1). When the active-matrix substrate 720a has been cut, two active-matrix substrates 721a and 722 are formed, as shown in FIG. 31B. As in the first manufacturing method of the ninth embodiment described above, a predetermined mask pattern is used to etch the active-matrix substrates 721a and 722a to form active-matrix substrates 721a and 722a (see FIGS. 31C and 31D) (second active-matrix substrates) having a shape that is analogous to the outer shape of the active-matrix substrate 20a shown in FIG. 2.

Figure 31C:
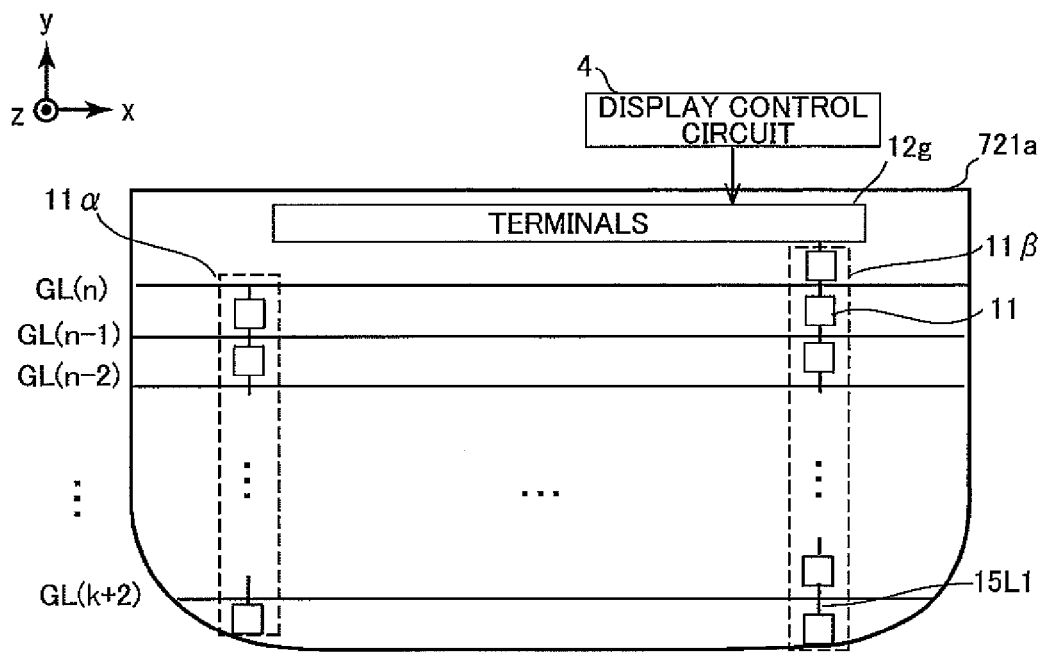
FIG. 31C is a schematic view of a second active-matrix substrate produced from one of the portions into which the first active-matrix substrate has been cut shown in FIG. 31B.

When the active-matrix substrate 721a is to be used as a display, as shown in FIG. 31C, terminals 12g are provided in the picture-frame region along the side adjacent to which the gate line 13G: GL(n) is provided, such that the gate driver group 11β is connected with a terminal 12g. A start pulse signal from the display control circuit 4 is supplied to the gate driver 11 in the gate driver group 11β that drives the gate line 13G: GL(n) via the terminal 12g. Control signals from the display control circuit 4 (such as clock signals) are supplied to the gate driver group 11β via the terminal 12g. Thus, the gate lines 13G are driven one after another, beginning with GL(n) and ending with GL(k+1). During this, the gate driver group 11α on the active-matrix substrate 721a is not supplied with control signals and is thus not driven.

Figure 31D:
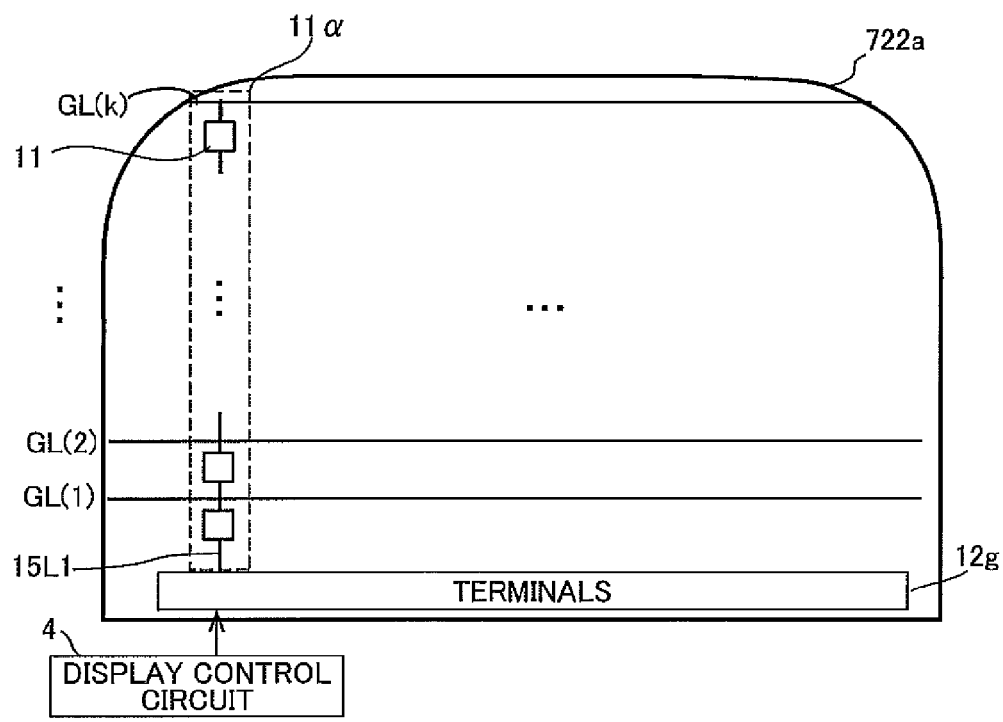
FIG. 31D is a schematic view of a second active-matrix substrate produced from the other one of the portions into which the first active-matrix substrate has been cut shown in FIG. 31B.

If the active-matrix substrate 722a is to be used as a display, as shown in FIG. 31D, terminals 12g are provided in the picture-frame region along the side of the active-matrix substrate 722a adjacent to which the gate line 13G: GL(1) is provided, such that the gate driver group 11α is connected with a terminal 12g. A start pulse signal from the display control circuit 4 is supplied to the gate driver 11 in the gate driver group 11α that drives the gate line 13G: GL(1) via the terminal 12g. Control signals from the display control circuit 4 (such as clock signals) are supplied to the gate driver group 11α via the terminal 12g. Thus, the gate lines 13G are driven one after another, beginning with GL(1) and ending with GL(k).

Figure 31E:
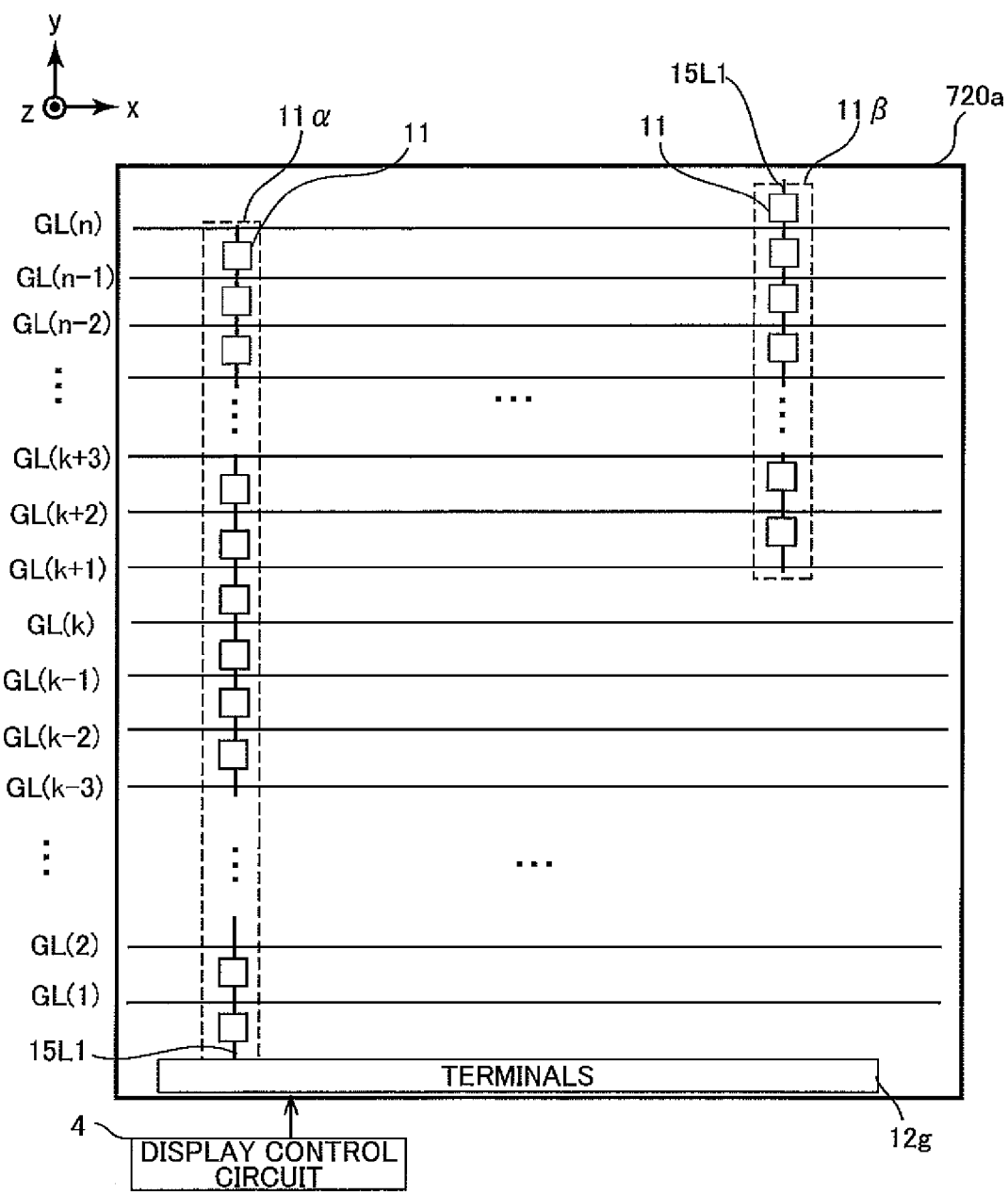
FIG. 31E is a schematic view of the first active-matrix substrate shown in FIG. 31A as used as a display.

If the active-matrix substrate 720a shown in FIG. 31A is to be used as a display, as shown in FIG. 31E, terminals 12g are provided in the picture-frame region along the side adjacent to which the gate line 13G: GL(1) is provided, such that the gate driver group 11αis connected with a terminal 12g. A start pulse signal from the display control circuit 4 is supplied to the gate driver 11 that drives the gate lines 13G: GL(1) via the terminal 12g. Then, in response to control signals from the display control circuit 4 (such as clock signals), the gate lines 13G are driven, beginning with GL(1) and ending with GL(n). In this case, the gate driver group 11βis not supplied with control signals and is thus not driven.

(Example Application 2)

Example Application 1 described above describes an example where the active-matrix substrate 720a is cut along a line that is generally parallel to the direction in which the gate lines 13G extend; alternatively, the substrate may be cut along a line that is generally perpendicular to the direction in which the gate lines 13G extend to produce a plurality of second active-matrix substrates.

Figure 32:
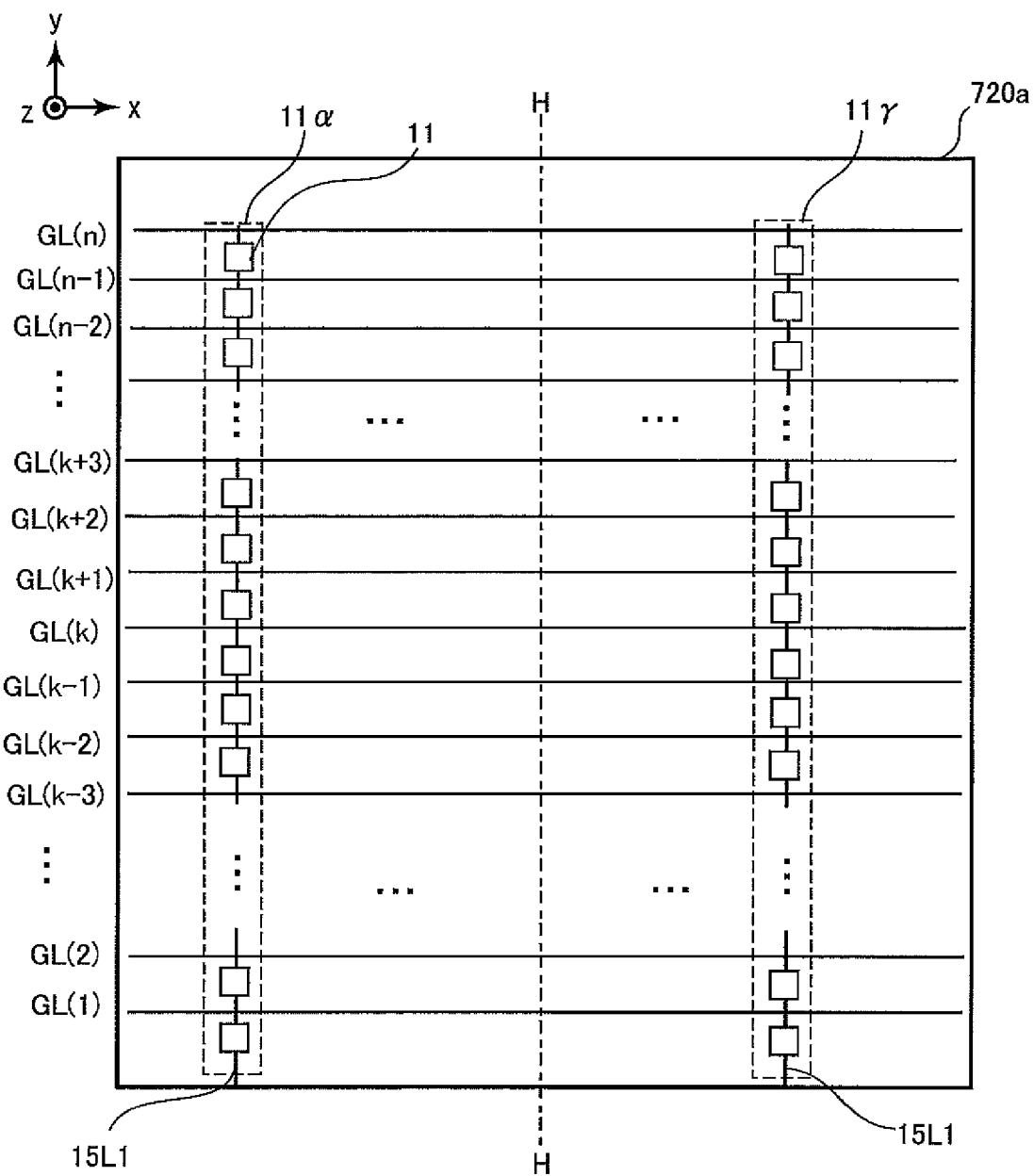
FIG. 32 is a schematic view of a first active-matrix substrate of Example Application 2 of the ninth embodiment.

In such a case, for example, as shown in FIG. 32, the active-matrix substrate 720a may be divided into left and right regions along a cut line H that is generally perpendicular to the direction in which the gate lines 13G extend, and gate driver groups 11αand 11γincluding gate drivers 11 for the gate lines 13G: GL(1) to GL(n) may be provided in these regions. Alternatively, for example, the active-matrix substrate 720a may be divided into left and right regions along the cut line H, and a plurality of pairs of gate driver groups including gate drivers 11 for the odd-numbered gate lines 13G and gate drivers 11 for the even-numbered gate lines 13G may be provided in these regions (not shown). In summary, it is only required that, on a first active-matrix substrate, a plurality of gate drivers 11 be provided for each gate line and the substrate be cut along a source line 15S between these gate devices to produce a plurality of second active-matrix substrates.

(Example Application 3)

Example Applications 1 and 2 described above describe examples where the active-matrix substrate 720a is cut along a horizontal or vertical line to produce two active-matrix substrates; alternatively, the first active-matrix substrate may be cut along horizontal and vertical lines to produce four second active-matrix substrates.

Figure 33A:
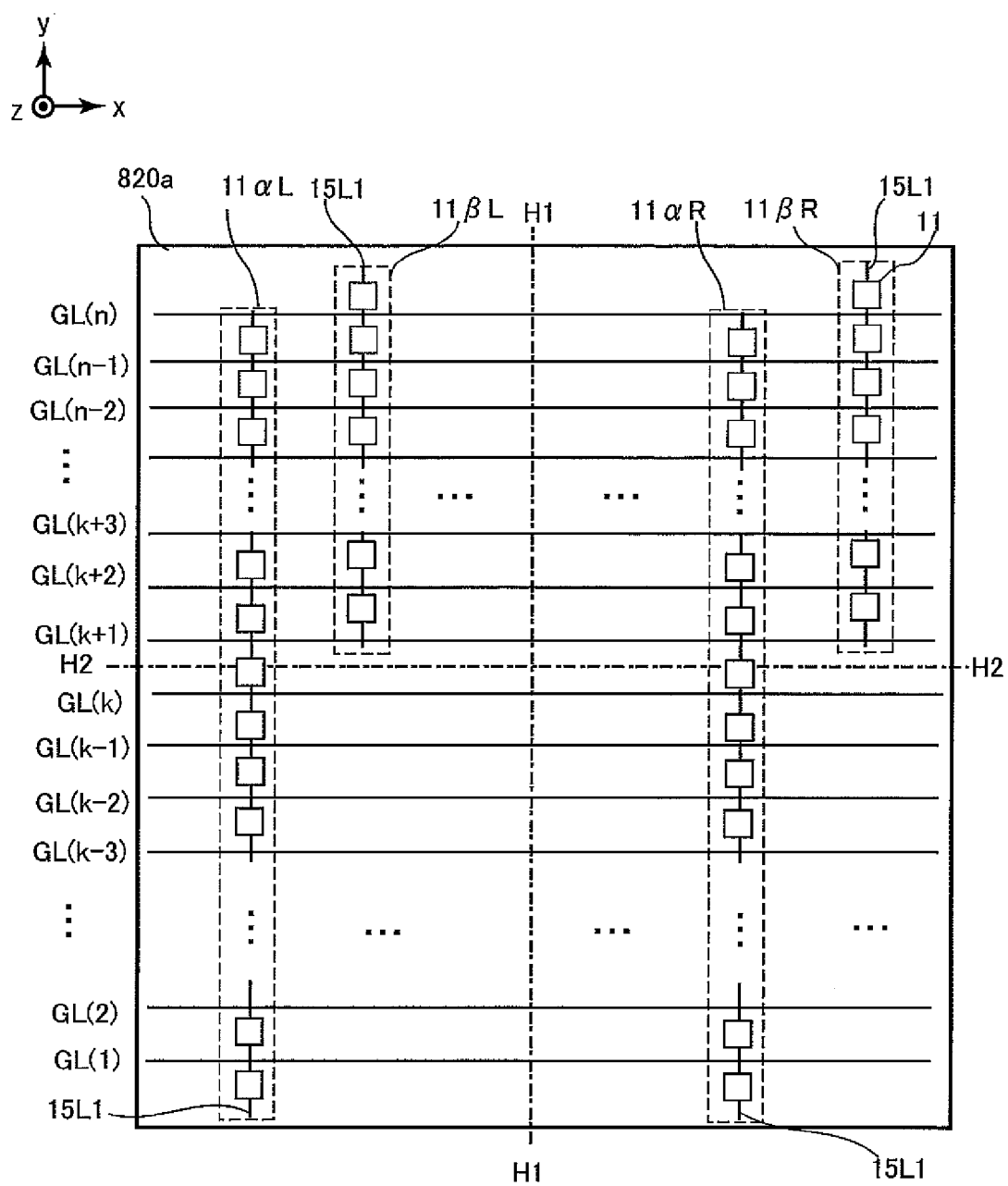
FIG. 33A is a schematic view of the first active-matrix substrate of Example Application 3 of the ninth embodiment.

FIG. 33A is a schematic plan view of a first active-matrix substrate of the present example application. In FIG. 33A, the source lines 15S are not shown. In FIG. 33A, one-dot-chain lines H1 and H2 indicate the lines along which the substrate is to be cut, and will be hereinafter referred to as cut lines H1 and H2.

In FIG. 33A, the active-matrix substrate 820a, which is an example of a first active-matrix substrate, includes left and right regions into which the substrate is divided along the cut line H1 which is generally perpendicular to the direction in which the gate lines 13G extend, and gate driver groups 11αL and 11βL and gate driver groups 11αR and 11βR are provided in these regions. The gate driver groups 11αL and 11αR include gate drivers 11 for the gate lines 13G: GL(1) to GL(n). The gate driver groups 11βL and 11βR includes gate drivers 11 for the gate lines GL(n) to GL(k+1). That is, the active-matrix substrate 820a includes a plurality of pairs (11αL and 11βL, 11αR and 11βR) of gate drivers for the gate lines 13G (first gate line driving circuits) and gate drivers for some gate lines 13G that are arranged side by side (second gate line driving circuits).

When a start pulse signal is provided to the gate drivers 11 that drive the gate line 13G: GL(1) via the associated lines 15L1, the gate drivers 11 in the gate driver groups 11αL and 11αR successively drive the gate lines 13G, beginning with GL(1). When a start pulse signal is provided to the gate drivers 11 that drive the gate line 13G: GL(n) via the associated lines 15L1, the gate drivers 11 in the gate driver groups 11βL and 11βR successively drive the gate lines 13G, beginning with GL(n).

Figure 33B:
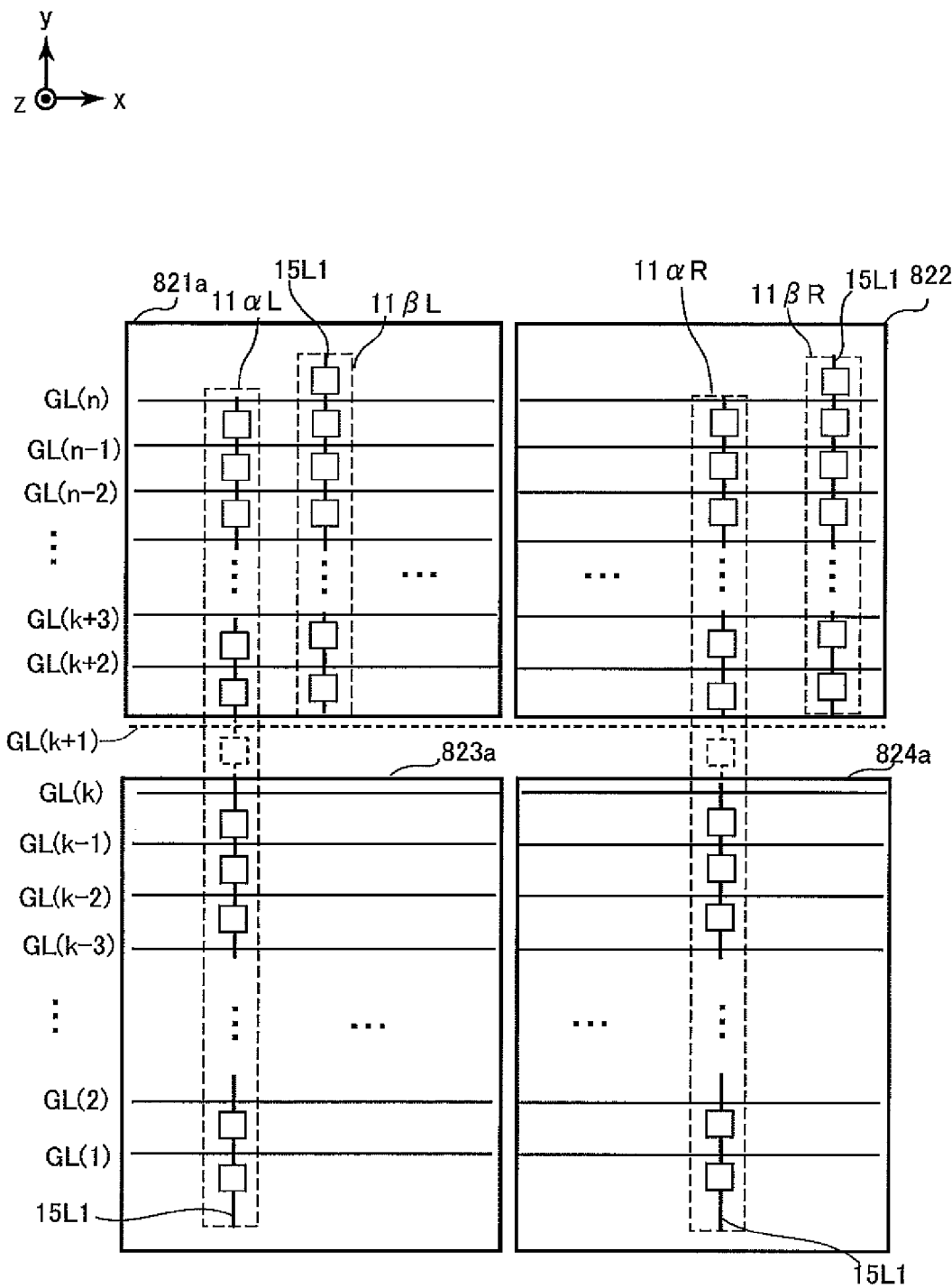
FIG. 33B shows the first active-matrix substrate shown in FIG. 33A after being cut.

As the active-matrix substrate 820a is cut along the cut lines H1 and H2, active-matrix substrates 821a, 822a, 823a and 824a are produced, as shown in FIG. 33B. That is, the active-matrix substrate 820a is cut along a source line 15S (not shown) between the pairs of first and second gate line driving circuits to produce four active-matrix substrates 821a, 822a, 823a and 824a, which are examples of second active-matrix substrates. As the active-matrix substrate 820a is cut, the pixel regions between gate lines GL(k) and GL(k+1) are lost, such that the gate lines 13G: GL(k+2) to GL(n) are located on the active-matrix substrates 821a and 822a, and the gate lines 13G: GL(1) to GL(k) are provided on the active-matrix substrates 823a and 824a.

The gate driver group 11βL and a part of the gate driver group 11αL are provided on the active-matrix substrate 821a. The gate driver group 11βR and a part of the gate driver group 11αR are provided on the active-matrix substrate 822a. When the active-matrix substrates 821a and 822a are to be used as displays, as is the case with the active-matrix substrate 721a shown in FIG. 31C discussed above, terminals 12g are provided on the active-matrix substrates 821a and 822a to connect to the gate driver groups 11βL and 11βR. Then, an arrangement is provided for successively driving the gate lines 13G, beginning with GL(n) and ending with GL(k+2), using the gate driver groups 11βL and 11βR.

Some gate drivers of the gate driver group 11αL are provided on the active-matrix substrate 823a and some gate drivers of the gate driver group 11αR are provided on the active-matrix substrate 824a. Each of the gate driver groups 11αL and 11αR on the active-matrix substrates 823a and 824a includes gate drivers 11 for the gate lines 13G: GL(1) to GL(k). When the active-matrix substrates 823a and 824a are to be used as displays, as is the case with the active-matrix substrate 722a shown in FIG. 31D discussed above, terminals 12g are provided on the active-matrix substrates 823a and 824a to connect to the gate driver groups 11αL and 11αR. Then, an arrangement is provided for successively driving the gate lines 13G, beginning with GL(1) and ending with GL(k), using the gate driver groups 11αL and 11αR.

As shown in Example Applications 1 to 3 described above, one active-matrix substrate (first active-matrix substrate) is cut to produce a plurality of active-matrix substrates (second active-matrix substrates) with a size that is smaller than the first active-matrix substrate. This makes the manufacturing line more efficient and reduce manufacturing costs compared with implementations where active-matrix substrates are manufactured for each display size (pixel number).

As the first active-matrix substrate is cut, the pixels at the cut are lost. Thus, it is preferable to design the first active-matrix substrate taking into consideration the number of the pixels that are to be lost by the cut. For example, if the active-matrix substrate 820a illustrated in FIG. 33A is to be used in a display with a pixel number of "8K4K" (7680 by 4320), the number of pixels on the active-matrix substrate 820a is made greater than the pixel number of "8K4K" (7680 by 4320), for example (8K+100 pixels) by (4K+50 pixels). If this active-matrix substrate 820a is to be used as a display with a pixel number of "8K4K" (7680 by 4320), the extra pixels (100 by 50) may display black images. Alternatively, if the active-matrix substrate 820a is cut to produce four active-matrix substrates 821a to 824a used in displays with pixel number "4K2K" (4096 by 2160), as shown in FIG. 33B, the substrate may be cut at the extra pixels (100 by 50 pixels).

(Example Application 4)

The first active-matrix substrate includes a line pattern for the terminals 12s that supply data signals from the source driver 3 to the source lines 15S. When the first active-matrix substrate is cut along a source line 15S as in Example Application 2 described above, the line pattern for the terminals 12s is also cut, which may make it impossible to supply data signals to some pixels on the active-matrix substrate as having been cut. The present example application describes an example where a first active-matrix substrate is produced that will not make it impossible to supply data signals to some pixels on the active-matrix substrate as having been cut.

Figure 34A:
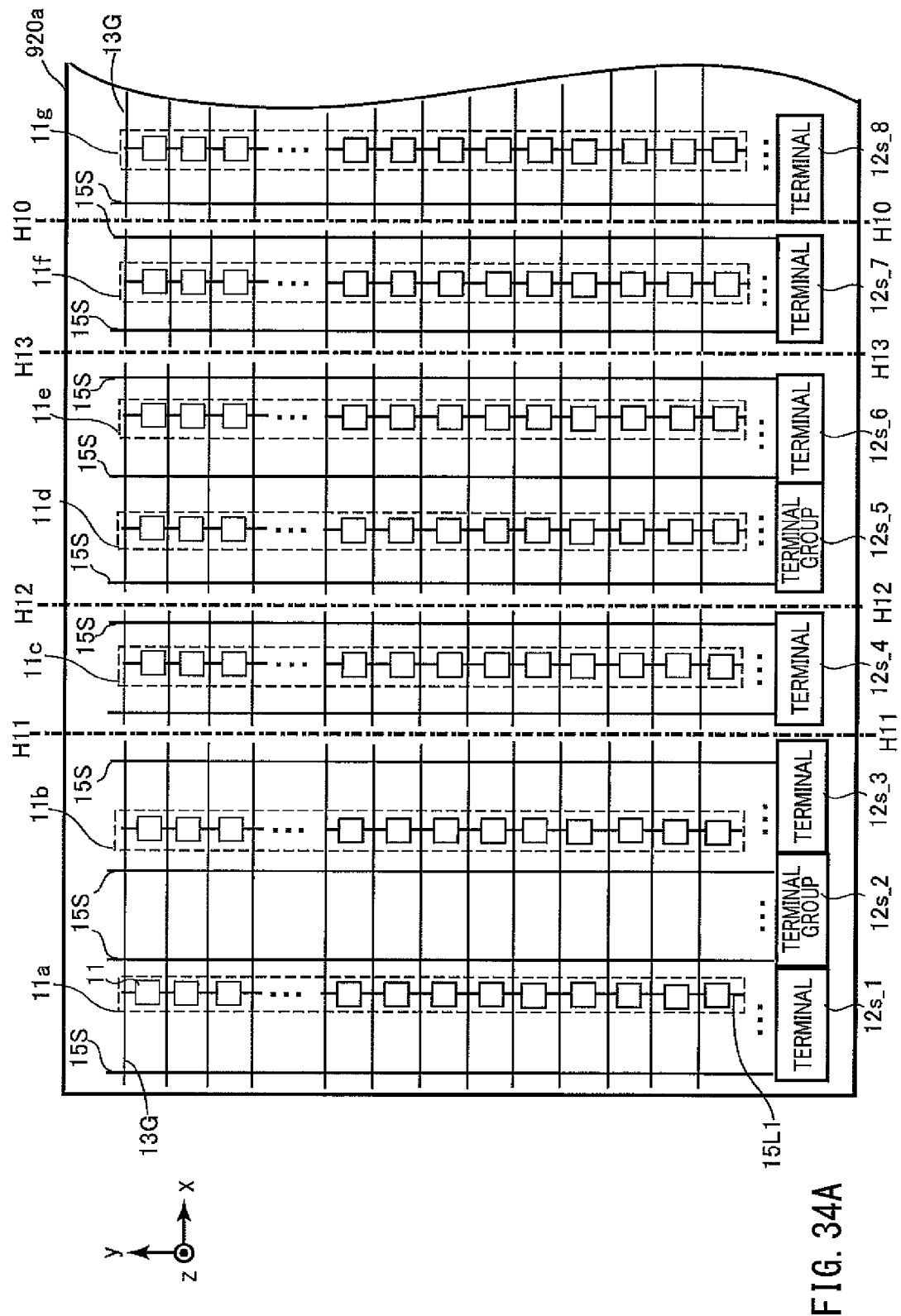
FIG. 34A is a schematic view of a first active-matrix substrate of Example Application 1 of the ninth embodiment.

FIG. 34A is a schematic view of a part of the first active-matrix substrate of the present example application. The picture-frame region of the active-matrix substrate 920a, which is an example of a first active-matrix substrate, includes terminals 12s_1, 12s_3, 12s_4 and 12s_6 to 12s_8 to which data signals are supplied from the source driver (not shown), and terminal groups 12s_2 and 12s_5 each including a plurality of terminals. Terminals will be simply referred to as terminals 12s where they are not differentiated. In this example, one terminal 12s is connected with 360 source lines 15S, for example. The terminals 12s_2 and 12s_5 each include 14 terminals 12s.

The active-matrix substrate 920a includes source lines 15S connected with the terminals 12s and a plurality of gate lines 13G crossing the source lines 15S. The gate lines 13G are divided into columns at one-dot-chain lines H10, H11, H12 and H13. In this example, for example, each column includes 1080 gate lines 13G.

On the active-matrix substrate 920a, one or more gate drivers 11 are provided for each of the sections of a divided gate line 13G. Gate driver groups 11a and 11b are connected with the gate lines 13G sections that cross the source lines 15S connected with the terminals 12s_1, terminal group 12s_2 and terminal 12s_3. A gate driver group 11c is connected with the gate line 13G sections that cross the source lines 15S connected with the terminal 12s_4. Gate driver groups 11d and 11e are connected with the gate line 13G sections that cross the source lines 15S connected with the terminal group 12s_5 and terminal 12s_6. A gate driver group 11f is connected with the gate line 13G sections that cross the source lines 15S connected with the terminal 12s_7. A gate driver group 11g is connected with the gate line 13G sections that cross the source lines 15S connected with the terminal 12s_8. The gate drivers 11 in each gate driver group are connected by a line 15L1. Although not shown in FIG. 34A, terminals 12g (see FIG. 2, for example) for supplying control signals containing clock signals to the gate driver groups are provided in the portion of the picture-frame region in which the terminals 12s are provided.

If an active-matrix substrate for a display with a first pixel number (for example, 3840 by 1080) is to be produced from the active-matrix substrate 920a, the active-matrix substrate 920a is cut at the pixel regions between the chain lines H13 and H10 in FIG. 34A. Thus, the pixel regions between the chain lines H13 and H10, i.e. the pixel regions driven by the gate driver group 11f are cut to produce an active-matrix substrate driven by 32 terminals 12s (12s_1 to 12s_6) and the gate driver groups 11a to 11e.

Figure 34B:
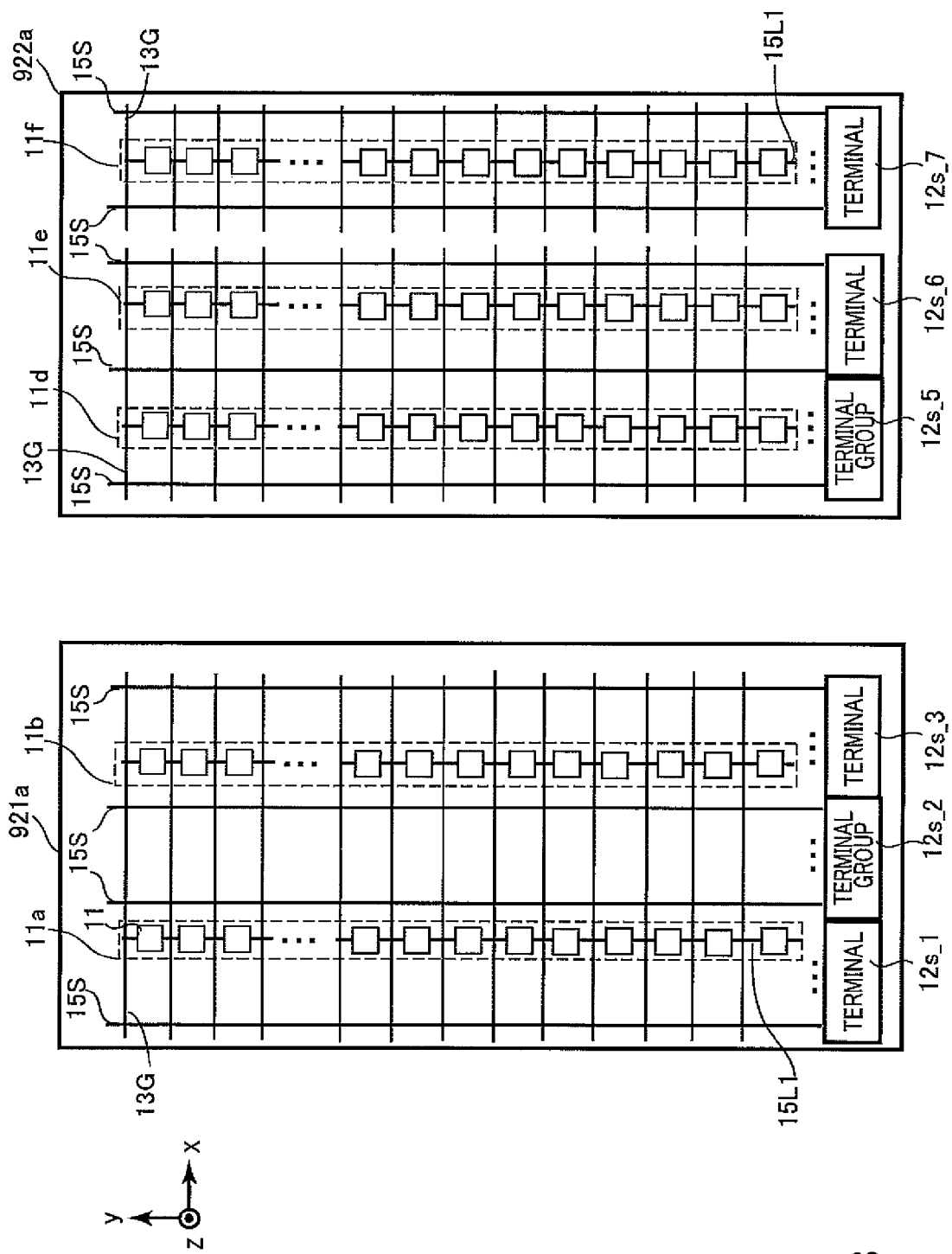
FIG. 34B shows the first active-matrix substrate shown in FIG. 34A after being cut.

If two active-matrix substrates for displays with a second pixel number (for example, 1920 by 1080) smaller than the first pixel number are to be produced from the active-matrix substrate 920a, the active-matrix substrate 920a is cut at the pixel regions between the chain lines H11 and H12 in FIG. 34A, and the active-matrix substrate 920a is cut at the pixel regions to the right of the chain line H10. Thus, the pixel regions driven by the gate driver group 11c and the pixel regions driven by the gate driver group 11g are cut to produce an active-matrix substrate 921a with the second pixel number driven by 16 terminals 12s (12s_1 to 12s_3) and the gate driver groups 11a and 11b and an active-matrix substrate 922a with the second pixel number driven by 16 terminals 12s (12s_5 to 12s_7) and the gate driver groups 11d to 11f, as shown in FIG. 34B.

Then, as is the case with the first manufacturing method discussed above, a predetermined mask pattern is used to remove portions of each of the active-matrix substrates as having been cut by dry etching, for example, thereby producing a second active-matrix substrate in which at least some of the gate lines 13G have a length smaller than the maximum value of the width of the display region as measured in the direction in which the gate lines 13G extend. Alternatively, the active-matrix substrate as having been cut may be attached to a counter-substrate or liquid crystal may be injected between the active-matrix substrate as having been cut and a counter-substrate before the resulting assembly is cut to provide a predetermined shape to produce a second active-matrix substrate, as is the case with the first manufacturing method discussed above.

Thus, gate lines 13G are provided in regions of an active-matrix substrate 920a in such a way that the gate lines 13G can be divided at positions that will result in a first pixel number and a second pixel number, and gate drivers 11 are provided for the gate lines 13G in those regions, such that the gate lines 13G on the active-matrix substrate as having been cut can be driven. Further, terminals 12s are provided in those regions for supplying data signals to the source lines 15S that cross the gate lines 13G, such that data signals can be provided to all the source lines 15S on the active-matrix substrate as having been cut, resulting in no pixel incapable of displaying an image. Further, the number and positions of pixels after the cutting can be fixed using the positions for dividing the gate lines, as indicated by H11 to H13.

The above example describes an implementation where the same number of source lines 15S are connected with one terminal 12s. As each terminal 12s has the same number of outputs, the same source driver can be used for the terminals 12s, thereby reducing manufacturing costs, achieving efficient designing and providing uniform display. Alternatively, to minimize the pixel regions that will be unnecessary after the cutting, the number of terminals 12s_4 and 12s_7 may be reduced. In this case, source drivers with different numbers of outputs may be provided for the terminals 12s_4 and 12s_7 on one hand and other terminals on the other hand.

<Variations>

Although embodiments of the present invention have been described, the above embodiments are merely examples that may be used to carry out the present invention. Thus, the present invention is not limited to the above embodiments, and can be carried out with appropriate modifications to the above embodiments without departing from the spirit of the present invention. Variations of the present invention will be described below.

Figure 35A:
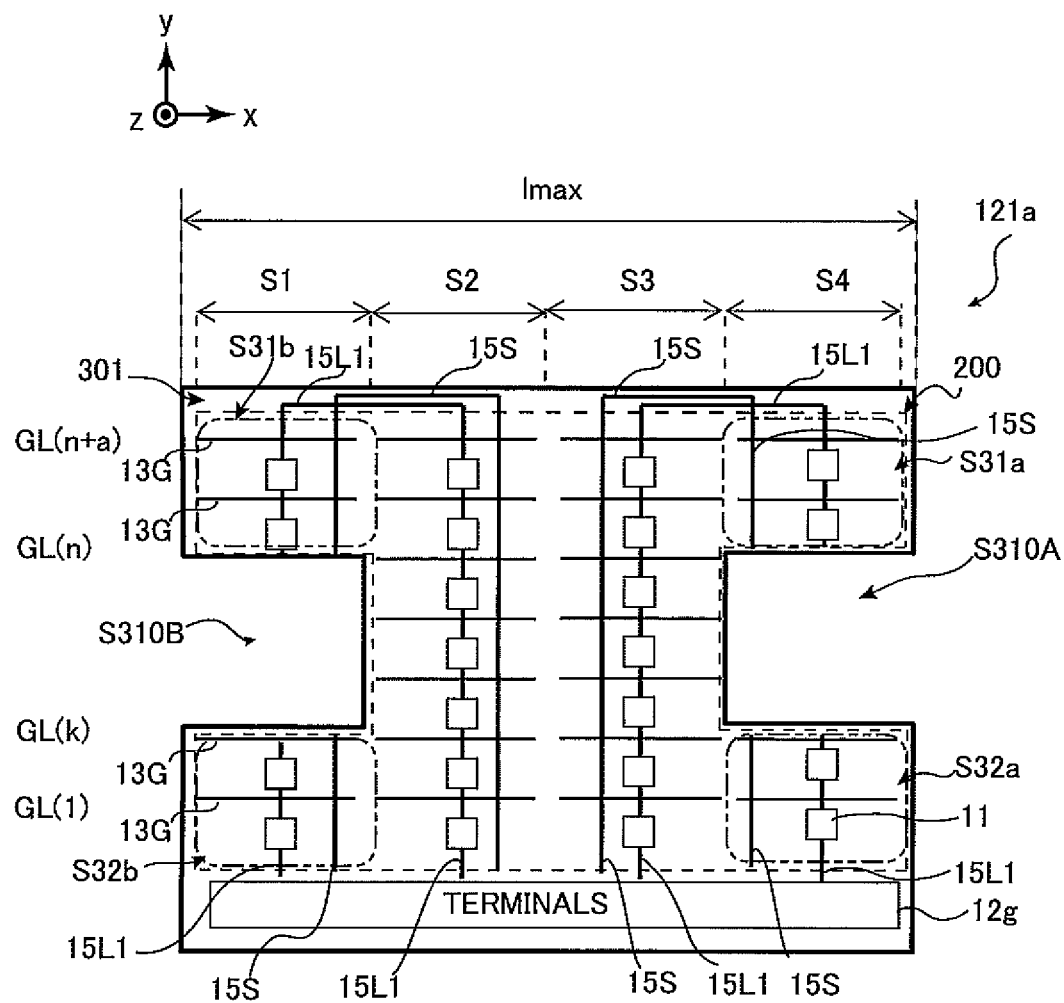
FIG. 35A is a schematic view of an active-matrix substrate of Example Variation 1.

(1) In the second embodiment described above, one side of the active-matrix substrate 20a that is parallel to the direction in which the gate lines 13G extend (i.e. X-direction) has recesses and protrusions; alternatively, for example, as shown in FIG. 35A, the two sides of the active-matrix substrate 121a that are parallel to the direction in which the source lines 15S extend (i.e. Y-direction) may have recesses and protrusions. The recesses toward the inside in the two sides of the active-matrix substrate 121a that are parallel to the Y-direction shown in FIG. 35A will be hereinafter referred to as non-display regions 310A and 310B.

In the display region 200 of the active-matrix substrate 121a, gate lines 13G having a length that is substantially equal to the width of the non-display regions 310A and 310B as measured in the X-direction are provided in the columns S1 and S4 which have non-display regions 310A and 310B. Further, the area of the display region 200 located between the columns S1 and S4 are divided into columns S2 and S3 and gate lines 13G having a length that is substantially equal to the width of each column are provided in the columns S2 and S3. That is, the length of each gate line 13 is smaller than the maximum value lmax of the width of the active-matrix substrate 121a as measured in the X-direction.

Similar to the gate drivers of the first embodiment, at least one gate driver 11 is provided between two adjacent gate lines 13G in each column. The gate drivers 11 in each column are connected by a line 15L1 (see FIGS. 3, 5A to 5C, for example). Similar to the corresponding gate drivers of the third embodiment, the gate drivers 11 in the regions S31a and S31b, which are located in the columns S1 and S4 and closer to the picture-frame region 301, are connected with the gate drivers 11 in the columns S2 and S3 as lines 15L1 connecting gate drivers 11 in the columns S2 and S3 are extended to the picture-frame region 301 and routed around toward the regions S31a and S31b. Further, similar to the corresponding source lines of the third embodiment, the source lines 15S in the regions S31a and S31b in the columns S1 and S4 which have the non-display regions 310A and 310B are formed by extending source lines 15S in the columns S2 and S3 to the picture-frame region 301 and route them around toward the regions S31a and S31b.

The gate drivers 11 in the regions S31a and S31b are supplied with control signals such as clock signals or power supply voltage signals from the terminals 12g via the lines 15L1 routed around from the columns S3 and S2 through the picture-frame region 301. Then, the gate drivers 11 connected with the gate lines 13G: GL(n+a) in the regions S31a and S31b receive a set signal (S) from the gate drivers 11 connected with the gate lines 13G: GL(n+a) in the columns S3 and S2. Further, the source lines 15S in the regions S31a and S31b receive data signals from the source lines 15S in the columns S3 and S2 that are routed around through the picture-frame region 301.

Figure 35B:
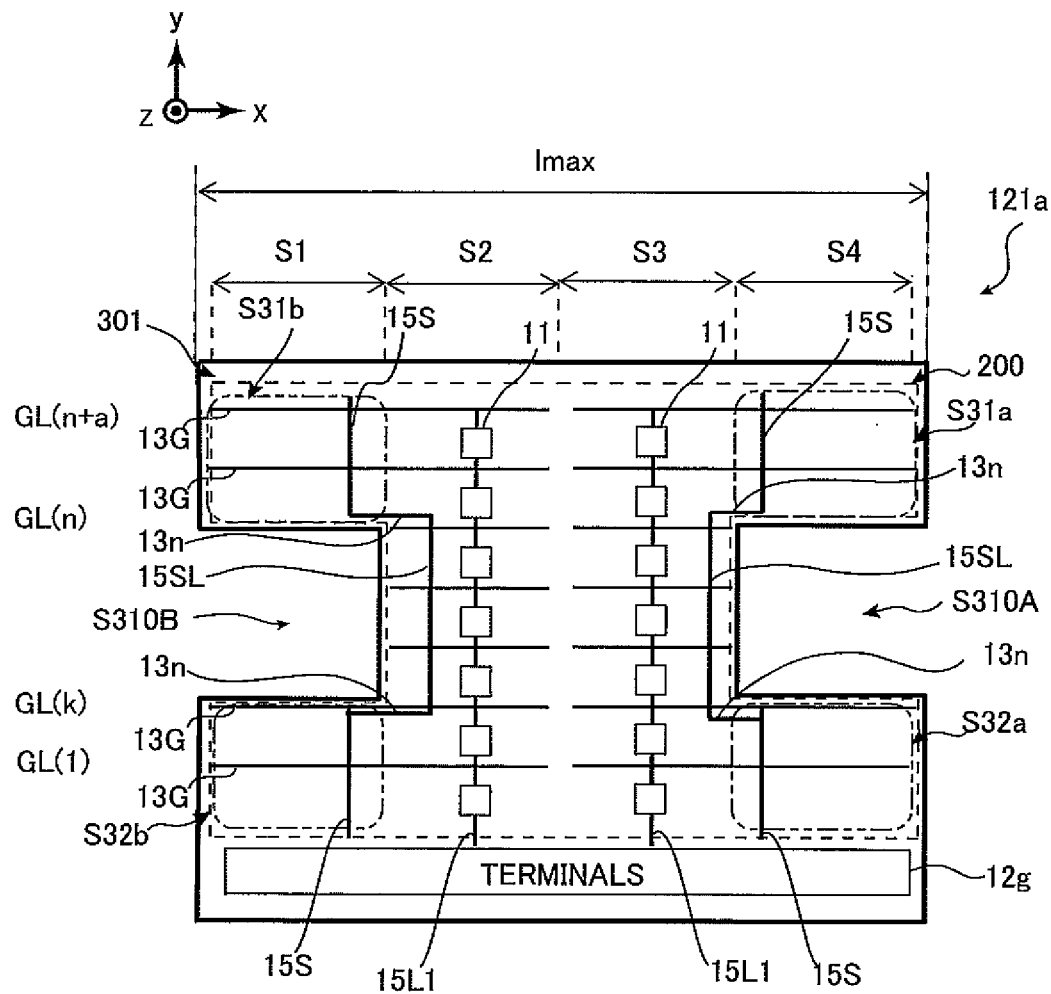
FIG. 35B illustrates another example arrangement of source lines of Example Variation 1.

The arrangement shown in FIG. 35A may be replaced by the arrangement shown in FIG. 35B. In the implementation of FIG. 35B, the gate lines 13G of the rows having the non-display regions S310A and S310B (i.e. GL(k) to GL(n)) located in the columns S2 and S3 have a length that is substantially equal to the width of the columns S2 and S3. In the rows other than those having the non-display regions 300, gate lines 13G extend from the column S1 to the column S2 and from the column S3 to the column S4. Gate drivers 11 are provided between the gate lines 13G of the columns S1 and S2 and are located in the column S2. Gate drivers 11 are provided between the gate lines 13G of the columns S3 and S4 and are located in the column S3. Thus, in the present example, no gate driver 11 is provided in the regions S31b and S32b in the column S1 and the regions S31a and S32a in the column S4, which have the non-display regions 310A and 310B.

In this case, as shown in FIG. 35B, the source lines 15S in the regions S32b and S31b in the column S1 may be connected via detour lines 15SL and 13n (see FIGS. 15 and 16) provided in pixel regions in the region S2, similar to the corresponding source lines of the fourth embodiment. The source lines 15S in the regions S32a and S31a in the column S4 may be connected via detour lines 15SL and 13n (see FIGS. 15 and 16) provided in pixel regions in the column S3. The detour lines 15SL and 13n (see FIGS. 15 and 16) are provided in those pixel regions in the columns S2 and S3 that have no switching element of a gate driver 11. The detour lines 15SL and 13n (see FIGS. 15 and 16) are formed so as to provide an aperture ratio that is substantially equal to that of the pixel regions having switching elements.

Figure 36A:
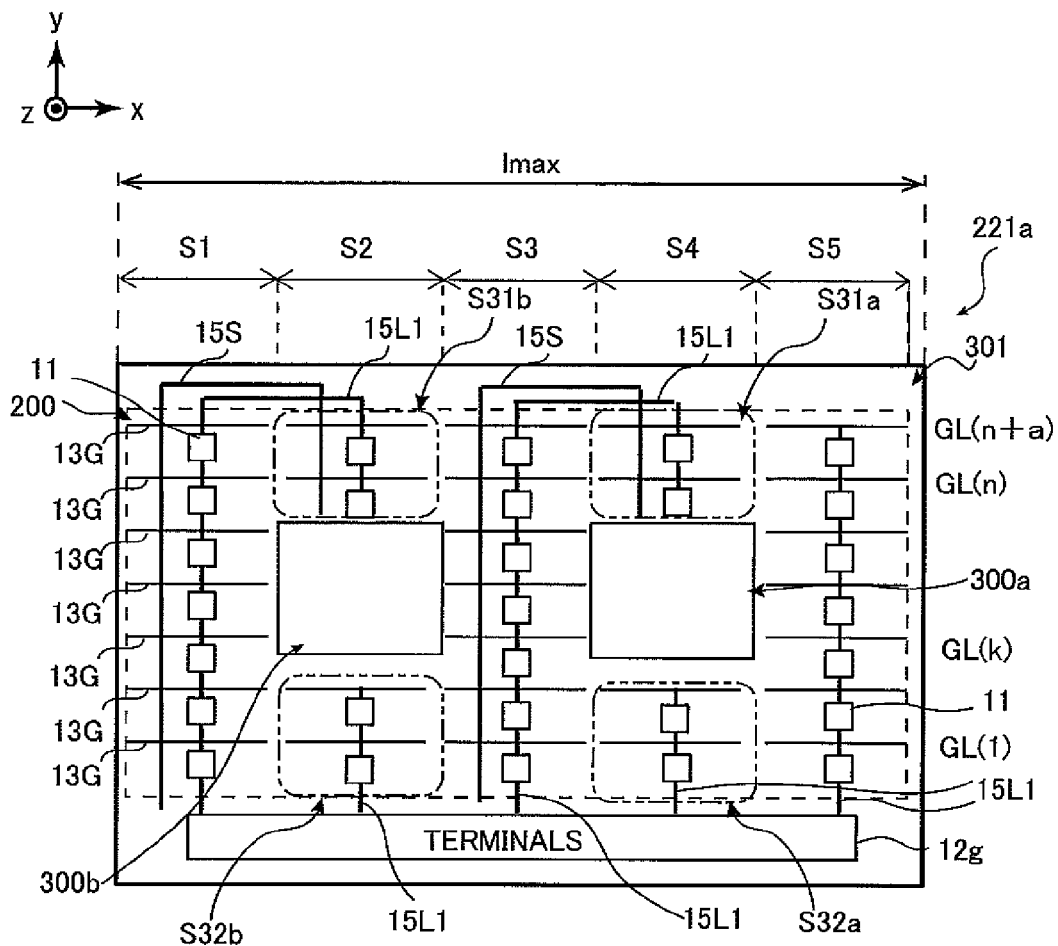
FIG. 36A is a schematic view of an active-matrix substrate of Example Variation 2.

(2) The third embodiment described above describes an implementation where one non-display region 300 is displayed in the display region 200; alternatively, as shown in FIG. 36A, a plurality of non-display regions 300a and 300b may be provided in the display region 200 of the active-matrix substrate 221a. In the implementation of FIG. 36A, the active-matrix substrate 221a includes gate lines 13G located in the columns S2 and S4, which have the non-display regions 300a and 300b, the gate lines having a length that is substantially equal to the width of the non-display regions 300a and 300b as measured in the X-direction. Gate lines 13G having substantially the same length are provided in the columns S1, S3 and S5, which have none of the non-display regions 300a and 300b. Each gate line 13G has a length that allows at least one gate driver 11 to be provided thereon.

Although only some source lines 15S are shown in FIG. 36A, source lines 15 are provided that cross the gate lines 13G in each column. Further, although not shown in FIG. 36A, terminals 12s for supplying data signals from the source driver 3 to the source lines 15S are provided in the portion of the picture-frame region along which the terminals 12g are provided. Similar to the corresponding source lines of the third embodiment, the source lines 15S in the regions S31a and S31b adjacent the picture-frame region 301 in the columns S2 and S4 are formed by extending some source lines 15S in the columns S1 and S3 to the picture-frame region 301 and routing them around toward the regions S31a and S31b. Further, similar to the corresponding gate drivers of the third embodiment, the gate drivers 11 in the regions S31a and 31b are connected with the gate drivers 11 in the columns S3 and S1 by extending the lines 15L1 connecting the gate drivers 11 in the columns S3 and S1 to the picture-frame region 301 and routing them around to the regions S31a and 31b.

Figure 36B:
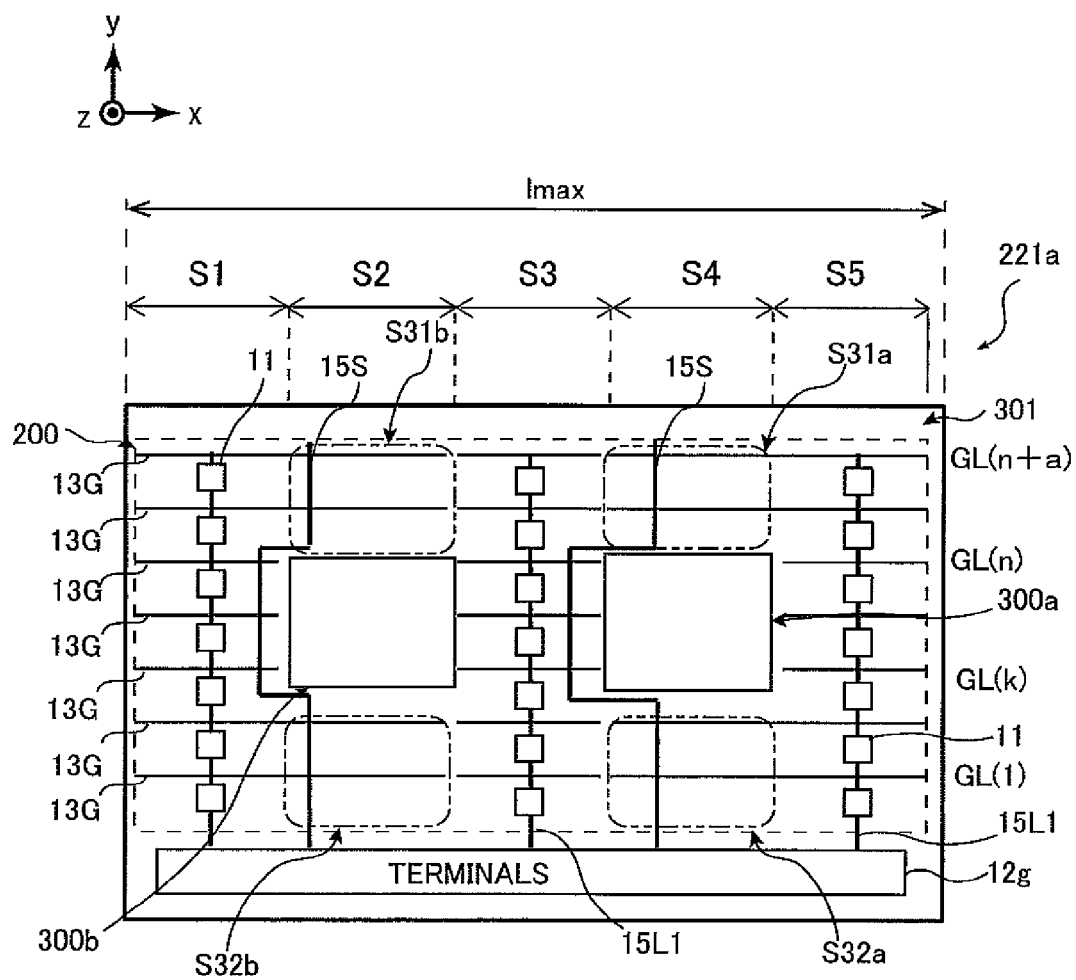
FIG. 36B illustrates another example arrangement of source lines of Example Variation 2.

The arrangement shown in FIG. 36A may be replaced by the arrangement shown in FIG. 36B. In the implementation of FIG. 36B, gate lines 13G having a length that is substantially equal to the width of the column S3 are provided in the column S3. In the columns S1 and S5, the gate lines 13G of the rows having the non-display regions S300a and S300b (i.e. GL(k) to GL(n)) have a length that is substantially equal to the width of the columns S1 and S5. Except in the column S3, gate lines 13G extending from the column S1 to the column S2 and from the column S4 to the column S5 are provided in the rows other than the rows having the non-display regions 300. Gate drivers 11 are provided between the gate lines 13G in the columns S1 and S2 and are located in the column S1. Gate drivers 11 are provided between the gate lines 13G in the columns S4 and S5 and are located in the column S5. Thus, in the present implementation, no gate driver 11 is provided in the regions S31b and S32b in the columns S2 and the regions S31a and S32a in the column S4 which have the non-display regions 300a and 300b.

In this implementation, as shown in FIG. 36B, similar to the corresponding source lines of the fourth embodiment, the source lines 15S in the regions S31a and S32a sandwiching the non-display region 300a may be connected by detour lines 15SL and 13b (see FIGS. 15 and 16) provided in pixel regions in the column S3. The source lines 15S in the regions S31b and S32b sandwiching the non-display region 300b may be connected by detour lines 15SL and 13b (see FIGS. 15 and 16) provided in pixel regions in the column S1.

(3) Starting from the first embodiment described above, the gate drivers 11 may be replaced by gate drivers 11' as in the seventh embodiment. Using gate drivers 11' allows the gate lines 13G in the display region 200 to be driven on a row-by-row basis.

(4) The seventh embodiment described above describes an implementation where a still image is displayed by driving desired gate lines only for the first frame and not driving these gate lines for the second to 60th frames. Alternatively, for example, desired gate lines may be driven for the first and second frames and not driven for the third to 60th frames. In summary, it is only required that desired gate lines are not driven for at least some of the frames depending on driving frequency.

(5) The first to ninth embodiments described above describe implementations where the semiconductor layer portions 14 in the switching elements constituting parts of the gate drivers 11 and 11' are made of an oxide semiconductor; alternatively, the semiconductor layer portions 14 may be made of polysilicon or amorphous silicon.

(6) The first to ninth embodiments described above describe implementations where on the substrate 20 of the active-matrix substrate 20a are provided gate lines 13G, source lines 15S, gate drivers 11, terminals 12g for receiving control signals and the like for the gate drivers 11, and terminals 12s for receiving data signals and the like for the source lines 15S; in addition, a source driver 3 and display control circuit 4 may be provided.

(7) The first to ninth embodiments described above describe implementations where the display panel 2 is a liquid crystal panel; alternatively, it may be a panel of a display scheme in which the active-matrix substrate using organic electroluminescence (EL) or the like is driven.

(8) The active-matrix substrates and display panels in the first to seventh embodiments and variations described above may be used as smartphone displays, speedometers for vehicles, displays for pachinko machines or game machines.

(9) The ninth embodiment and Example Applications 1 to 4 of the ninth embodiment described above describe implementations where some portions of the active-matrix substrate are removed such that at least some of the gate lines 13G have a length that is smaller than the maximum value of the width of the display region as measured in the direction in which gate lines 13G extend; alternatively, if an active-matrix substrate to be used in a generally rectangular display is produced, the step of removing some portions of the active-matrix substrate is not performed. That is, for example, active-matrix substrates provided by cutting the first active-matrix substrate 720a shown in FIG. 31A along the cut line H (i.e. 721a and 722a of FIG. 31B) may be used as displays, or, active-matrix substrates provided by cutting the first active-matrix substrate 720a shown in FIG. 32 along the cut line H may be used as displays. Alternatively, active-matrix substrates provided by cutting the first active-matrix substrate 820a shown in FIG. 33A along the lines H1 and H2 (i.e. 821a to 824a of FIG. 33B) may be used as displays. Alternatively, active-matrix substrates provided by cutting the active-matrix substrate 920a shown in FIG. 34A along the line H13, or active-matrix substrates provided by cutting it along the lines H11, H12 and H10 (i.e. 921a and 922a of FIG. 34B) may be used as displays.

INDUSTRIAL APPLICABILITY

The present invention is useful as a display including a display panel using liquid crystal, organic EL or the like.

The invention claimed is:

1. A method of manufacturing an active-matrix substrate, comprising:
   a forming step of forming a first active-matrix substrate including the steps of
      producing, in associated regions of the substrate, a plurality of gate lines having substantially the same length and spaced apart at a regular interval,
      producing, in the associated regions, a plurality of source lines having substantially the same length and spaced apart at a regular interval to cross the gate lines,
      producing terminals of the associated regions to supply a data signal to the source lines in the associated regions, and
      producing, in each region, a gate line driving circuit in a display region including the gate lines and the source lines to provide a selection signal to switch its associated gate line to a selected or non-selected state;
   a cutting step of cutting the first active-matrix substrate provided by the forming step along a source line between the regions; and
   a removal step of producing a second active-matrix substrate by removing a portion of each of active-matrix substrates provided by the cutting in the cutting step such that at least one of the gate lines in each of the active-matrix substrates has a length smaller than the maximum value of a width of the display region measured in a direction in which the gate lines extend.

2. A method of manufacturing an active-matrix substrate, comprising:
   a forming step of forming a first active-matrix substrate including the steps of
      producing a plurality of gate lines having substantially the same length and spaced apart at a regular interval,
      producing a plurality of source lines having substantially the same length and spaced apart at a regular interval to cross the gate lines, and
      producing a gate line driving circuit in a display region including the gate lines and the source lines to provide a selection signal to switch its associated gate line to a selected or non-selected state; and
   a removal step to produce a second active-matrix substrate by removing a portion of the first active-matrix substrate such that at least one of the plurality of gate lines in the first active-matrix substrate has a length smaller than the maximum value of a width of the display region measured in a direction in which the gate lines extend.

3. The method of manufacturing an active-matrix substrate according to claim 2, wherein the step of producing a gate line driving circuit includes:
the step of producing first gate line driving circuits for the associated gate lines to provide the selection signal to the gate lines; and
the step of producing second gate line driving circuits provided for some of the gate lines that are adjacent to each other to provide the selection signal to the gate lines,
the method further comprising:
a cutting step of cutting the first active-matrix substrate along a gate line between the portion in which the second gate line driving circuits are present and the portion in which the second gate line driving circuits are not present, wherein the removal step occurs after the cutting step.

4. The method of manufacturing an active-matrix substrate according to claim 3, wherein
the step of producing a gate line driving circuit includes the step of producing a plurality of pairs of the first gate line driving circuits and the second gate line driving circuits,
the method further comprising:
the step of cutting along a source line between the plurality of pairs,
wherein the removal step occurs after the cutting step and the step of cutting.

5. The method of manufacturing an active-matrix substrate according to claim 2, wherein
the step of producing a gate line driving circuit produces a plurality of gate line driving circuits of the associated gate lines,
the method further comprising: a cutting step of cutting along a source line between the plurality of gate line driving circuits,
wherein the removal step occurs after the cutting step.

6. An active-matrix substrate comprising:
a display region including a gate line group including a plurality of gate lines and a source line group including a plurality of source lines arranged in a matrix, and pixel electrodes connected with the gate lines and the source lines;
a first terminal provided in a portion of a picture-frame region outside the display region that is adjacent a side thereof to supply a data signal to the source line group;
a second terminal provided adjacent the same side as the first terminal to supply a control signal; and
a gate line driving circuit provided for each gate line to provide a selection signal to switch the gate line to a selected or non-selected state in response to the control signal, the gate line driving circuit being located inside the display region, wherein
at least one gate line of the gate line group has a length smaller than the maximum value of a width of the display region as measured in a first direction in which the gate lines extend.

7. The active-matrix substrate according to claim 6, further comprising:
a non-display region within the display region, wherein
one source line of the source line group is provided in a first display region that is located in a column including the non-display region and is located closer to the first terminal, and extends from the first terminal, and an end thereof disposed in a second direction in which this source line extends is located near an edge of the first display region adjacent the non-display region, and
one source line of the source line group located in another column extends from the first terminal and is extended to a second display region located adjacent a side of the non-display region opposite a side adjacent the first display region.

8. The active-matrix substrate according to claim 6, further comprising:
a non-display region within the display region, wherein
a source line located in a first display region in a column including the non-display region extends from the first terminal, the first display region being located closer to the first terminal than the non-display region is, an end of the source line disposed in a second direction in which it extends is located near an edge of the first display region adjacent the non-display region,
a source line located in a second display region located adjacent a side of the non-display region opposite to a side adjacent the first display region extends from near an edge of the second display region adjacent the non-display region, an end thereof disposed in the second direction is located near an edge of the second display region located adjacent a side of the non-display region opposite a side closer to the first terminal, and
the source line in the first display region is connected with the source line in the second display region via a detour line extending along a periphery of the non-display region from the first display region to the second display region.

9. The active-matrix substrate according to claim 7, further comprising:
a line group extending from the second terminal and generally parallel to the source lines and connected with the gate line driving circuits, wherein
at least one of the gate lines connected with the pixel electrodes in the same row includes a non-continuous gate line portions,
different gate line driving circuits are connected with the different gate line portions,
one line of the line group is provided in the first display region and extends from the second terminal, an end thereof in a direction in which it extends is located near an edge of the first display region adjacent the non-display region, and
one line of the line group in another column extends from the second terminal and is extended to the second display region.

10. The active-matrix substrate according to claim 8, wherein the detour line is provided in a pixel region in which no gate line driving circuit is present.

11. The active-matrix substrate according to claim 6, wherein a gate line driving circuit adjacent to at least a portion of a periphery of the display region provides the selection signal at a driving frequency higher than a driving frequency of another gate line driving circuit.

12. The active-matrix substrate according to claim 6, wherein
a plurality of separate regions are provided by dividing the display region along the first direction or the second direction, a gate line group is provided in each of the separate regions,
a gate line driving circuit in one of the separate regions provides the selection signal at a first driving frequency in response to the control signal, and a gate line driving circuit in another separate region provides the selection signal at a second driving frequency that is lower than the first driving frequency in response to the control signal, and a source line in the one separate region is supplied with the data signal at the first driving frequency, and the source line in the other separate region is supplied with the data signal at the second driving frequency.

13. The active-matrix substrate according to claim 12, wherein the gate line group in the other separate region is present also in the one separate region in such a manner that a border between the gate line group in the one separate region and the gate line group in the other separate region is non-linear.

14. The active-matrix substrate according to claim 6, wherein the gate line driving circuit provides, in response to the control signal, the selection signal to set a gate line in the non-selected state for at least one frame.

15. The active-matrix substrate according to claim 6, wherein
at least one source line of the source line group has a length smaller than another source line of the source line group,
the one gate line is provided in a region in which the other source line is provided and is located in a row that does not cross a column in which the one source line is provided, and
the first terminal supplies the one source line with a data signal with a minimum amplitude during a period in which the one gate line is in the selected state.

16. The active-matrix substrate according to claim 6, wherein
a plurality of gate line driving circuits are provided for the associated gate lines, and
the display region includes a non-display region between the plurality of gate line driving circuits
the active-matrix substrate further comprising: a third terminal provided in a portion of the picture-frame region that is adjacent a side opposite the side along which the first terminal is provided to receive the data signal,
wherein a source line of the source line group that is divided by the non-display region is supplied with the data signal through the side of the display region opposite the side adjacent the first terminal via the third terminal.

17. The active-matrix substrate according to claim 16, further comprising:
a plurality of non-display regions located in the display region, wherein the gate lines and source lines that cross at one non-display region are different from the gate lines and source lines that cross at another non-display region.

18. A display panel, comprising:
the active-matrix substrate according to claim 6;
an opposite substrate including a color filter and a common electrode; and
a liquid crystal layer sandwiched between the active-matrix substrate and the opposite substrate.

* * * * *